(12) United States Patent
Ramanathan et al.

(10) Patent No.: US 11,194,854 B2
(45) Date of Patent: Dec. 7, 2021

(54) MEDIA FINGERPRINTING AND IDENTIFICATION SYSTEM

(71) Applicant: Roku, Inc., San Jose, CA (US)

(72) Inventors: Prashant Ramanathan, Mountain View, CA (US); Mihailo M. Stojancic, San Jose, CA (US)

(73) Assignee: Roku, Inc., San Jose, CA (US)

( * ) Notice: Subject to any disclaimer, the term of this patent is extended or adjusted under 35 U.S.C. 154(b) by 456 days.

(21) Appl. No.: 16/388,740

(22) Filed: Apr. 18, 2019

(65) Prior Publication Data

US 2019/0251115 A1   Aug. 15, 2019

Related U.S. Application Data

(63) Continuation of application No. 15/265,002, filed on Sep. 14, 2016, now Pat. No. 10,402,443, which is a
(Continued)

(51) Int. Cl.
*G06F 16/00* (2019.01)
*G06F 16/48* (2019.01)
(Continued)

(52) U.S. Cl.
CPC .......... *G06F 16/48* (2019.01); *G06F 16/2255* (2019.01); *G06F 16/285* (2019.01);
(Continued)

(58) Field of Classification Search
CPC ........ G06F 16/41; G06F 16/783; G06F 16/48; G06F 16/7847; G06F 16/285; G06K 9/00744; Y10S 707/913
See application file for complete search history.

(56) References Cited

U.S. PATENT DOCUMENTS 6,925,475 B2   8/2005   Essafi et al.
8,069,261 B2   11/2011  Wang et al.
(Continued)

OTHER PUBLICATIONS

Lee et al., "Video Fingerprinting Based on Centroids of Gradient Orientations", IEEE, pp. 401-404. (Year: 2006).*
(Continued)

*Primary Examiner* — Cheryl Lewis
(74) *Attorney, Agent, or Firm* — McDonnell Boehnen Hulbert & Berghoff LLP

(57) ABSTRACT

The overall architecture and details of a scalable video fingerprinting and identification system that is robust with respect to many classes of video distortions is described. In this system, a fingerprint for a piece of multimedia content is composed of a number of compact signatures, along with traversal hash signatures and associated metadata. Numerical descriptors are generated for features found in a multimedia clip, signatures are generated from these descriptors, and a reference signature database is constructed from these signatures. Query signatures are also generated for a query multimedia clip. These query signatures are searched against the reference database using a fast similarity search procedure, to produce a candidate list of matching signatures. This candidate list is further analyzed to find the most likely reference matches. Signature correlation is performed between the likely reference matches and the query clip to improve detection accuracy.

20 Claims, 34 Drawing Sheets

Related U.S. Application Data continuation of application No. 15/073,858, filed on Mar. 18, 2016, now Pat. No. 9,471,674, which is a continuation of application No. 14/885,110, filed on Oct. 16, 2015, now Pat. No. 9,323,754, which is a continuation of application No. 14/711,054, filed on May 13, 2015, now Pat. No. 9,195,663, which is a continuation of application No. 14/059,688, filed on Oct. 22, 2013, now Pat. No. 9,053,104, which is a continuation of application No. 13/719,603, filed on Dec. 19, 2012, now Pat. No. 8,688,731, which is a continuation of application No. 13/463,137, filed on May 3, 2012, now Pat. No. 8,364,703, which is a continuation of application No. 12/772,566, filed on May 3, 2010, now Pat. No. 8,195,689.

(60) Provisional application No. 61/185,670, filed on Jun. 10, 2009.

(51) Int. Cl.
| | |
|---|---|
| G06F 16/41 | (2019.01) |
| G06F 16/28 | (2019.01) |
| G06F 16/783 | (2019.01) |
| G06F 16/951 | (2019.01) |
| G06F 16/22 | (2019.01) |
| G06F 16/901 | (2019.01) |
| G06K 9/00 | (2006.01) |
| G06K 9/46 | (2006.01) |

(52) U.S. Cl.
CPC ............ *G06F 16/41* (2019.01); *G06F 16/783* (2019.01); *G06F 16/7847* (2019.01); *G06F 16/9014* (2019.01); *G06F 16/951* (2019.01); *G06K 9/00744* (2013.01); *G06K 9/4671* (2013.01); *Y10S 707/913* (2013.01)

(56) References Cited

U.S. PATENT DOCUMENTS

| | | |
|---|---|---|
| 8,171,030 B2 | 5/2012 | Pereira et al. |
| 8,189,945 B2 | 5/2012 | Stojancic et al. |
| 8,195,689 B2 | 6/2012 | Ramanathan et al. |
| 8,229,227 B2 | 7/2012 | Stojancic et al. |
| 8,335,786 B2 | 12/2012 | Pereira et al. |
| 8,364,703 B2 | 1/2013 | Ramanathan et al. |
| 8,385,644 B2 | 2/2013 | Stojancic et al. |
| 8,666,152 B1 | 3/2014 | Ramanathan et al. |
| 8,688,731 B2 | 4/2014 | Ramanathan et al. |
| 9,053,104 B2 | 6/2015 | Ramanathan et al. |
| 9,135,674 B1 | 9/2015 | Yagnik et al. |
| 9,195,663 B2 | 11/2015 | Ramanathan et al. |
| 9,323,754 B2 | 4/2016 | Ramanathan et al. |
| 9,471,674 B2 | 10/2016 | Ramanathan et al. |
| 2002/0002682 A1 | 1/2002 | Tsuchiyama et al. |
| 2003/0105739 A1 | 6/2003 | Essafi et al. |
| 2004/0062520 A1 | 4/2004 | Gutta et al. |
| 2008/0235279 A1 | 9/2008 | Cho et al. |
| 2009/0216761 A1 | 8/2009 | Raichelgauz et al. |
| 2009/0281118 A1 | 11/2009 | Bunnelle et al. |
| 2009/0282218 A1 | 11/2009 | Raichelgauz et al. |
| 2010/0074538 A1 | 3/2010 | Mishra et al. |
| 2010/0250510 A1 | 9/2010 | Herberger et al. |
| 2011/0085697 A1 | 4/2011 | Clippard et al. |

OTHER PUBLICATIONS

Notice of Allowance for U.S. Appl. No. 16/388,747 dated Jun. 14, 2019.

La Cascia, M., et al., "JACOB: Just a Content-Based Query System for Video Databases", "IEEE", 1996, pp. 1216-1219.

Lowe, D.G., "Object Recognition from Local Sale-Invariant Features", "Proceedings of the International Conference on Computer Vision", Sep. 1999, pp. 1150-1157, vol. 2.

Sivic, J., et al., "Video Google: A Text Retrieval Approach to Object Matching in Videos", "Proceedings of the Ninth IEEE International Conference on Computer Vision", Oct. 13-16, 2003, pp. 1470-1477, vol. 2.

Joly, A., et al., "Statistical Similarity Search Applied to Content-Based Video Copy Detection", "Proceedings of the 21st International Conference on Data Engineering (ICDE)", 2005, pp. 1285-1294, Publisher: IEEE Computer Society.

Ferman et al., "Robust Color Histogram Descriptors for Video Segment Retrieval and Identification", 2002 IEEE, pp. 497-508.

Ohm et al., "The MPEG-7 Color Descriptors", 2001.

Notice of Allowance for U.S. Appl. No. 12/955,416 dated Oct. 25, 2013.

Non-Final Office Action dated Dec. 10, 2019 in U.S. Appl. No. 16/596,291.

Zhong et al., "Spatio-Temporal Video Search Using the Object Based Video Representation," Proceedings of Int'l Conf. on Image Processing, IEEE, pp. 21-24 (Oct. 1997).

Su et al., "Robust Video Fingerprinting Based on Visual Attention Regions." 2009, IEEE Int'l Conf. on Acoustics, Speech and Signal Processing, pp. 1525-1528 (2009).

* cited by examiner

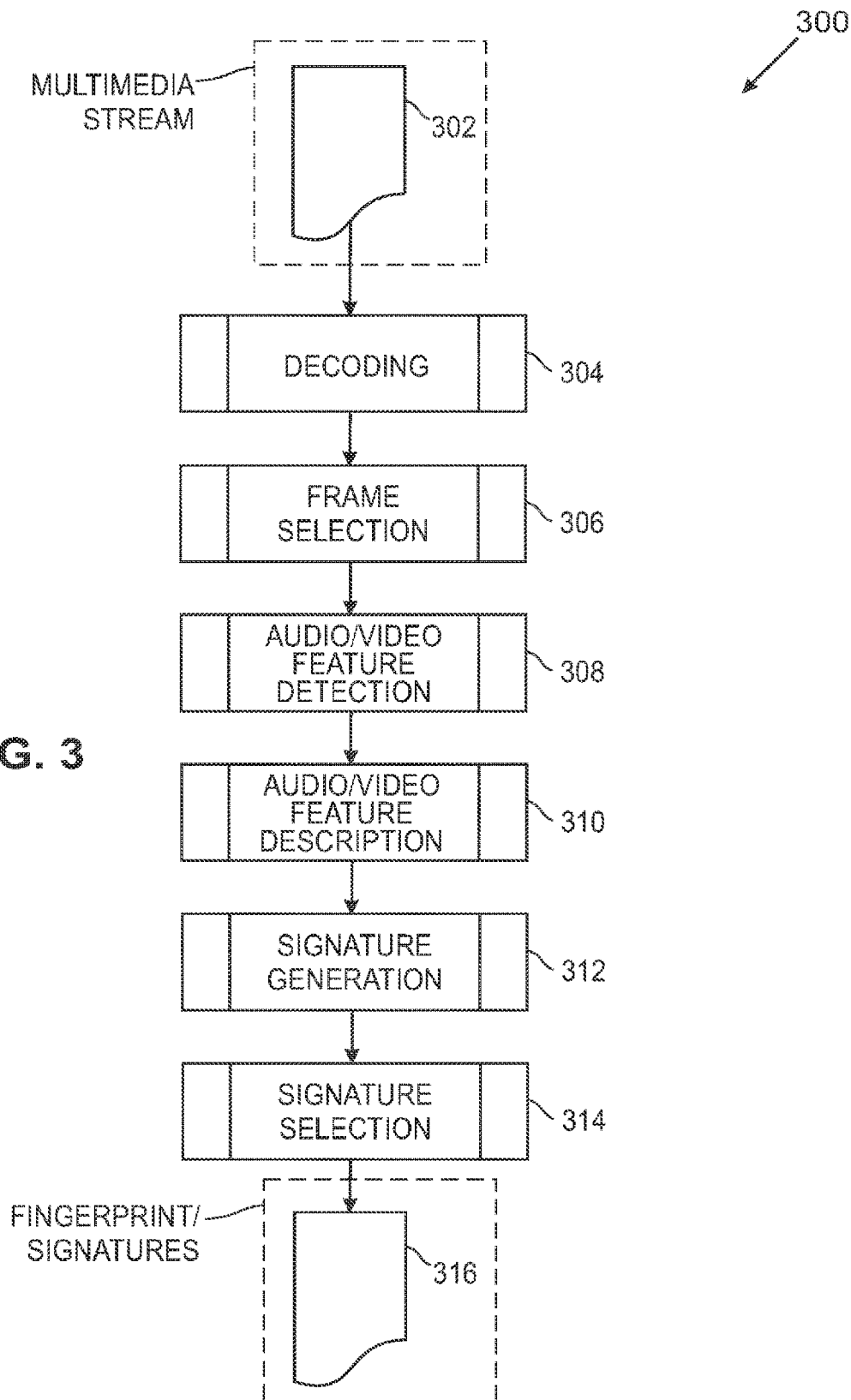

MEDIA FINGERPRINTING AND IDENTIFICATION SYSTEM

This application is a continuation of U.S. patent application Ser. No. 15/265,002 entitled "Media Fingerprinting and Identification System" filed Sep. 14, 2016 issued as U.S. Pat. No. 10,402,443, which is a continuation of U.S. patent application Ser. No. 15/073,858 entitled "Media Fingerprinting and Identification System" filed Mar. 18, 2016 issued as U.S. Pat. No. 9,471,674, which is a continuation of U.S. patent application Ser. No. 14/885,110 filed Oct. 16, 2015 issued as U.S. Pat. No. 9,323,754, which is a continuation of U.S. patent application Ser. No. 14/711,054 filed on May 13, 2015 issued as U.S. Pat. No. 9,195,663, which is a continuation of U.S. patent application Ser. No. 14/059,688 filed Oct. 22, 2013 issued as U.S. Pat. No. 9,053,104, which is a continuation of U.S. patent application Ser. No. 13/719,603 filed Dec. 19, 2012 issued as U.S. Pat. No. 8,688,731, which is a continuation of U.S. patent application Ser. No. 13/463,137 filed on May 3, 2012 issued as U.S. Pat. No. 8,364,703, which is a continuation of U.S. patent application Ser. No. 12/772,566 filed on May 3, 2010 issued as U.S. Pat. No. 8,195,689, which claims the benefit of U.S. Provisional Patent Application Ser. No. 61/856,670 entitled "A Highly Scalable, Accurate and Distortion-Robust Media Fingerprinting and Identification System" filed on Jun. 10, 2009 all of which are hereby incorporated by reference in their entirety.

CROSS REFERENCE TO RELATED APPLICATIONS

U.S. application Ser. No. 12/141,163 filed on Jun. 18, 2008 issued as U.S. Pat. No. 8,229,227 entitled "Methods and Apparatus for Providing a Scalable Identification of Digital Video Sequences", U.S. application Ser. No. 12/141,337 filed on Jun. 18, 2008 issued as U.S. Pat. No. 8,171,030 entitled "Method and Apparatus for Multi-dimensional Content Search and Video Identification", U.S. application Ser. No. 12/491,896 filed on Jun. 25, 2009 issued as U.S. Pat. No. 8,385,644 entitled "Digital Video Fingerprinting Based on Resultant Weighted Gradient Orientation Computation", U.S. application Ser. No. 12/612,729 filed Nov. 5, 2009 issued as U.S. Pat. No. 8,189,945 entitled "Digital Video Content Fingerprinting Based on Scale Invariant Interest Region Detection with an Array of Anisotropic Filters", U.S. application Ser. No. 12/788,796 filed on May 24, 2010 issued as U.S. Pat. No. 8,335,786 which claims priority from U.S. Provisional Application Ser. No. 61/181,806 filed on May 28, 2009 entitled "Multi-Media Content Identification Using Multi-Level Content Signature Correlation and Fast Similarity Search", and U.S. application Ser. No. 12/955,416 filed on Nov. 29, 2010 which claims priority from U.S. Provisional Application Ser. No. 61/266,668 filed on Dec. 4, 2009 entitled "Digital Video Content Fingerprinting Using Image Pixel Intensity and Color Information" have the same assignee as the present application, are related applications, and are hereby incorporated by reference in their entirety.

FIELD OF THE INVENTION

The present invention relates generally to improvements in representing and identifying multimedia information. More particularly, the present invention addresses a scalable and accurate audio and video fingerprinting and identification system that is robust to many classes of audio and video distortions.

GENERAL BACKGROUND OF THE INVENTION

Media applications which include video and audio database management, database browsing and identification are undergoing explosive growth and are expected to continue to grow. To address this growth, there is a need for a comprehensive solution related to the problem of creating a video sequence database and identifying, within such a database, a particular video sequence or sequences that are tolerant of media content distortions. Multiple applications include video database mining, copyright content detection for video hosting web-sites, contextual advertising placement, and broadcast monitoring of video programming and advertisements.

Multimedia fingerprinting refers to the ability to generate associated identifying data, referred to as a fingerprint, from the multimedia image, audio and video content. A fingerprint ideally has several properties. First, the fingerprint should be much smaller than the original data. Second, the fingerprint should be designed such that it can be searched for in a large database of fingerprints. Third, the original multimedia content should not be able to be reconstructed from the fingerprint. Fourth, for multimedia content that is a distorted version of another multimedia content, fingerprints of the original and distorted versions should be similar. Examples of some common multimedia distortions include, selecting a clip of video content temporally, cropping the image data, re-encoding the image or audio data to a lower bit-rate, changing a frame rate of the video or audio content, re-recording the multimedia data via some analog medium such as a camcorder in a movie theatre, and changing the aspect ratio of the image content. A fingerprint with the fourth property is deemed to be robust against such distortions.

Such a system of fingerprinting and search is preferable to other methods of content identification. For example, multimedia watermarking changes the multimedia content by inserting watermark data. Unlike multimedia watermarking, fingerprinting does not change the content. Fingerprinting is, however, a very challenging problem.

Increasing demand for such fingerprinting and search solutions, which include standard definition (SD) and high definition (HD) formats of video, requires increasing sophistication, flexibility, and performance in the supporting algorithms and hardware. The sophistication, flexibility, and performance that are desired exceed the capabilities of current generations of software based solutions, in many cases, by an order of magnitude.

SUMMARY OF THE INVENTION

In one or more of its several aspects, the present invention recognizes and addresses problems such as those described above. The present invention describes a system that is highly scalable to very large multimedia databases, highly accurate in finding a closest matching multimedia clip and not misidentifying a wrong clip, and highly robust to many types of distortion. It is also very efficient in terms of the computer hardware resources necessary to fingerprint and search. To such ends, an embodiment of the invention addresses a method of searching reference multimedia signatures that represent audio and video content of reference multimedia clips for a corresponding query multimedia clip. An N dimension signature based on an N dimension descriptor and a traversal hash signature based on a combination of dimensions of the N dimension descriptor are generated for each feature identified in a set of reference multimedia clips.

Each N dimension signature and a link to a corresponding reference multimedia clip are stored at a location in a reference signature database addressable by the traversal hash signature. An N dimension query signature based on an N dimension query descriptor and a traversal hash query signature based on a combination of dimensions of the N dimension query descriptor are generated for a query multimedia clip. The reference signature database is searched using the traversal hash query signature to find similar signatures that are within a specified signature distance, wherein the similar reference multimedia clips are aggregated in a candidate list of closely matching signatures that correspond to similar reference multimedia clips.

Another embodiment of the invention addresses a method of forming accurate descriptors of features in multimedia clips. A scale and a location of the center parameters are determined for each feature of a plurality of features selected from a frame from a multimedia clip. A Bx by By grid is created having Bx*By blocks located at the center of each feature and each block having a Cx by Cy pixel grid. For each block, functions of multiple intensity differences are computed between each pixel in a block's Cx by Cy pixel grid and another pixel for a specified pixel offset that is greater than 1 and based on the scale and location of center parameters. A first N dimension descriptor is generated as a concatenation of the functions for each block of the Bx*By blocks. The scale and location of center parameters are individually adjusted to account for an expected error margin due to image distortions to generate at least a second N dimension descriptor as a concatenation of the functions for each block of the Bx*By blocks as adjusted according to the expected error margin.

Another embodiment of the invention addresses a computer readable medium storing a computer program which causes a computer system to perform a method of searching reference multimedia signatures that represent audio and video content of reference multimedia clips for a corresponding query multimedia clip. An N dimension signature based on an N dimension descriptor and a traversal hash signature based on a combination of dimensions of the N dimension descriptor are generated for each feature identified in a set of reference multimedia clips. Each N dimension signature and a link to a corresponding reference multimedia clip are stored at a location in a reference signature database addressable by the traversal hash signature. An N dimension query signature based on an N dimension query descriptor and a traversal hash query signature based on a combination of dimensions of the N dimension query descriptor are generated for a query multimedia clip. The reference signature database is searched using the traversal hash query signature to find similar signatures that are within a specified signature distance, wherein the similar reference multimedia clips are aggregated in a candidate list of closely matching signatures that correspond to similar reference multimedia clips.

A further embodiment of the invention addresses method for creating a media database. A plurality of signatures are generated from descriptors of selected media content. A signature is selected from the plurality of signatures based on a distribution of bit values in the selected signature and on values of a corresponding descriptor. A traversal hash signature is generated from the corresponding descriptor. The selected signature is stored in a media database at a location within a set of contiguous locations based on the traversal hash signature used as a primary index.

These and other features, aspects, techniques and advantages of the present invention will be apparent to those skilled in the art from the following detailed description, taken together with the accompanying drawings and claims.

BRIEF DESCRIPTION OF THE DRAWINGS

FIG. 3 illustrates a multimedia fingerprinting process in accordance with the present invention;

DETAILED DESCRIPTION

Figure 1:
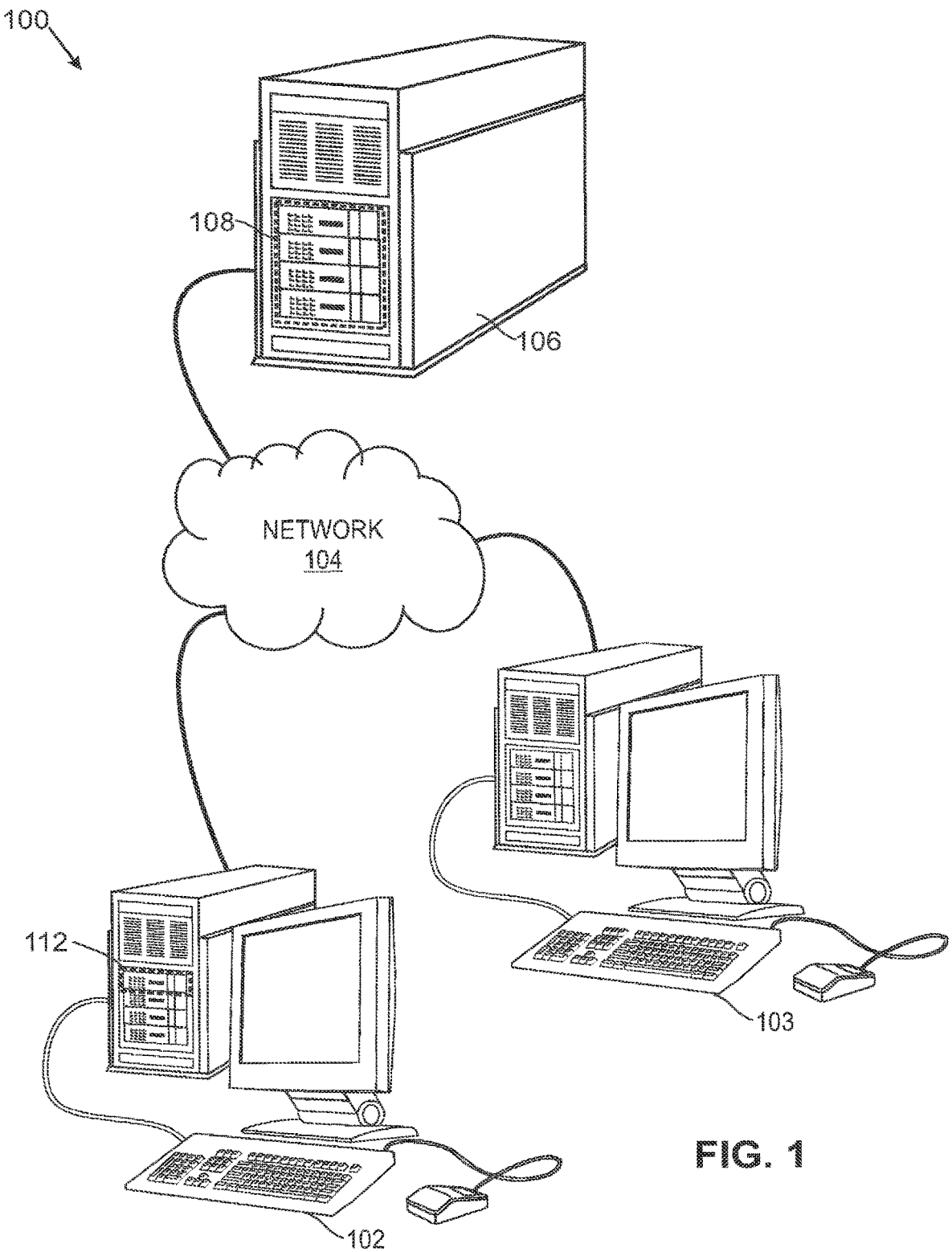
FIG. 1 illustrates a system for media content fingerprinting in accordance with the present invention.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-readable storage medium having computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C+ . . . +, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

A fingerprint system should be robust to distortions, while allowing for high matching accuracy and low false positive rate. A fingerprinting system should have fast search speed, especially when searching over a large database of content. The fingerprinting system should be able to return a match for a relatively short clip of query content. The fingerprinting system should also be able to generate fingerprints rapidly when generating a reference database or query fingerprints to be searched. These goals tend to compete with each other. For instance, high search speed and support for short query clips can come at the cost of accuracy or robustness to distortion. Generally, accuracy trade-offs against robustness to distortion.

Due to the large size of such databases and the density of media files, high performance, accurate media identification and search technologies are needed. Furthermore, robust video content identification, management, and copyright protection should be resistant to intentional or unintentional video content change or distortion within the limits of parameters, such as, reasonable view-ability. The overall design should be scalable to efficiently handle very large databases of videos and an arbitrary length of a query sequence.

To provide for such needs, FIG. 1 illustrates a system 100 for both media fingerprinting and identification in accordance with an embodiment of the present invention. The system 100 includes user sites 102 and 103, a server 106, a video database 108, and a video fingerprinting and video identification system 112 implemented as a program and operated, for example, by user site 102. A network 104, such as the Internet, a wireless network, or a private network, connects sites 102 and 103 and server 106. Each of the user sites, 102 and 103 and server 106 may include a processor complex having one or more processors, having internal program storage and local user controls such as a monitor, a keyboard, a mouse, a printer, and may include other input or output devices, such as an external file storage device and communication interfaces.

The user site 102 may comprise, for example, a personal computer, a laptop computer, or the like equipped with programs and interfaces to support data input and output and video fingerprinting and search monitoring that may be implemented both automatically and manually. The user site 102, for example, may store programs, such as the video fingerprinting and search system 112 program implementation of a content based video identification process of the present invention or have access to such programs through electronic media, such as may be downloaded over the Internet from an external server, accessed through a universal serial bus (USB) port from flash memory, accessed from disk media of various types, or the like. The system 100 may also suitably include more servers and user sites than shown in FIG. 1. Also, multiple user sites each operating an instantiated copy or version of the video fingerprinting and search system 112 may be connected directly to the server 106 while other user sites may be indirectly connected to it over the network 104.

User sites 102 and 103 may generate user video content which is uploaded over the Internet 104 to a server 106 for storage in a video database 108. The user sites 102 and 103, for example, may also operate a video fingerprinting and video identification system 112 to generate fingerprints and search for video content in the video database 108. The video fingerprinting and video identification system 112 in FIG. 1 is scalable and utilizes highly accurate video fingerprinting and identification technology that checks unknown video content against a database of previously fingerprinted video content, which is considered an accurate or "golden" database. The video fingerprinting and video identification system 112 is different from commonly deployed systems in that it extracts features from the video itself. The video fingerprinting and video identification system 112 allows the server 106 to configure a "golden" database specific to its business requirements. The user site 102 that is configured to connect with the network 104, uses the video fingerprinting and search system 112 to compare video streams against a database of signatures in the video database 108, that has been previously generated. As used herein, a video fingerprint is a calculated numerical value, alternatively termed a signature, which represents a detected feature of a video frame. In one approach, a feature detection procedure uses a two pass scale space analysis as described in U.S. application Ser. No. 12/612,729 filed Nov. 5, 2009 entitled "Digital Video Content Fingerprinting Based on Scale Invariant Interest Region Detection with an Array of Anisotropic Filters", FIGS. 3, 4, 5, 6A, 6B, 7A, 7B, and 8 and pages 16-26 and 34-36. The first pass uses Laplacian-of-Gaussian second order partial derivative bi-level filters to generate interest regions. These interest regions are further refined in the second pass, using anisotropic filters of sampled elliptic-shaped Gaussian second order partial derivative filters. The detected features, found by interpolating local maxima values, are characterized by the following set of parameters $(s_x, s_y, x, y, \text{peak polarity})$, where $s_x$, $s_y$ denote the scale in the x and y directions, (x,y) denote the pixel location, and peak polarity denotes whether the feature is a dark or light relative to the image background. For each feature that is detected in a video frame, one or more descriptors are generated according to a global descriptor procedure described below. For each global descriptor, a pair of signatures, a primary signature and a traversal hash signature, are generated as described in more detail below. A collection of signatures drawn from a single video frame with multiple features generates a compact video frame representation, while a collection of signatures associated with each video frame in a video sequence with multiple frames forms the video sequence representation.

The user site 102 has access to the video database 108. The video database 108 may store the video archives, as well as all data related to various video content stored in the video database 108, and a plurality of video fingerprints that have been adapted for use as described herein and in accordance with the present invention. It is noted that depending on the size of an installation, the functions of the video fingerprinting and search system 112 and the capacity and management of the video database 108 may be combined in a single processor system, such as user site 102 or server 106, running separate program threads for each function.

One embodiment of the present invention addresses the problem of matching a query multimedia clip to a reference multimedia clip from a large collection of reference multimedia clips. The multimedia clip and the reference multimedia clips are processed to generate a compact, searchable set of fingerprints and a multimedia fingerprint database is generated to allow for fast, accurate searching using a query fingerprint to search this multimedia fingerprint database.

At the base of the problem of matching a video clip to a video from a large collection of videos, is the problem of reliably matching two digital images when one of them has undergone some form of distortion, such as geometric and optical distortions. Thus, the problem may be restated as what techniques are required to reliably match a distorted query video frame, chosen from a query video clip, to a corresponding undistorted, original video frame residing in a database of original video material. Since the database of original video material may be very large, many video frames in this database could exhibit substantial statistical similarity. Furthermore, many features within a single video frame may also show statistical similarity in both a visual or optical and algorithmic or geometric sense. This fact makes it difficult to clearly distinguish between many possible feature descriptor matches resulting from a database browsing or search activity when a non-exact, similarity measure is used. Hence, a precise, discriminative, and robust video frame feature characterization is desirable having a feature detector and identifier that are well localized in terms of its location spatially and its spatial extent or scale.

This invention describes a system that is readily scalable to very large multimedia databases, accurate in finding a correct clip and not misidentifying a wrong clip, and robust to many types of distortion. A fingerprinting and search system is used, where the fingerprint for a piece of multimedia content is composed of a number of compact signatures, including traversal hash signatures and associated metadata. The compact signatures and traversal hash signatures are constructed to be easily searchable when scaling to a large database of multimedia fingerprints. The multimedia content is also represented by many signatures that relate to various aspects of the multimedia content that are relatively independent from each other. Such an approach allows the system to be robust to distortion of the multimedia content even when only small portions of the multimedia content are available.

Multimedia, specifically audio and video content, may undergo several different types of distortions. For instance, audio distortions include re-encoding to different sample rates or audio quality. Video distortions include cropping, stretching, re-encoding to a lower quality, and image overlays. While these distortions change the digital representation, the multimedia is perceptually similar to a human listener or viewer. Robustness to these distortions refers to the property that content that is perceptually similar will generate fingerprints that have a small distance according to some distance metric, such as Hamming distance for bit based signatures, and content that is perceptually distinct from one another will generate fingerprints that have a large distance, according to the same distance metric. A search for perceptually similar content, hence, is transformed to a problem of searching for fingerprints that are a small distance away from the desired fingerprints.

The overall architecture and details of a highly scalable and accurate video fingerprinting and identification system is described that is robust to many classes of video distortions. In this system, the fingerprint for a piece of multimedia content is composed of a number of compact signatures, along with traversal hash signatures and associated metadata. The compact signatures and traversal hash signatures are constructed so as to be easily searchable when scaling to a very large database of multimedia fingerprints. The multimedia content is represented by many signatures that relate to various aspects of the multimedia that are relatively independent from each other. This allows the system to be very robust under heavy distortion when only small portions of the multimedia content are available.

The content based multimedia identification system consists of a multimedia fingerprinting process and a search process. In order to identify an unknown multimedia clip, these two components are used as described in more detail below.

Figure 2A:
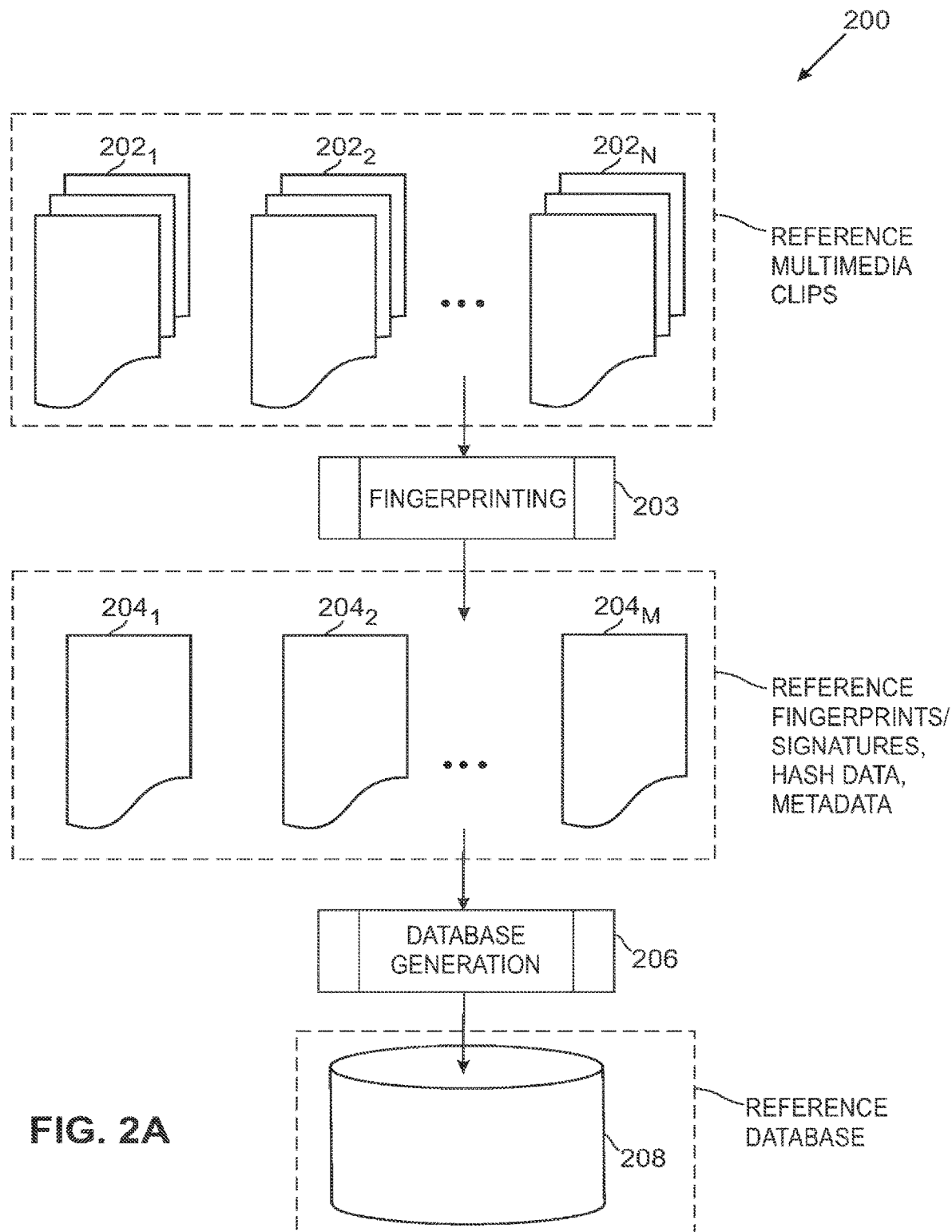
FIG. 2A illustrates a reference media database generation process in accordance with the present invention.

FIG. 2A illustrates a reference media database generation process 200 in accordance with the present invention. Reference multimedia clips $202_1$, $202_2$, ... $202_N$ that are relevant to the application at hand are identified. The clips $202_1$, $202_2$, ... $202_N$ refer to distinct pieces of multimedia content. For example, the clips could be from a movie and represent different temporal portions of the movie, including audio and video content, or they could be from different movies. Using a video fingerprinting function 203 of the video fingerprinting and search system 112, reference signatures $204_1$, $204_2$, ... $204_N$ are generated for the reference multimedia clips $202_1$, $202_2$, ... $202_N$, respectively, along with hashing data and associated metadata. Different pieces of multimedia content may be fingerprinted independently, leading to a parallelizable system. A clip of multimedia content can be broken down into its temporal components, such as frames in the case of video, or temporal audio segments in case of audio. Even more parallelism is possible by independently fingerprinting at the temporal component level, or frame level.

The set of reference signatures $204_1$, $204_2$, ... $204_N$ created in the video fingerprinting function 203 is organized by database generation function 206 into a reference database 208. This set of reference signatures is indexed by the generated hashing data, described in further detail below. The associated metadata, also described in further detail below, is stored along with each reference signature. A set of reference signatures may also be indexed in other ways, for instance, by multimedia identifiers. A single multimedia identifier denotes a distinct piece of multimedia content. For instance, the multimedia clips $202_1$, $202_2$, ... $202_N$ would each be represented by their own multimedia identifier.

Figure 2B:
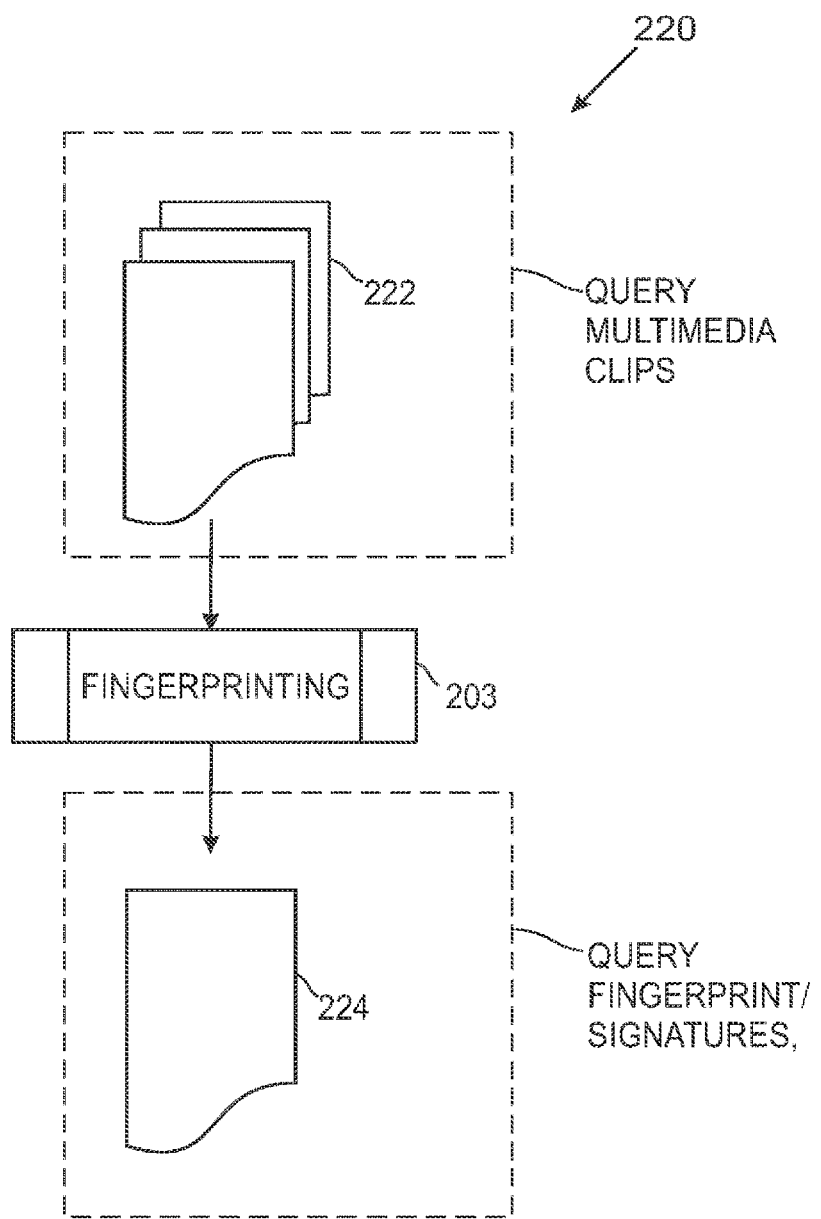
FIG. 2B illustrates a query fingerprint generation process in accordance with the present invention.

FIG. 2B illustrates a query fingerprint generation process 220 in accordance with the present invention. A user requests identification of an unknown multimedia clip 222, including audio and video content, also referred to herein as a query multimedia clip 222. The query multimedia clip 222 is processed by the video fingerprinting function 203 to generate query signatures, hash data, and associated metadata, known collectively as a query fingerprint 224, for the unknown multimedia clip 222.

Figure 2C:
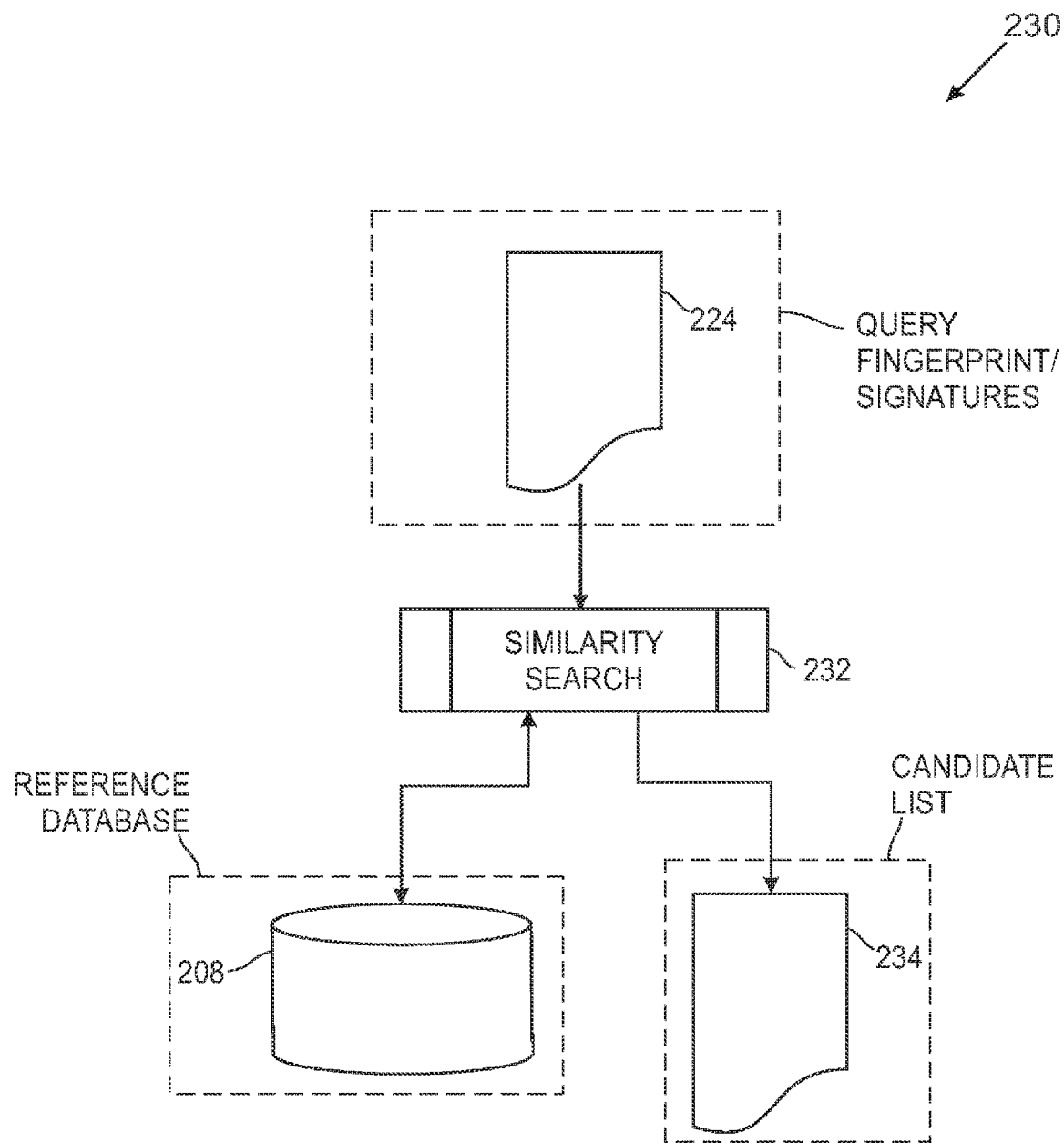
FIG. 2C illustrates a similarity search process in accordance with the present invention.

FIG. 2C illustrates a similarity search process 230 in accordance with the present invention. For each query signature in the query fingerprint 224, a similarity search function 232 is initiated to find similar signatures in the reference database 208. The hash data associated with each query signature is used to restrict the similarity search function 232 to a relatively small portion of the reference data, allowing the similarity search to be extremely fast even for large reference databases. Only reference signatures that are "similar" within a distance measure to the query signature are returned. These classified similar reference signatures are added to a candidate list 234, which contains identifying information regarding which reference multimedia clip $202_1$, $202_2$, ... $202_N$ the similar reference signature belongs.

Figure 2D:
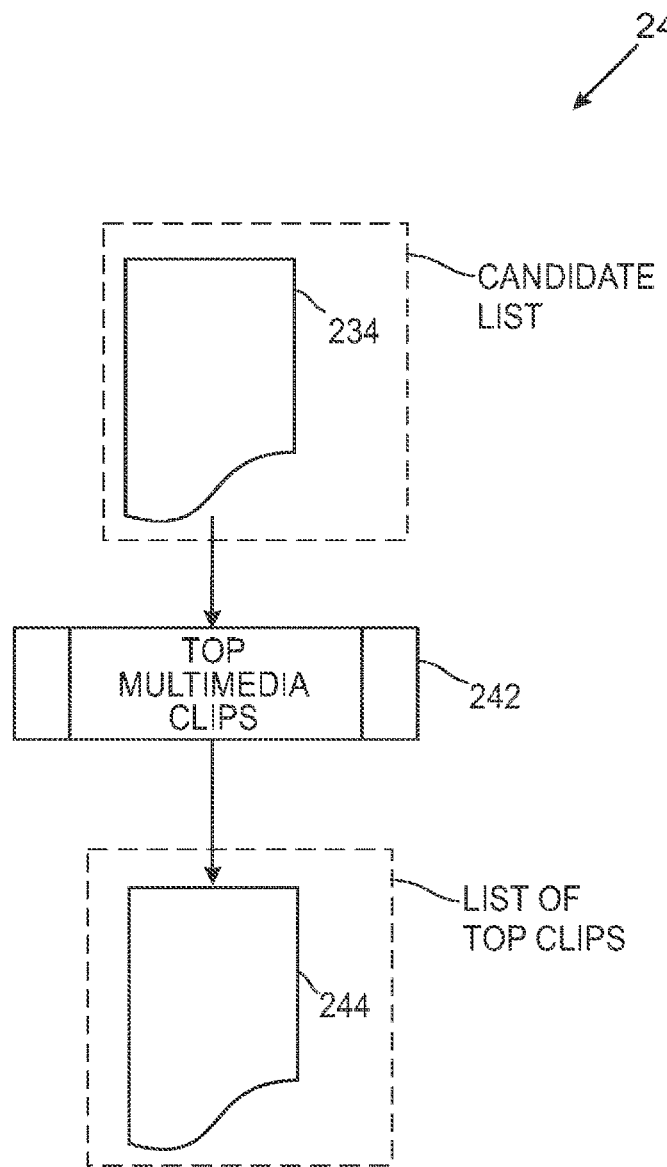
FIG. 2D illustrates a candidate video filtering process in accordance with the present invention.

FIG. 2D illustrates a candidate video filtering process 240 in accordance with the present invention. The video filtering process 240 analyzes the candidate list 234 for the most likely matches in the reference database 208. The candidate list 234 is sorted in top multimedia clips function 242 to find the top most likely matching multimedia clips. The resulting data is stored in a list of top clips 244. The list of top clips 244 includes a multimedia identifier for the similar reference multimedia clip. The matching multimedia clip might be only for a specific portion of the multimedia clip, for instance, a particular time segment, such as seconds 93 to 107 of a video sequence, or spatial locations, such as top left quadrant of the video frames. The temporal identification and spatial locations are also included in the list of top clips.

Figure 2E:
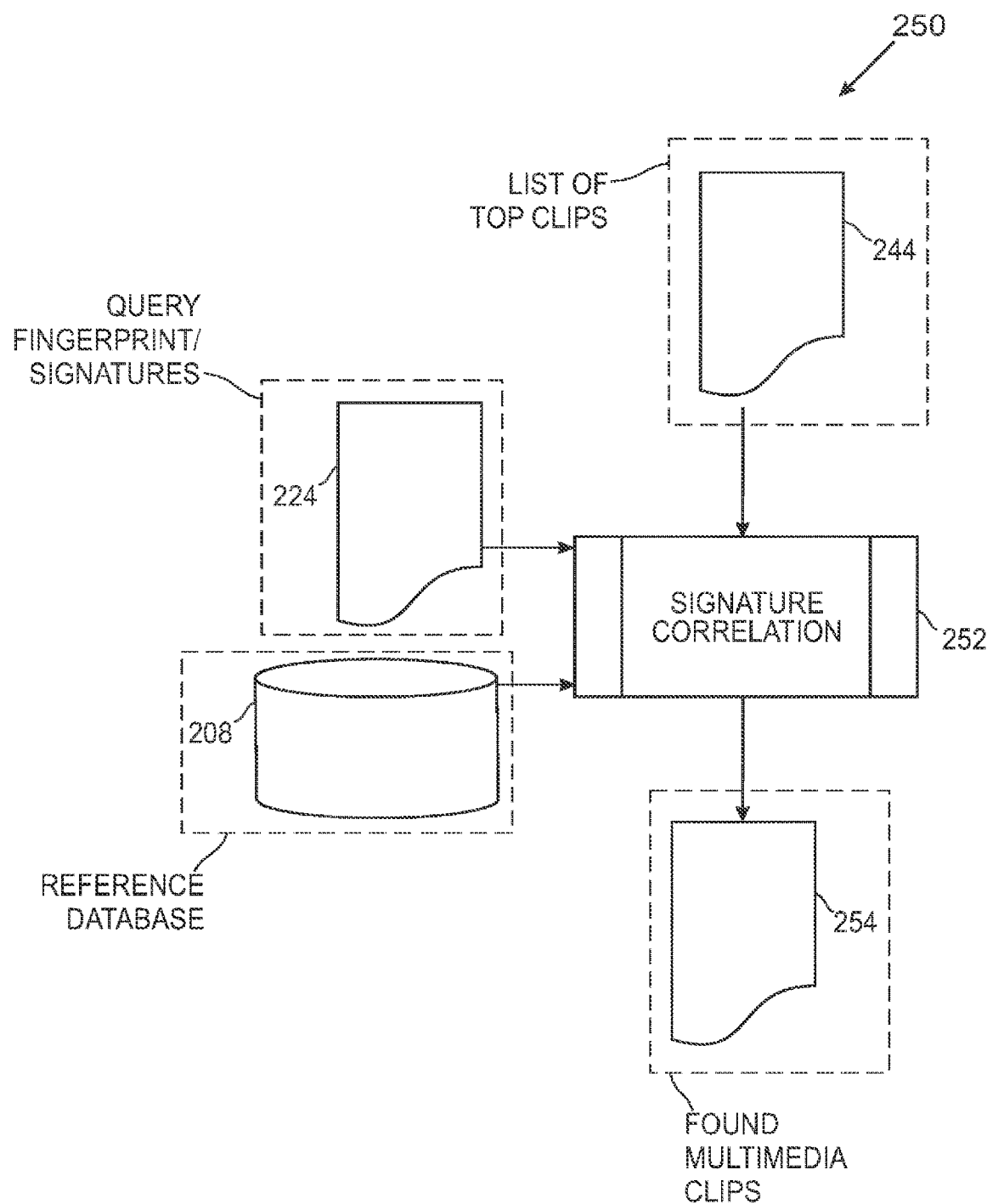
FIG. 2E illustrates a signature correlation process in accordance with the present invention.

FIG. 2E illustrates a signature correlation process 250 in accordance with the present invention. The list of top clips 244 is selected for correlation. For each of the clips in the top clips list 244, a set of signatures is accessed from the reference database 208 given the multimedia identifier and any temporal and/or spatial information. A query could correspond to "all signatures for video number ABC from time 10.4 seconds to 25.7 seconds in the bottom-right quadrant of the frame." These signatures are not restricted have matching traversal hash signatures. The set of query signatures is now compared against this set of reference signatures, using the signature correlation procedure 252. For each query signature, a score is derived based on the distances to the closest signatures in the reference database signature subset, and the number of matches. This could include, for instance, the average distance. These scores are combined, for example, the scores are averaged, for the entire set of query signatures to give an overall score for the database clip. Based on whether this score is over a threshold, the database clip is determined to be a true positive or a false positive. The signature correlation procedure 252 is repeated for all clips in the top clips list 244, to produce a list of matching reference videos, since there may be more than one, if similar content is repeated in the database. FIG. 2A fingerprinting function 203 and FIG. 2B belong to the multimedia fingerprinting system, while FIG. 2A database generation function 206 and FIGS. 2C-2E belong to the search system.

FIG. 3 illustrates a multimedia fingerprinting process 300 in accordance with the present invention. A video clip is decoded from a multimedia source, such as an motion picture experts group (MPEG) compressed audio and video stream, into individual frames and a subset of the frames are selected for processing. For each selected frame, features are detected using a scale-space feature detector. An N-dimensional descriptor is generated based on the image pixels corresponding to the scale and position values from the feature descriptor. An M-dimensional signature and K-dimensional traversal hash signature is generated from descriptor.

The multimedia fingerprinting process 300 encompasses the fingerprinting function 203 shown in FIG. 2A and the query fingerprint generation process 220 of FIG. 2B. As shown in FIG. 3, the multimedia fingerprinting process 300 is comprised of a decoding step 304, a selecting frame step 306, a detecting audio and video features step 308, a describing the detected audio and video features step 310, a generating signatures and hash data step 312, and a selecting signatures step 314.

The decoding step 304 comprises decoding a multimedia stream that may be accessed in compressed form from a distributed source to produce raw or unprocessed image and audio data. This data, which is associated with an identified playout timestamp, can be combined with other contiguous data to form a "frame" of data. For example, for image data, a frame could be a single image, or group of images, decoded from the multimedia stream. For audio data, a frame could be several milliseconds worth of decoded audio.

The selecting frame step 306 comprises selecting a subset of all available frames for further content analysis. Image and audio data exhibit a great deal of temporal coherence which makes it possible to select a limited number of frames from the entire set of data and obtain similar accuracy as if all frames were used. The search system may also be more efficient when fewer signatures are used. The selecting frame step 306 uses an algorithm to select the subset of all available frames to represent the entire multimedia sequence, as described in more detail below.

The detecting audio and video features step 308 comprises further analyzing each selected frame to find audio and video features that should be reproducible under an expected suite of distortions. A reproducible feature implies a high likelihood of having corresponding features in the original content and the distorted content. For an image, this may involve doing scale-space analysis or using a blob detector, to find an x and y location and an x and y scale of the identified blobs in the image.

The describing the detected audio and video features step 310 comprises generating a compact descriptor for each of the features detected in the previous step. For image data, the compact descriptor, such as a vector of real values, could be based on intensity and gradient values in a spatial area surrounding a detected blob. Generally, such a compact descriptor has on the order of 64 or 128 components, based on spatial subdivision and various image spatial and temporal derivatives of zeroth, first and higher orders.

The generating signatures and hash data step 312 comprises, for each generated descriptor of a particular feature of a frame of multimedia, generating an associated signature and a signature hash. The signatures generated typically quantize a descriptor's real value and generate a 1-bit, 2-bit, 4-bit, or 8-bit representation for each of the descriptor's components. For a descriptor that is 64-dimensional, we can use a single threshold value to generate a 64-bit signature. By summing multiple descriptor dimensions, for instance, 4 dimensions, and thresholding the resulting vector, a 16-bit signature hash value can be generated to associate with this signature.

The selecting signatures step 314 comprises selecting signatures that may have greater information content about the multimedia content. For instance, bit-signatures that have nearly all 0's or all 1's tend not to be very unique to a particular multimedia content. Hence, signatures with a count of 0's or 1's that fall below some threshold may be removed. Signatures may also be rejected based on descriptor information, for the descriptor from which the signature is derived. By summing the descriptor values and rejecting those with a sum below a threshold, signatures are eliminated that have corresponding descriptors with their energy concentrated in only a few dimensions.

The multimedia fingerprinting process 300 is described in more detail beginning with the frame selection step 306. The frame selection step 306 includes both static and dynamic selection of frames. In static frame selection, frames are selected in a specified frame selection period of N frames, where, for example, every $N^{th}$ frame is selected without particular regard to frame content. This approach is used for certain applications where processing of every frame, would be difficult due to computational load. In dynamic frame selection, frames are selected based on their audio and video content. Other aspects and further details regarding frame selection may be found in U.S. application Ser. No. 12/141,163 filed on Jun. 18, 2008 entitled "Methods and Apparatus for Providing a Scalable Identification of Digital Video Sequences", FIGS. 3 and 12 and pages 14-16, 25, and 26, and U.S. application Ser. No. 12/491,896 filed on Jun. 25, 2009 entitled "Digital Video Fingerprinting Based on Resultant Weighted Gradient Orientation Computation", FIG. 8 and pages 20-22. For dynamic frame selection, a frame selection period is also specified. The frame selection algorithm and period affects the total processing time, the number of signatures generated, as well as the accuracy of the results.

The detecting audio and video features step 308 involves finding some aspect of the multimedia content for the selected frame that should be reproducible under an expected suite of distortions. In accordance with an embodiment of the present invention, an advantageous approach for finding reproducible image features is described. It is noted that this approach can also be adapted to finding reproducible audio features. Both image and audio features may also be described by a compact descriptor.

Image features, such as blobs in an image, may be identified by location and scale in an x and y direction by using a form of scale-space analysis, also referred to herein as blob detection. Conceptually, scale-space analysis applies Gaussian smoothing filters at a particular scale to the original image, and computes a determinant of the Hessian, to produce a response image for that scale. By appropriately selecting peaks from these response images, x and y locations and scales may be inferred.

Further details regarding scale-space analysis may be found in U.S. application Ser. No. 12/612,729 filed Nov. 5, 2009 entitled "Digital Video Content Fingerprinting Based on Scale Invariant Interest Region Detection with an Array of Anisotropic Filters", FIGS. 3, 4, 5, 6A, 6B, 7A, 7B, and 8 and pages 16-26 and 34-36. Other feature detection techniques may also be alternatively used in the fingerprinting system of the present invention.

The multimedia fingerprinting process 300 continues with step 310 to generate one or more feature descriptors. A rectangular region of interest in the image is computed based on the scale and location of the detected feature. "Global gradient" values, a more general form of gradient values, are computed in the x and y directions over the pixels of the region of interest. The descriptor is computed according to a nonlinear weighting of the global gradient values, producing a result which is accumulated into +x, −x, +y, −y bins, for multiple regions in the region of interest. The end result is an M-dimensional descriptor.

Figure 4:
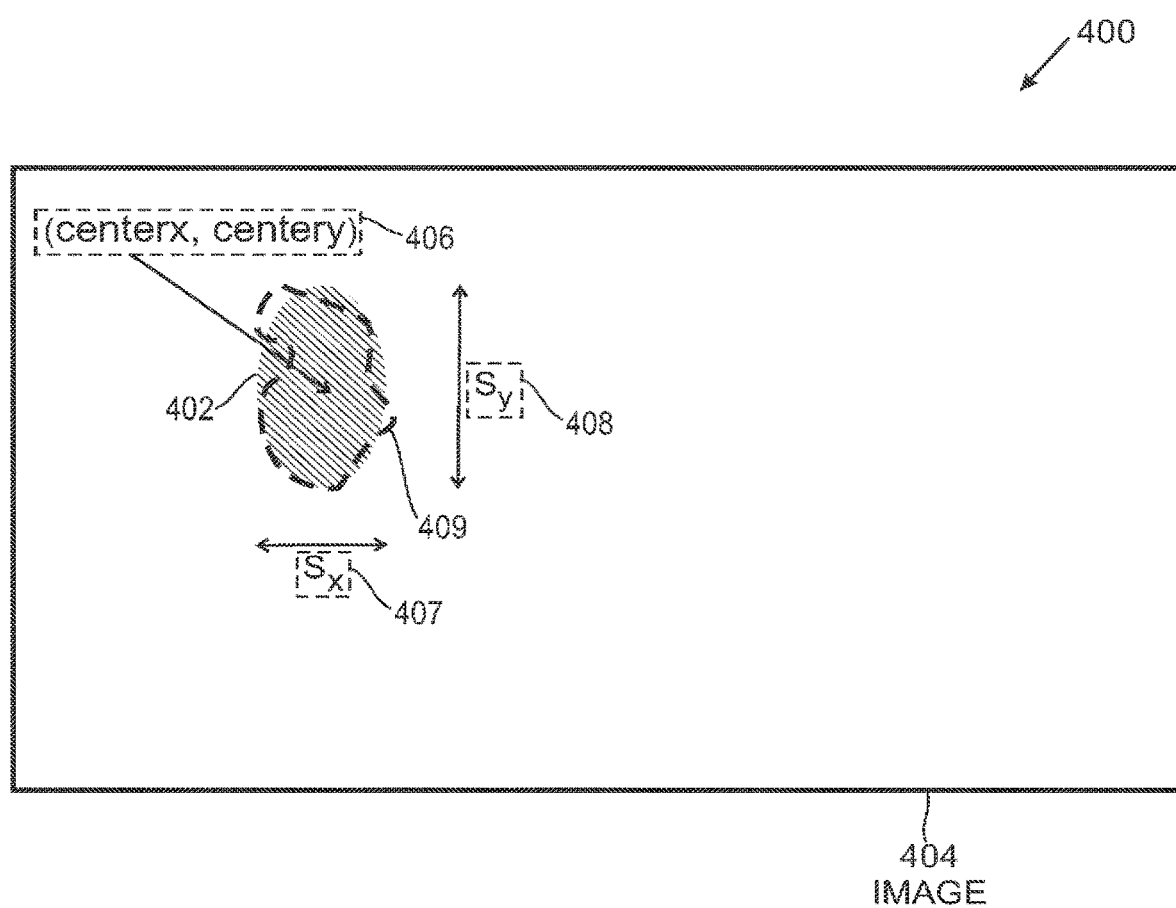
FIG. 4 illustrates a scale-space feature in accordance with the present invention.

An example of a detected scale space feature is shown in FIG. 4. FIG. 4 illustrates a scale-space feature 400 in accordance with the present invention. In FIG. 4, an image feature is represented by dashed outline 409, which could be a contiguous area of near-constant colored pixel that is, for instance, a human face, or part of a picture on a wall. For this image feature, a corresponding image blob 402 is located in an image space 404 by (centerx, centery) coordinates 406 and with a particular $s_x$ 407 and $s_y$ 408 scale reference. A scale-space feature has a few others attributes that describe it relative to the surrounding image pixels. For example, a peak polarity value is a binary value indicating whether a feature is a dark blob on a light background, or a light blob on a dark background. A peak strength value represents a measure of how much a blob stands out from its background. For example, a light gray blob on a dark gray background has a lower peak strength value, as compared to a black blob on a white background which has a higher peak strength value.

Figure 5A:
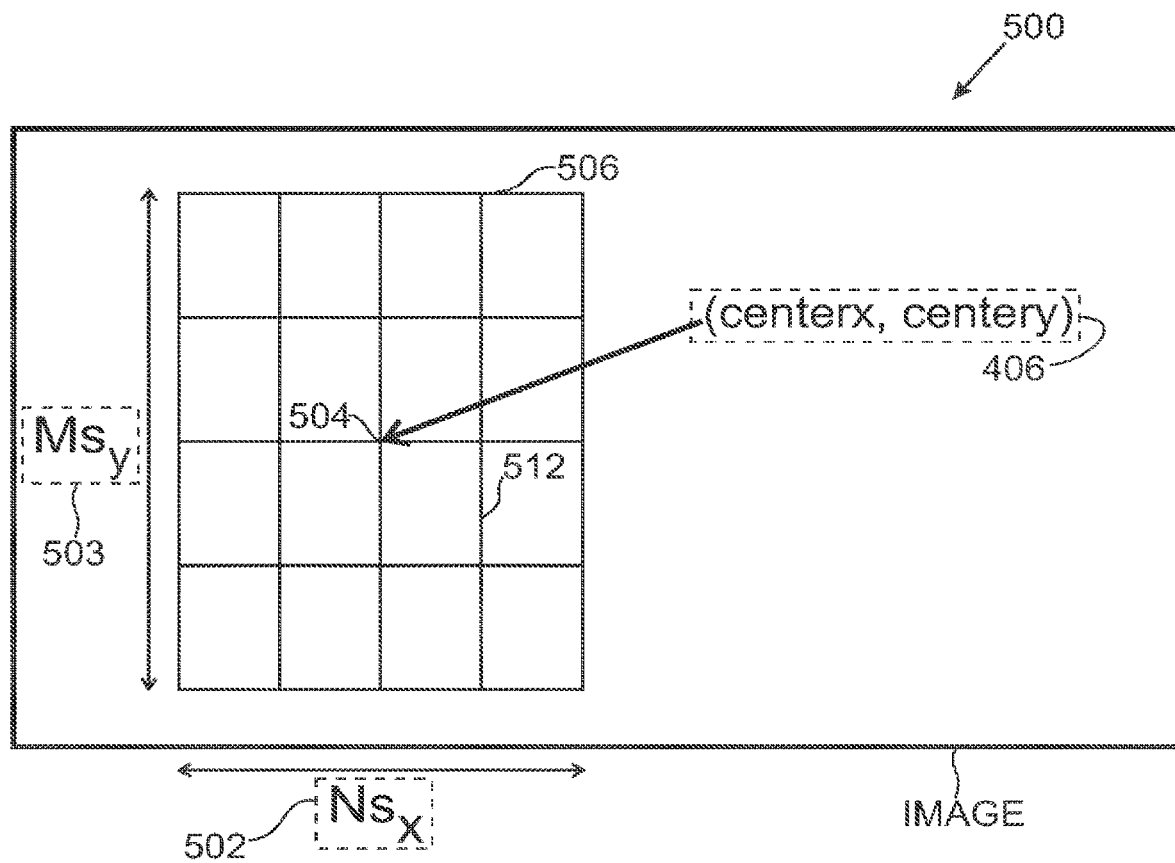
FIG. 5A illustrates an exemplary rectangular descriptor box and coordinates for use in generating a global descriptor in accordance with the present invention.

The step 310 for describing the detected audio and video features includes generating a global descriptor. FIG. 5A illustrates an exemplary rectangular descriptor box and coordinates 500 for use in generating a global descriptor 500 in accordance with the present invention. Other aspects and further details regarding descriptors, such as a phase descriptor, may be found in U.S. application Ser. No. 12/612,729 filed Nov. 5, 2009 entitled "Digital Video Content Fingerprinting Based on Scale Invariant Interest Region Detection with an Array of Anisotropic Filters", FIGS. 9, 10, and 11 and pages 26-28, 38, and 39.

Figure 5B:
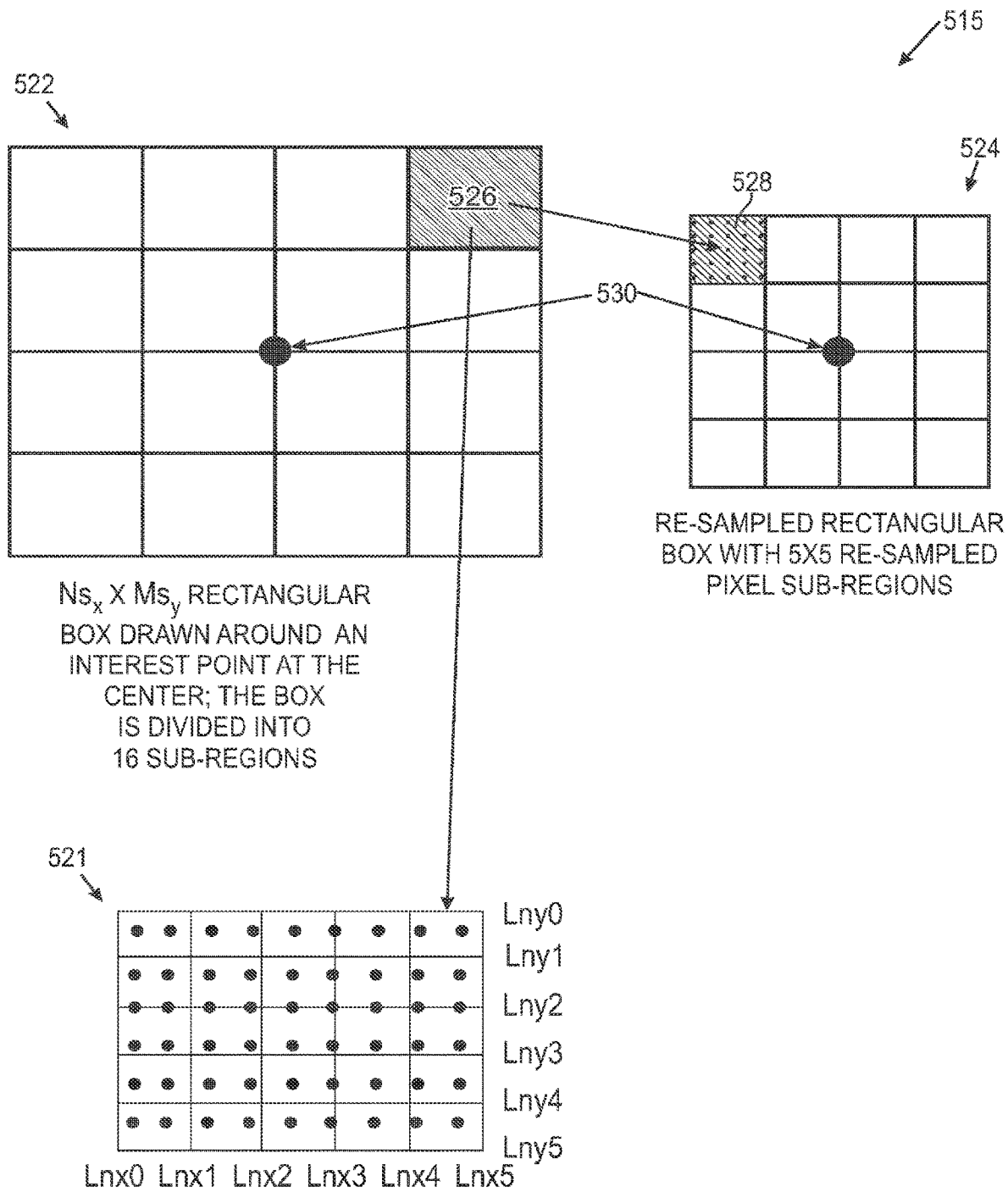
FIG. 5B illustrates an exemplary resampled rectangular descriptor box for use in generating a global descriptor in accordance with an embodiment of the present invention.

The detecting audio and video features step 308 generates four output values which include (centerx, centery) coordinates 406, $s_x$ 407, and $s_y$ 408 which represent the center of an image blob 504 and a spatial extent of the blob. A rectangular box 506 is placed on the image blob with center at the blob (centerx, centery) coordinates 406 and spatial extent ($Ns_x$ 502, $Ms_y$ 503), where N and M are multiplication factors that determines the size of the neighborhood around the blob that the descriptor considers. This rectangular box 506 is subdivided into a Bx by By grid, with, for example, Bx=4 and By=4 providing a 4×4 grid to create Bx*By=16 blocks FIG. 5B illustrates an exemplary resampled rectangular descriptor box 515 for use in generating a global descriptor in accordance with an embodiment of the present invention. In FIG. 5B, an exemplary rectangular descriptor box 522 corresponding to 506 in FIG. 5A, is centered at an interest point 530, with Bx*By=16 sub-regions, where Bx and By both equal 4. In more detail and with specified feature parameters (centerx, centery, $s_x$, $s_y$) a rectangular descriptor box 522 is placed on the image with center at (x, y) interest point 530 and with spatial extent of $Ns_x$, $Ms_y$, where N and M are multiplication factors which determine the size of the neighborhood around the interest point under consideration. The rectangular descriptor box 522 is resampled to generate a resampled grid 524 with (Bx*By)(Rx*Ry), where Rx and Ry equal 5 in this example, pixel regions, such as region 528 for block 526. For each block, such as the block 526, a Rx*Ry pixel grid 521 with associated Rx*Ry re-sampled pixel values in region 528 is computed as follows. First, lines that define the Rx*Ry sub-grid are determined, where these lines are given with sub-pixel accuracy and are not necessarily aligned with the pixel boundaries 521. In the x direction, the lines evenly subdivide the block 521 horizontally and are named Lnx0, Lnx1, . . . , Lnx(Rx). Likewise, in the y direction, the lines evenly subdivide the block 521 vertically and are named Lny0, Lny1, . . . , Lny(Ry). The locations of the pixels contained within rectangle 521 are shown as dots. The pixels contained within each of the Rx*Ry sub-grid areas are combined to produce a resampled pixel. This is done by summing the intensity values and dividing by the number of pixels, within each of the Rx*Ry sub-grid areas, yielding Rx*Ry pixel intensity values. Note that there may be different number of pixels for some or all of the Rx*Ry sub-grid areas. There may also be no pixels in a Rx*Ry sub-grid area, in which case the resampled intensity value is taken as zero.

This Rx*Ry pixel sub-region, computed for each of the Bx*By blocks of the rectangular box drawn around an interest point, is subsequently used to generate a descriptor and, based on this descriptor, a signature for that interest point.

Figure 6:
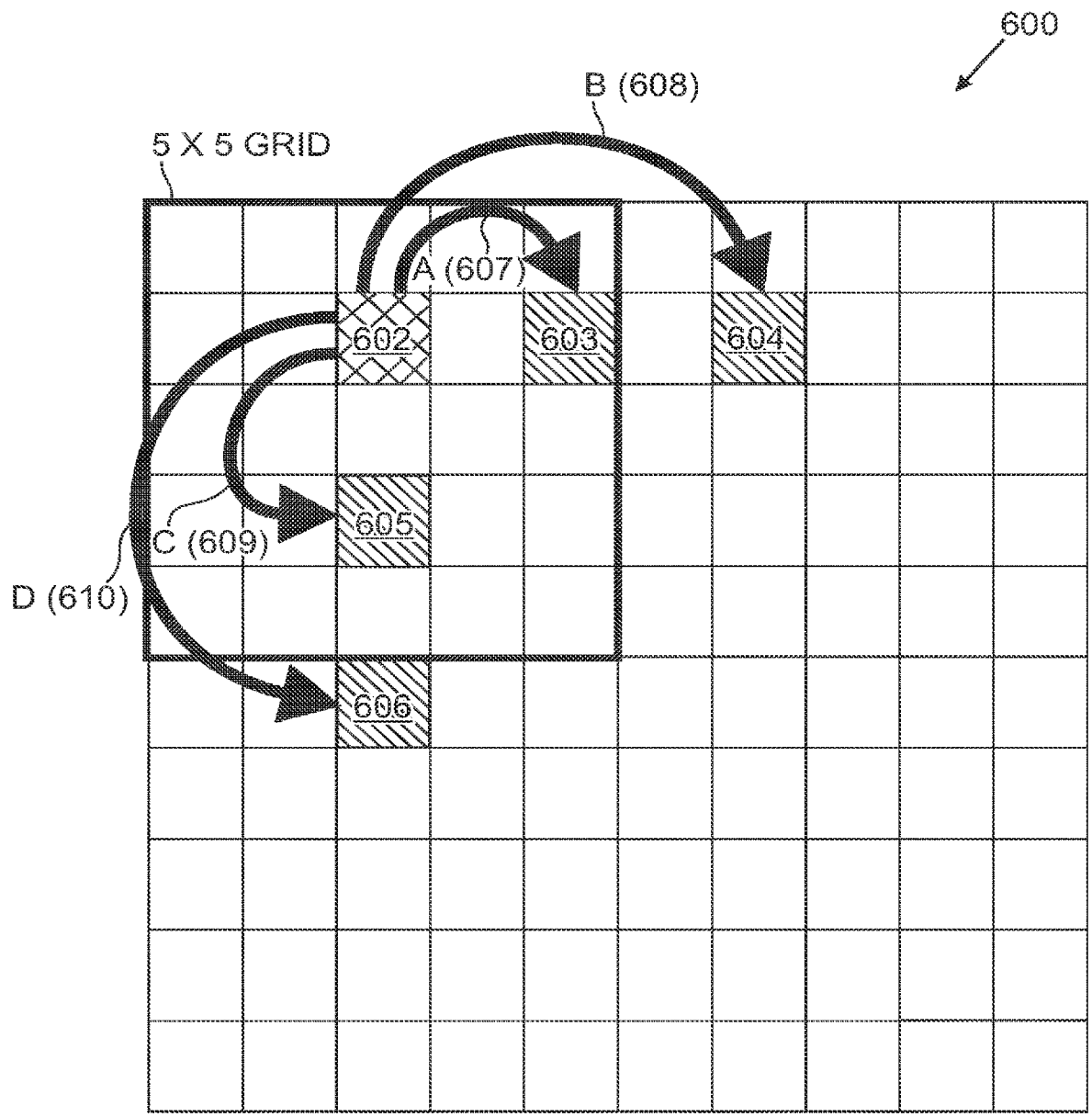
FIG. 6 illustrates aspects of a global descriptor gradient computation process in accordance with the present invention.

FIG. 6 illustrates aspects of a global descriptor gradient computation process 600 in accordance with the present invention. Each Rx*Ry pixel grid that is computed for each of the Bx*By blocks is used to generate 4 values. These values are "global gradient" values computed according to the following procedure. For each pixel in an Rx*Ry grid, the differences from a pixel to several other pixels are computed. FIG. 6 illustrates the pixels on which these differences are taken, for example, from the reference pixel 602, to the target pixels 603, 604, 605 and 606. These target pixels may be chosen arbitrarily. In this example, they have been chosen to be to the right 2 pixels and 4 pixels, as well as down 2 pixels and 4 pixels. Other pixel positions are also possible. Based on these pixels, four difference values are computed, including difference A 607 computed between pixel 603 and pixel 602, difference B 608 computed between pixel 604 and pixel 602, difference C 609 computed between pixel 605 and pixel 602, difference D 610 computed between pixel 606 and pixel 602. Pixels, such as pixels 604 and 606, might not exist in a particular Rx*Ry pixel grid for pixels near to the right or bottom borders, so such pixels will access the appropriate pixel in a neighboring Rx*Ry pixels grid. If a bordering Rx*Ry pixel grid does not exist, an additional block or blocks might need to be computed along the right and bottom borders of the rectangular box 506. This means, for instance, that instead of a Bx by By grid computed, a (Bx+1) by (By+1) grid is computed, with reference pixels within the original Bx by By grid and target pixels potentially accessing the larger (Bx+1) by (By+1) grid.

These difference values are combined into one or more values, using a weighted average of the values. For example, an "x-gradient" is computed as the weighted sum of A and B, $$xgrad = w_1 * A + w_2 * B,$$

and, similarly, a "y-gradient" is computed as the weighted sum of C and D, $$ygrad = w_3 * C + w_4 * D.$$

The weights, $w_1$ to $w_4$, may depend on many factors, but in one embodiment, they depend on an agreement of signs of the difference values A and B, and C and D. For instance, if A and B are of the same sign, then $w_1=1.1$ and $w_2=0.2$, whereas if A and B are of different values, then $w_1=1.2$ and $w_2=0.0$. Different weights can be used for the x and y directions. The weights can also depend on decision factors other than the agreement of signs.

For example, an xgrad value and a ygrad value may be computed for each of the pixels associated with the Rx*Ry pixel grid 521. From this set of values, four sums are computed as global gradient values:

1. −1*sum of xgrad for each pixel, where xgrad is negative
2. sum of xgrad for each pixel, where xgrad is positive
3. −1*sum of ygrad for each pixel, where ygrad is negative
4. sum of ygrad for each pixel, where ygrad is positive In total, a descriptor for the rectangular box 506 consists of 4*Bx*By values that is a concatenation of the 4 "global gradient" values for each of the Bx*By blocks covered by the descriptor. By design, these values are all positive. For example, for global gradient values 1 and 3 in the above list, the sums are of negative values, to produce a negative sum, which is made positive by multiplying by −1 and for global gradient values 2 and 4, the sums are of positive values, producing a positive sum.

Some image distortions may cause the feature detection algorithm to have errors in the detected scale values or location. If the error is large enough, this might result in differences in the descriptor, and subsequently in the signature, that are too large for matching to work correctly. To improve the chances of matching, that is, make the fingerprint more robust with respect to certain image distortions, the following embodiment of generating multiple different descriptors based on the same detected feature may be used. These multiple descriptors may be generated, for example, by perturbing the scale value and/or the location value. For example, the scalex multiplication factor, such as N of FIG. 5A, or the scaley multiplication factor, such as M of FIG. 5A, or both are adjusted to account for an expected error margin of +/−D %, wherein D % represents effects of image distortions.

Figure 7:
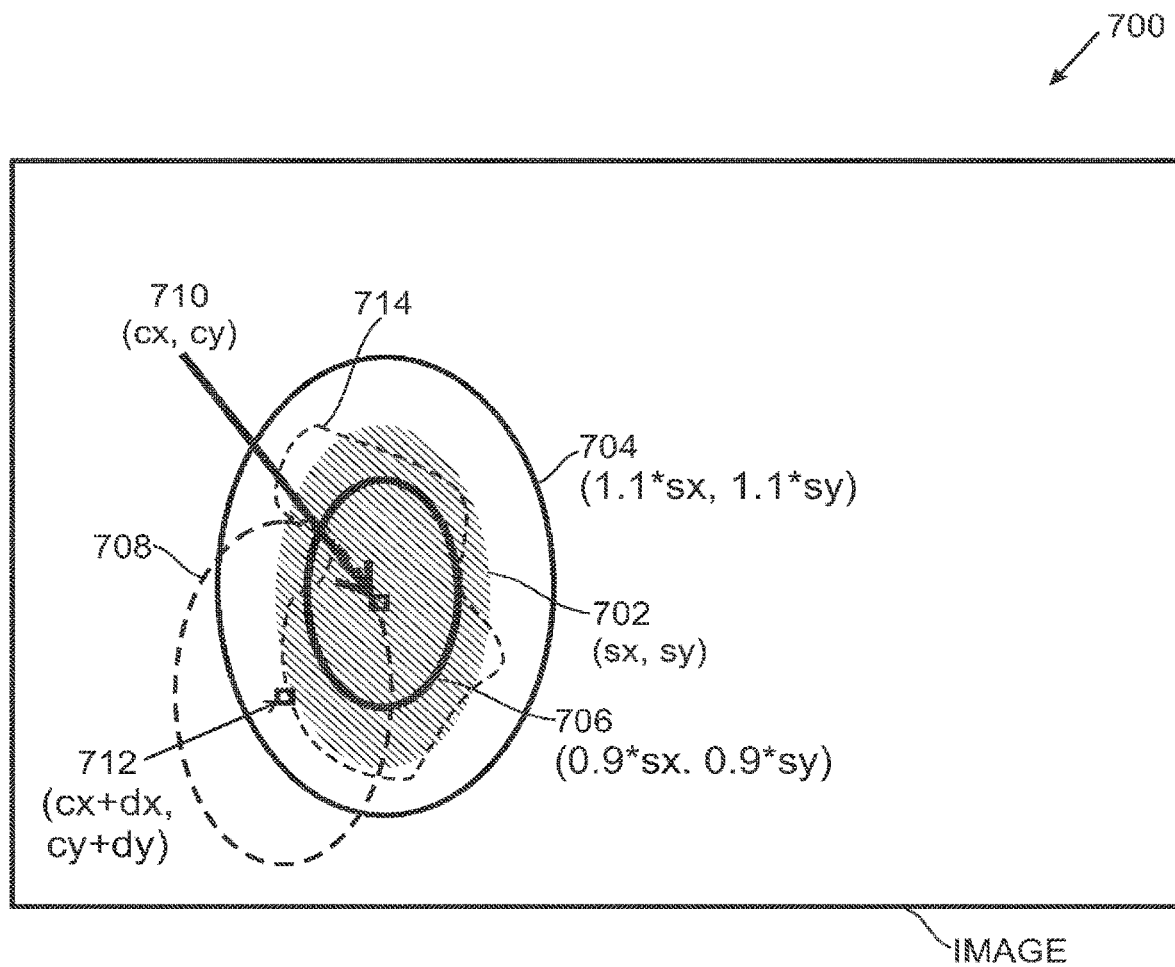
FIG. 7 illustrates multiple robust descriptors in accordance with the present invention.

FIG. 7 shows an image feature 714, which could be a contiguous area of near-constant colored pixel that is, for instance, a human face, or part of a picture on a wall. This is detected as a blob at location (cx,cy) 710 and scale (sx,sy) represented by ellipse 702. These location and scale values are used in the global descriptor generation procedure previously described above. FIG. 7 shows that two additional descriptors may be generated by first multiplying the scale by 0.9 and 1.1 to generate the representative ellipses 706 and 704, respectively. For these two descriptors, the location is kept constant and the scale is perturbed by the 0.9 and 1.1 multipliers. Alternatively, the scale may be kept constant and the location is moved by a delta amount in the x and y directions (dx,dy) to move the representative ellipse 702 to a new center location (cx+dx,cy+dy) 712 with representative ellipse 708. An additional descriptor for the representative ellipse 708 may be generated using this new center location.

In addition, these multiple descriptors can be generated either for reference clips, the reference side, or for query clips, the query side, or both. By increasing the number of descriptors on either the reference side or the query side the chances of detecting a match are improved, as long as the multiple descriptors cover the errors in the feature detection. Using multiple descriptors on both the reference side and query side tends to further improve the chances for matching. While some multimedia content may experience an increase in the number of false matches with use of multiple descriptors, generally the use of multiple descriptors improves the chances of detecting matches. Using multiple descriptors on the reference side increases the size of the reference database, while using multiple descriptors on the query side increases the query fingerprint size. While the use of multiple descriptors on both the reference side and the query side may lower the search speed, detecting matches is generally improved. In one approach, these increases may be compensated through use of parallel processing techniques.

The technique of generating multiple descriptors is applicable to other descriptor generation procedures, in addition to the global descriptor procedure described above. A descriptor generation procedure that takes as input a scale-space feature with a specified location and scale, generating a compact N dimension vector for a rectangular area of pixels, may also be used.

To enable efficient search capabilities, the descriptors are processed to generate a compact representation that is referred to as a signature. These signatures are implemented as bit vectors. In one embodiment, each dimension of an M-dimensional descriptor generates a single bit in an output signature. For example, a 64-bit signature would be generated for a 64-dimensional descriptor. In other embodiments, two or more bits may be used per dimension of the descriptor. A traversal hash signature is generated to facilitate a fast lookup mechanism. In one embodiment, multiple dimensions of the M-dimensional descriptor are combined to generate a single bit in the traversal hash signature. In other embodiments, multiple dimensions of the M-dimensional descriptor are combined to generate multiple bits in the traversal hash signature.

The signature bits are produced by quantizing each dimension of the descriptor independently. First, the descriptor is normalized in some way, such as made into a unit norm. For example, a unit norm vector may be generated by dividing each component of the vector by the square root of the sum of the squares of each component, using a technique commonly referred to as the L2-norm. For a one-bit-per-dimension signature, the value of each dimension of the normalized descriptor is compared against a pre-specified threshold value. The resulting bits in the signature represent whether the descriptor dimension is above (1) or below (0) the threshold. In another embodiment, which may be more efficient, the descriptor is not normalized, but rather the threshold is scaled according to an L2-norm of the descriptor. In yet another embodiment, the threshold may be simply set to an average value of all the components of the descriptor.

Figure 8A:
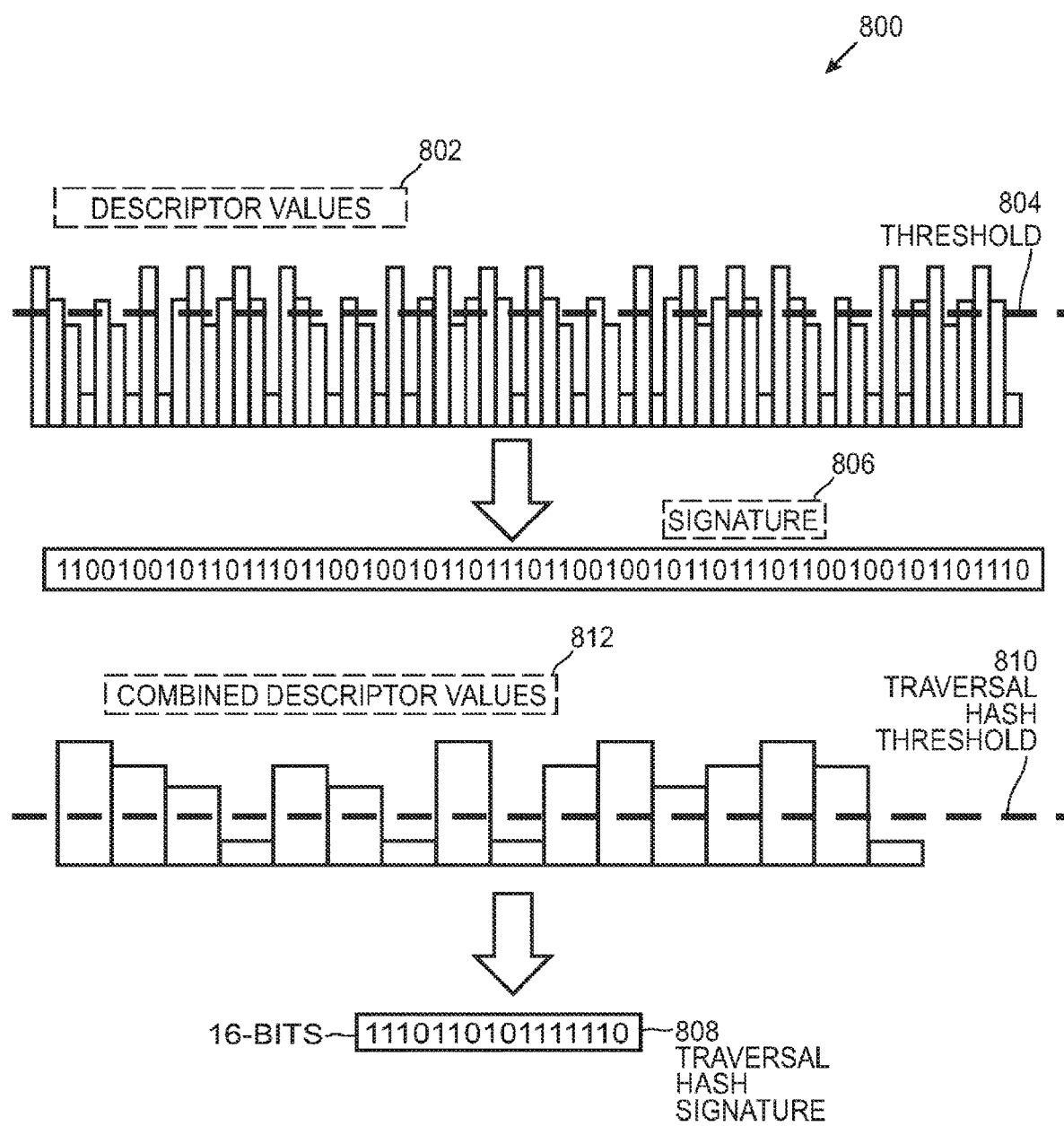
FIG. 8A illustrates an exemplary signature generation process in accordance with the present invention.

FIG. 8A illustrates an exemplary signature generation process 800 in accordance with the present invention. All positive global descriptor values 802 are shown as vertical bars with a threshold 804 shown as a dashed line. The threshold 804 is either set according to prior empirical data or determined by the descriptor values. Descriptor values greater than the threshold 804 produce a '1' and less than or equal to the threshold 804 produce a '0' generating signature 806.

Choosing the threshold 804 may be done empirically. The goal is to generate unique signatures, which are more likely unique when the numbers of ones and zeros are approximately equal. A threshold that is set too high may generate signatures that are mostly zeros, whereas a threshold that is set too low may generate signatures that are mostly ones. The threshold should be chosen so as to avoid either extreme.

In order to facilitate fast search, a mechanism to search over only a small part of the database is required. We enable this by generating a shorter signature, which acts as a direct hash value for the primary signature. This shorter signature is termed a "traversal hash signature" and is associated with a set of signatures that tend to be similar to one another. The traversal hash signature may also be generated at the same time as the primary signature. For example, for a 64-dimensional descriptor, in addition to a 64-bit signature, such as signature 806, an H-bit traversal hash signature 808 may be generated, where H<64. This traversal hash signature 808 may be based on combining the values of various dimensions into a single combined value and then, similar to the signature generation process, thresholding the combined values with a traversal hash threshold 810. For example with H=16, the values of the dimensions in groups of four are combined by either taking the sum of the four values, the average of the four values, or the sum of the square of the four values. For the global descriptor values 802, a meaningful group of four is the four values for a block which when combined produce the combined descriptor values 812. For rectangular blocks, such as the rectangular block 506, there are 16 blocks with each block corresponding to one bit in the traversal hash signature 808.

A traversal hash signature may be augmented with additional bits that relate to an underlying feature, or perhaps to another description of the image data. For an underlying feature, additional bits may be added that identify the spatial location of the underlying feature, the scale of the underlying feature, or the peak polarity of the underlying feature. For example, the spatial location of the underlying feature may be described by two bits representing the quadrant where the center of the underlying feature is located. A quadrant may be indicated by having one bit indicate top or bottom half and the other bit indicate left or right, such that the quadrant is identified with the two bits. The scale of the feature may be quantized to either one or two bits, by setting one or more thresholds.

Figure 8B:
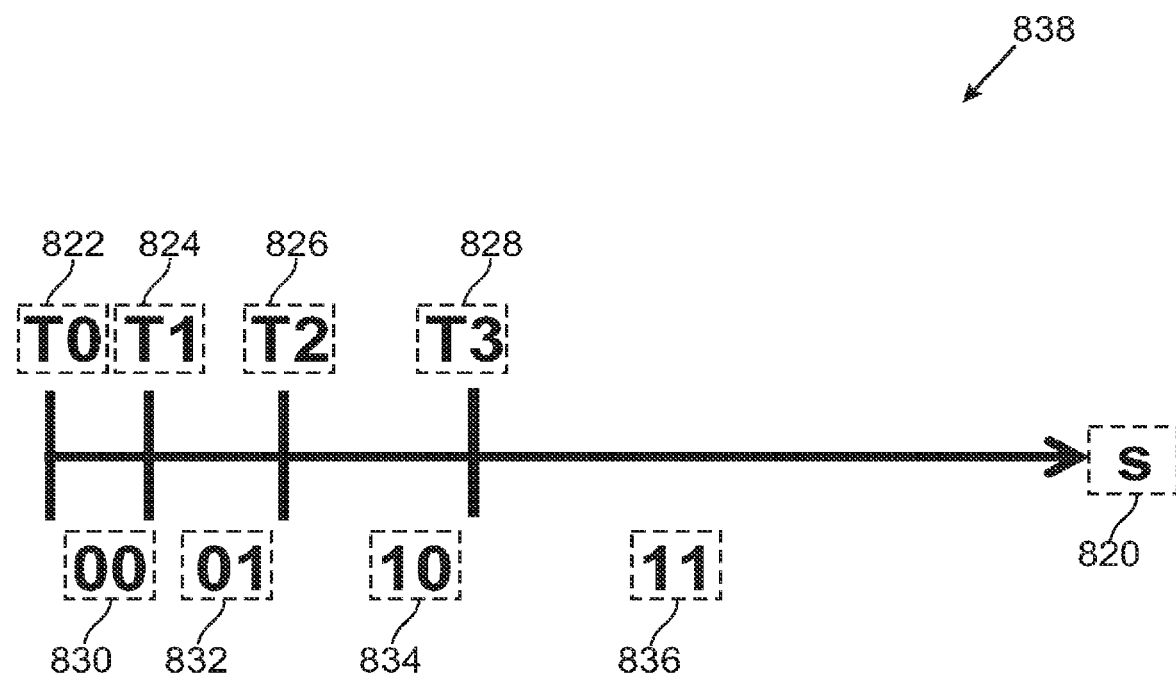
FIG. 8B illustrates a threshold scale used in a procedure to augment a traversal hash signature in accordance with the present invention.

FIG. 8B illustrates a threshold scale 838 used in a procedure to augment a traversal hash signature in accordance with the present invention. From the scale values sx and sy, a normalized scale value s may be computed according to the equation: $s=sqrt(sx*sx+sy*sy)$, represented on the threshold scale 838 as a value on a linear scale s 820. This is evaluated against multiple thresholds. If s is between thresholds T0 822 and T1 824, with threshold T0 822 inclusive, then the scale hash bits are set to "00" 830; if s is between thresholds T1 824 and T2 826, with threshold T1 824 inclusive, then the scale hash bits are set to "01" 832; if s is between thresholds T2 826 and T3 828, with threshold T2 826 inclusive, then the scale hash bits are set to "10" 834; if s is greater than or equal to threshold T3 828, then the scale hash bits are set to "11" 836. The peak polarity of the underlying feature may be indicated by the feature detection algorithm which indicates whether a feature based on a contrast polarity threshold is a light coloring on a dark background or vice-versa using one bit to represent this characteristic.

The additional bits to augment the traversal hash signature may be based on other descriptors of image data or other data, such as texture or motion. For example, an intensity histogram may be derived for the pixel area 506 in FIG. 5A corresponding to the feature. The intensity histogram may be heavily quantized to produce a small number of bits. Another approach would be to use motion analysis to indicate whether a blob is moving from frame to frame. One bit can indicate whether there is motion or not. The approximate direction of motion may also be quantized to a small number of bits.

The overall hash traversal hash signature is a concatenation of the traversal hash signature generated by appropriately combining and thresholding the descriptor, as illustrated in FIG. 8A, with additional bits generated from scale, as illustrated in FIG. 8B, x/y, peak polarity, or the like.

An advantageous feature of the present invention is the ability to select signatures for inclusion in the fingerprint database and eliminate certain signatures that do not improve identification accuracy and lead to false positives. Various criteria, such as the distribution of ones and zeros in the primary signature and the traversal hash signature, are used to determine whether a signature should be included in the database. Good signature selection may reduce the size of the fingerprint database, reduce the false positive rate and improve or maintain the overall accuracy. In a similar manner, the number of signatures produced for a query multimedia clip may be reduced. As described in more detail below, these advantageous features may be achieved by examining both the signatures and descriptors, individually and in aggregate. This examination is based on multiple criteria, such as descriptor information, signature information, temporal robustness, and spatial diversity.

Figure 8C:
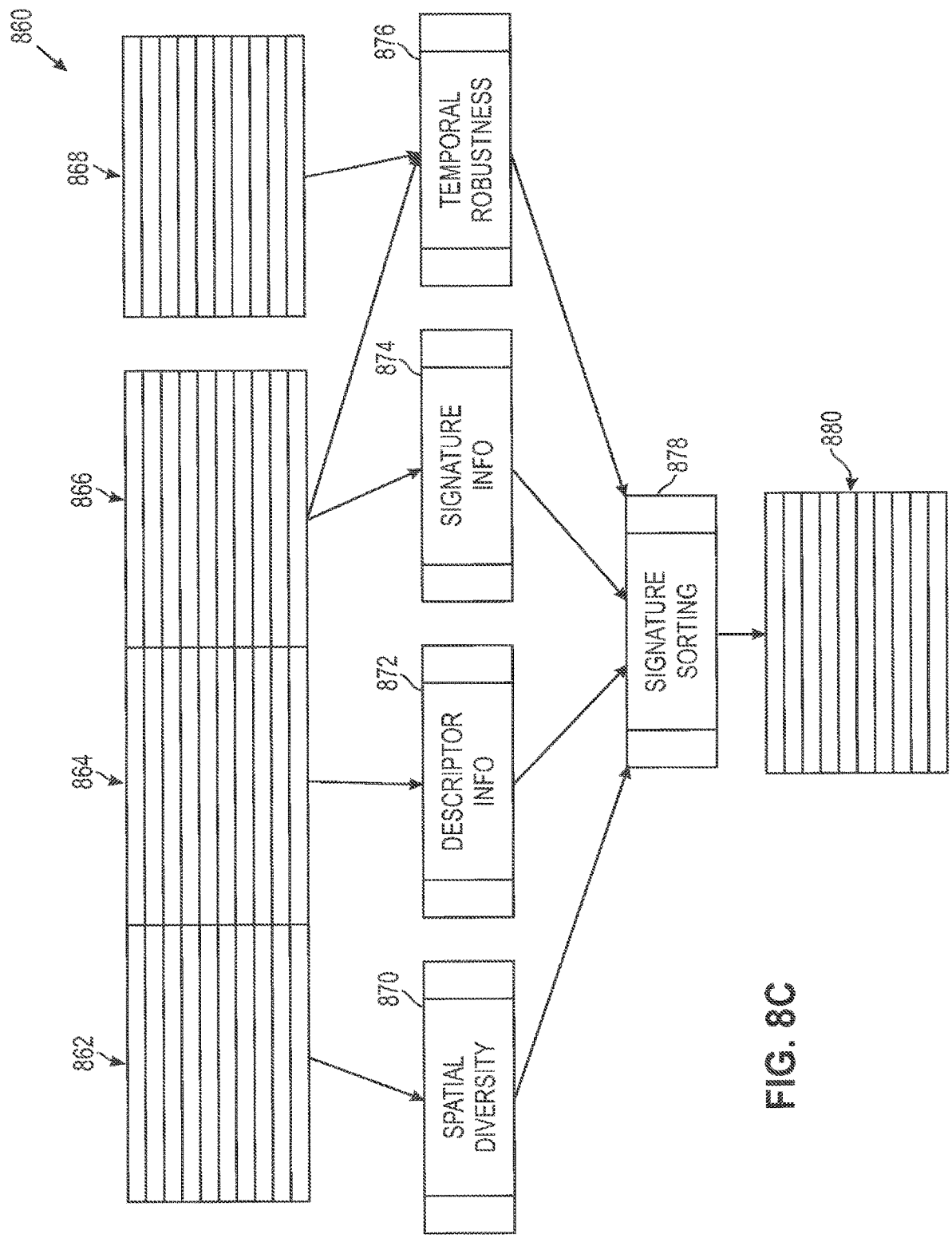
FIG. 8C illustrates a signature selection procedure which selects signatures for a particular frame of video in accordance with the present invention.

FIG. 8C illustrates a signature selection procedure 860 which selects signatures for a particular frame of video in accordance with the present invention. The inputs for a frame of video are a set of signatures and associated traversal hash signatures 866, a set of descriptors 864 associated with the set of signatures 866 for the frame, a set of scalex, scaley, centerx, centery values 862 associated with the set of signatures 866; and sets of signatures and associated traversal hash signatures 868 for a previous frame. For each signature in the set 866, there is a corresponding descriptor in the set 864 from which the signature is derived, as well as a corresponding set of scale and location values in the set 862, from which the descriptor is derived. The sets of signatures 868 do not necessarily have any correspondence to the signatures in the set 866. Various computations described below are performed based on the inputs above.

For each descriptor in the set 864, descriptor information 872 is computed. The descriptor information 872 is associated with the corresponding signature. Descriptor information may include a sum of the descriptor values after normalization to unit norm. Descriptors that tend to produce false positives have energy concentrated in only a few dimensions and hence have a lower "descriptor information" value. As an example, this tends to happen, for instance, where a descriptor pixel region of interest contains a bright blob on a dark background of constant intensity. Such regions of interest can be confused with other regions with similar characteristics and lead to false matches. These regions of interest lead to descriptors with energy concentrated in a few dimensions, with those dimensions corresponding to the blob center.

For each primary signature in the set 866, signature information 874 is computed. The signature information 874 is associated with the corresponding signature. Signature information may include a count of the number of 1's in a signature. Signatures that tend to produce false positives have only a few bits turned on and hence have lower "signature information" value. This tends to happen for the same reasons as the descriptor. While "signature information" and "descriptor information" are related, their thresholds can be picked independently to provide more flexibility.

Figure 8D:
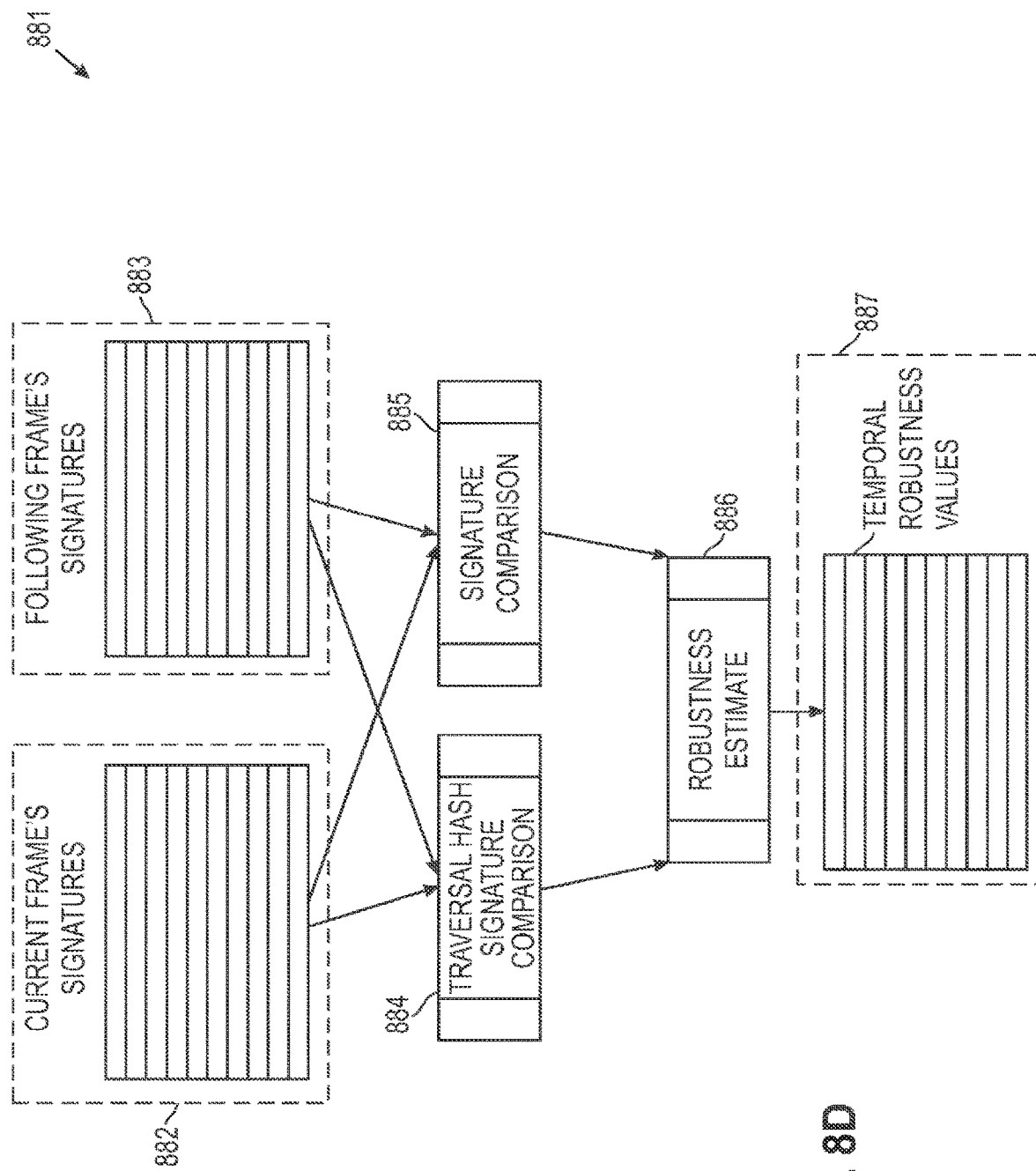
FIG. 8D illustrates a procedure to generate the temporal robustness estimate in accordance with the present invention.

For each signature in the set 866, a temporal robustness value 876 is computed, using the sets of signatures 868. The computed temporal robustness value 876 is associated with the corresponding signature in the set 866. Temporal robustness may include a measure of whether a feature appears in a following frame. The frame lag between a frame under consideration and the following frame may be one frame, the immediately following frame, or more than one frame. An estimate is generated to indicate whether a feature appears in a following frame based solely on the signature and traversal hash signature. FIG. 8D illustrates a procedure 881 to generate the temporal robustness estimate in accordance with the present invention. A set of signatures and traversal hash signatures for the current frame 882, is compared against all signatures and traversal hash signatures from following frame 883 by computing the bit distance between the respective signatures in traversal hash signature comparison computation 884 and the bit distance between the respective signatures in signature comparison computation 885. The bit distances are computed for each signature in 882, and the bit distances are compared against a robustness estimate threshold computation 886 to produces a set of temporal robustness values 887, one value corresponding to each signature in 882. Specifically, a signature is considered "temporally robust" if there exists at least one pair of signature and traversal hash signature found in the traversal hash signature comparison computation 884 and in the signature comparison computation 885 with a signature bit distance≤R and a traversal signature bit distance≤Q. The values R and Q are integer-valued parameters that can be specified. In one embodiment, a temporal robustness value is either 0 or 1, based on whether the signature is "temporally robust".

For each feature scale and location value in the set 862 in FIG. 8C, a spatial diversity value 870 is computed by comparing its own value against the entire list of feature scale and location values in the set 862. The computed spatial diversity value 870 is associated with the corresponding signature. Spatial diversity may include a measure of whether a feature is located close to other features. For example, the distance between any pair of feature locations can be computed for the set 862, and used to compute the average distance between a feature center location and the M near features' center locations, where M may be pre-specified. This average distance, or "closeness" indicates the density of features in terms of location. Ideally, the features would be spread out and those features that are concentrated too close together would be penalized. By incorporating this "closeness" criterion, features that are spread out are preferred, according to a procedure described in more detail below.

Each signature in the set 866 is now associated with the results of the computations in blocks 870, 872, 874, and 876. The results are input to the signature sorting and selection block 878. Signatures that fail to meet some minimum level of criteria are eliminated. For descriptor information, a minimum threshold may be used. Likewise, for signature information, another minimum threshold may be used. For temporal robustness, Q and R bit distance parameters may be set, and signatures that are not considered temporally robust according to this criterion are eliminated. Similarly, for spatial diversity, a threshold can be established for "closeness", and signatures that are too close based on this threshold are eliminated.

Signatures may also be sorted, for example, according to the descriptor information, the signature information and the spatial diversity, descending, in that order. The sorting provides a list of signatures in approximate order of strength. Then, all but the T top signatures are eliminated, where T is a parameter that can be pre-specified. The result is a set of signatures 880 that satisfy the minimum criteria and/or are the top T signature according to some criteria.

The selected signatures including the signature and traversal hash signature pairs are stored along with associated metadata such as multimedia id, playout timestamp, and scale, and x and y location values to create a signature record that is inserted into the reference signature database. The signature database consists of the set of all signature records for all corresponding reference multimedia along with two indices that are used for different types of access of the signature records. These indices are a hash signature index and an index based on the multimedia id and playout timestamp. There may be a single set of signature records pointed to by both indices, or two sets of signature records, with identical data, for example, one for each index.

Figure 9A:
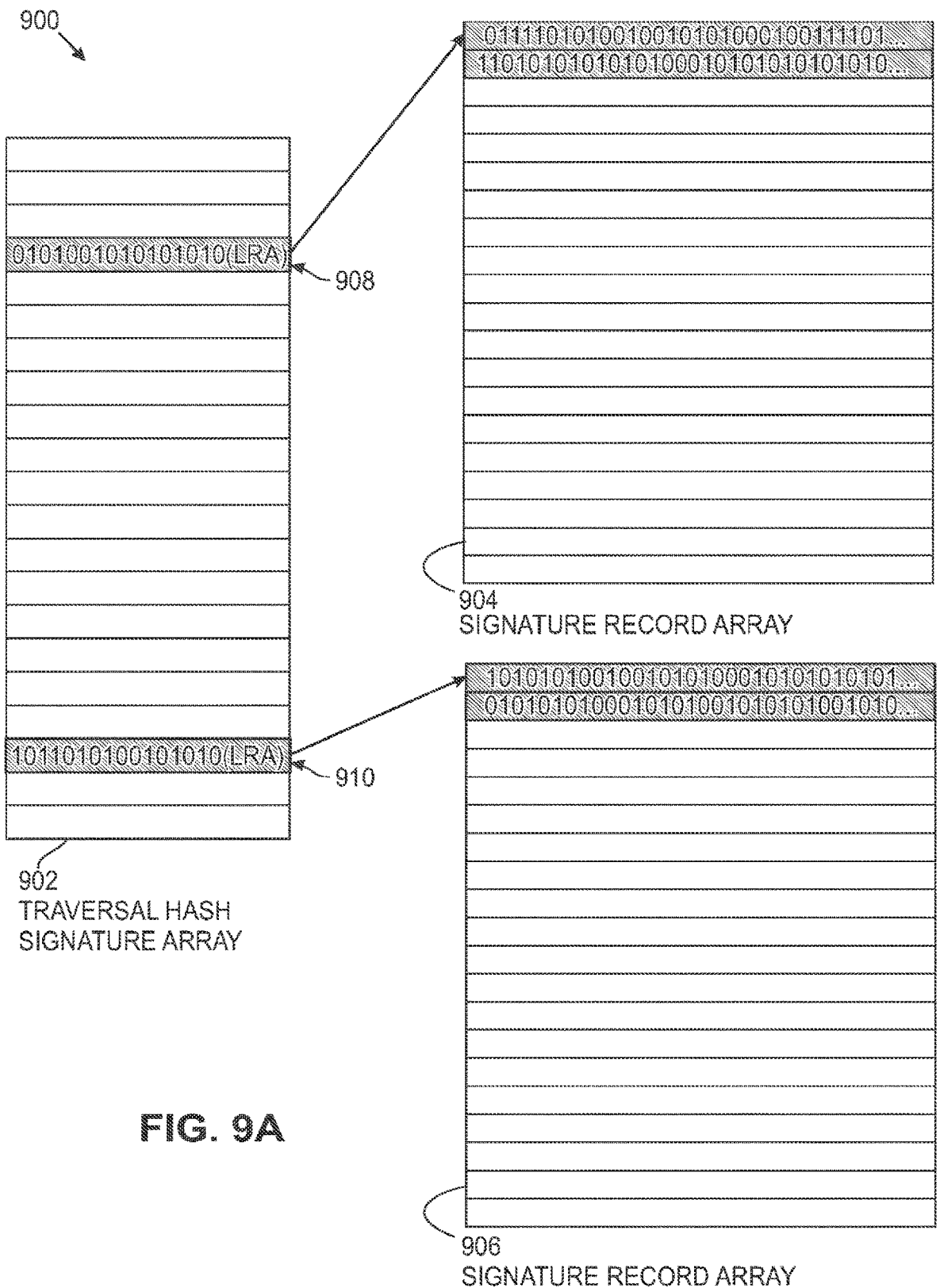
FIG. 9A illustrates an exemplary signature database organized by a primary hash signature index in accordance with the present invention.

FIG. 9A illustrates an exemplary signature database 900 organized by a primary hash signature index in accordance with the present invention. The signature records for all the multimedia content that is to be put into the database is collected together and grouped by the traversal hash signature. At this stage of processing, the number of signatures that belong to particular traversal hash signature is known so the memory for the signature records can be allocated and signature records may be stored in memory. It is advantageous for search operations that the signature records for a particular traversal hash signature be stored contiguously. The set of signatures belonging to a traversal hash signature is called a cluster. For example, 100 signatures and corresponding traversal hash signatures may be generated having 50 signatures with a traversal hash signature A, 30 signatures with a traversal hash signature B and 20 signatures with a traversal hash signature C. Thus, the 100 signatures are organized into three clusters, cluster A with 50 signatures, cluster B with 30 signatures and cluster C with 20 signatures, that are stored in memory.

For each traversal hash signature, the number of signatures and a pointer to the location where the corresponding signature records begin is stored for processing. Since the space of traversal hash signatures may be relatively small, for example, a 16-bit traversal hash signature implies a maximum 65,536 entries, all possible traversal hash signatures can be indexed in an array. A traversal hash signature array 902 is shown in FIG. 9A storing one element for each possible traversal hash signature. The index into the traversal hash signature array 902 is the integer interpretation of the traversal hash signature as a binary number. Thus, given a traversal hash signature, direct addressing into the array retrieves the number of matching signatures and where corresponding signature records are located, such as a link reference to a list of signature records 904 or 906. In FIG. 9A, for example, traversal hash signature "0101001010101010" is located at entry 908, which links to the array of signature records 904, and traversal hash signature "1011010100101010" is located at entry 910, which links to the array of signature records 906. Each entry in traversal hash signature array 902, such as entries 908 and 910, have an additional field included in the entry that stores the link reference address (LRA) to a signature record array, such as signature record arrays 904 and 906.

Figure 9B:
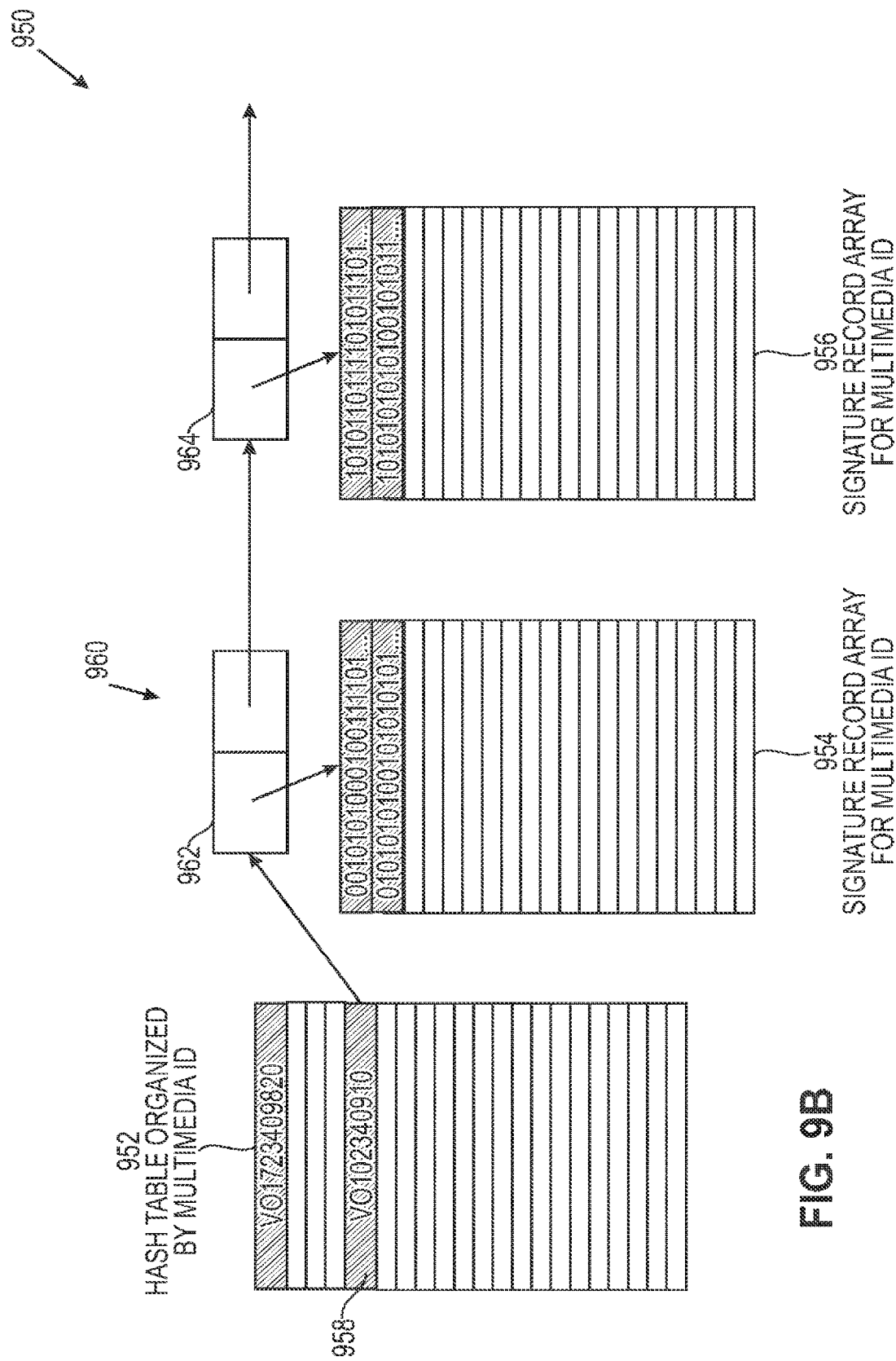
FIG. 9B illustrates an exemplary signature database organized by secondary index in accordance with the present invention.

FIG. 9B illustrates an exemplary signature database 950 organized by secondary index in accordance with the present invention. The secondary index supports accesses of the signature records corresponding to a multimedia id, from a starting playout time to an ending playout time. The secondary index is useful for the signature correlation process, discussed in more detail below. The secondary index is based on a hash table 952 organized by multimedia id. For example, a hash table entry 958 corresponding to multimedia id "vo102340910" points to a linked list 960. Each entry in the linked list, for example, 962 and 964, points to an array of signature records, for example, 954 and 956. The signature records are stored in playout timestamp order within each array, and the linked list is organized with arrays in playout timestamp order. Alternatively, instead of 954 and 956 representing an array of signature records, they may represent an array of pointers to signature records, already stored according to the primary index. Hence, the secondary index does not store the signature records again, but rather points to the signature records of the first index. This is the case where both indices shared a common set of signature records, as mentioned above. Such an alternative approach can be more space efficient, but may be slower to access due to signatures that are randomly distributed relative to the second index.

The secondary index allows for searches such as 'all reference signatures for multimedia id "vo102340910" between time period 817000 milliseconds and 1048500 milliseconds'. In this case, the entry 958 corresponding to "vo102340910" is first accessed, retrieving the linked list 960, starting with the linked list entry 962. The array of signatures 954 can be examined as to whether the time period 817000 to 1048500 milliseconds is contained. Any matching signatures are returned. The subsequent entries on the linked list, for instance 964, are processed, until there are no more entries, to ensure that all matching signatures within the time period are retrieved. This search can be made faster by keeping the starting and end timestamp of an array of signatures within the corresponding linked list entry itself, so that the signatures themselves do not need to be accessed unnecessarily. Also, the requested signature record for the desired starting timestamp is found by binary search through the array. From there, signature records in the array are processed linearly until the desired ending timestamp is reached.

The video database structure may be stored either in the local computer's main memory (its RAM) or on a hard disk drive. One embodiment is to store the signature database in main memory as access speeds are significantly faster. The trade-off is the smaller capacity of main memory versus the hard drive.

A query multimedia clip is processed to generate signatures as described above and using the process of similarity search against a reference database, the most likely candidate clips may be identified. The beginning step in a similarity search is to find all near-matching signature records in the video database for a query multimedia clip. The similarity search process begins with generating signature and traversal hash signature pairs for the query multimedia clip. A playout timestamp is also associated with each signature and traversal hash signature pair. The traversal hash signature is used to dramatically speed up this portion of the search. The result of this initial search is a list of matching signatures and their associated metadata called the candidate list. In a following step, the number of times a multimedia clip appears in the candidate list is counted to generate a frequency list of multimedia clip identifications (ids), which is then sorted from most frequent to least frequent. The most frequent clip ids on this list are the likely matching multimedia clips. In a correlation step, the top matching multimedia clips are analyzed to find the closest matching clip. In the correlation step, signatures of the top matching clips are used instead of matching traversal hash signatures, and a score is computed based on the amount of signature bit error. This score is compared against prespecified thresholds to decide whether the corresponding multimedia clip is a good match to the query clip. Thus, one or more closest matching multimedia clips from the reference database may be chosen for presentation as a result of the search.

Figure 10:
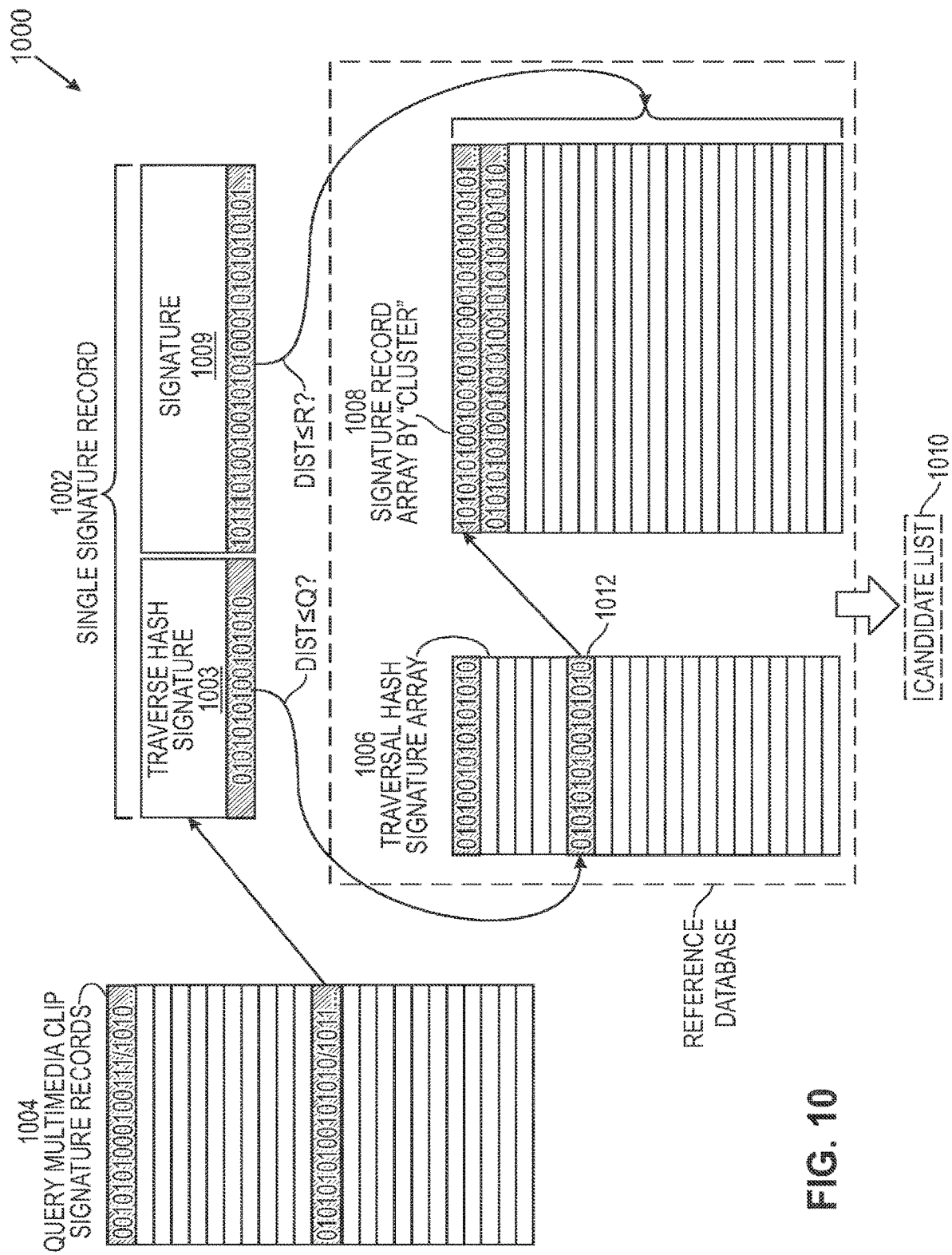
FIG. 10 illustrates an exemplary similarity search process in accordance with the present invention.

FIG. 10 illustrates an exemplary similarity search process 1000 in accordance with the present invention. For each signature and traversal hash signature pair 1002 in a list of query signatures 1004, a similarity search is performed given the parameters of signature distance R and traversal hash signature distance Q. A traversal hash signature distance of Q=0 means that only an exact match of the traversal hash signature is allowed, thus only a single cluster needs to be searched, which is one of the embodiments of the present invention. A traversal hash signature distance of Q=1 means that traversal hash signatures which are a maximum of 1 bit distance from the specified traversal hash signature are searched. For an K-bit hash signature, this would mean that a total of K+1 clusters need to be searched including the original cluster, as well as the K clusters that correspond to exactly one of the bits flipped and all other bits unchanged. The number of clusters needed to be searched increases exponentially with Q.

In the case of Q=0, the traversal hash signature "0101010100101010" 1003 in the signature and traversal hash signature pair 1002 obtained from the list of query signatures 1004 is used to look up entry 1012 in the traversal hash signature array 1006 and obtain a set of corresponding signature records 1008. This set contains the potentially matching signatures with the same traversal hash signature. The query signature 1009, shown as 31 bits of a 64 bit query signature "1011101001001010100010101010101 . . . " in the pair 1002 is now compared with each signature in the set 1008. Specifically, the distance between the query signature and each signature in the set to be compared, is computed. This computation may be made more efficient by using bit operands and a bit-count lookup table. The Hamming or bit distance between two 64-bit numbers can be computed by performing an XOR on the two numbers and then count the number of 1's in the result. The counting step may be implemented with a lookup table that maps an 8-bit or 16-bit number to the number of 1's contained. The number of one's in the result of the XOR is then the sum of the lookup table results for all of the 8-bit or 16-bit chunks contained in that XOR result. If the distance computed is less than or equal to the specified signature distance R, then this signature record is inserted into a candidate list 1010.

An entry in the candidate list 1010 consists of a query clip timestamp, a matching database clip multimedia id, a matching database clip timestamp, and a signature bit distance. For each signature and traversal hash signature pair, several entries may be added to the candidate list 1010. Similarity search is repeated for each signature and traversal hash signature pair 1002 in the list of query signature records 1004 corresponding to the query multimedia clip. Depending on the length of the query clip, the candidate list 1010 may have hundreds or thousands of entries.

Figure 11:
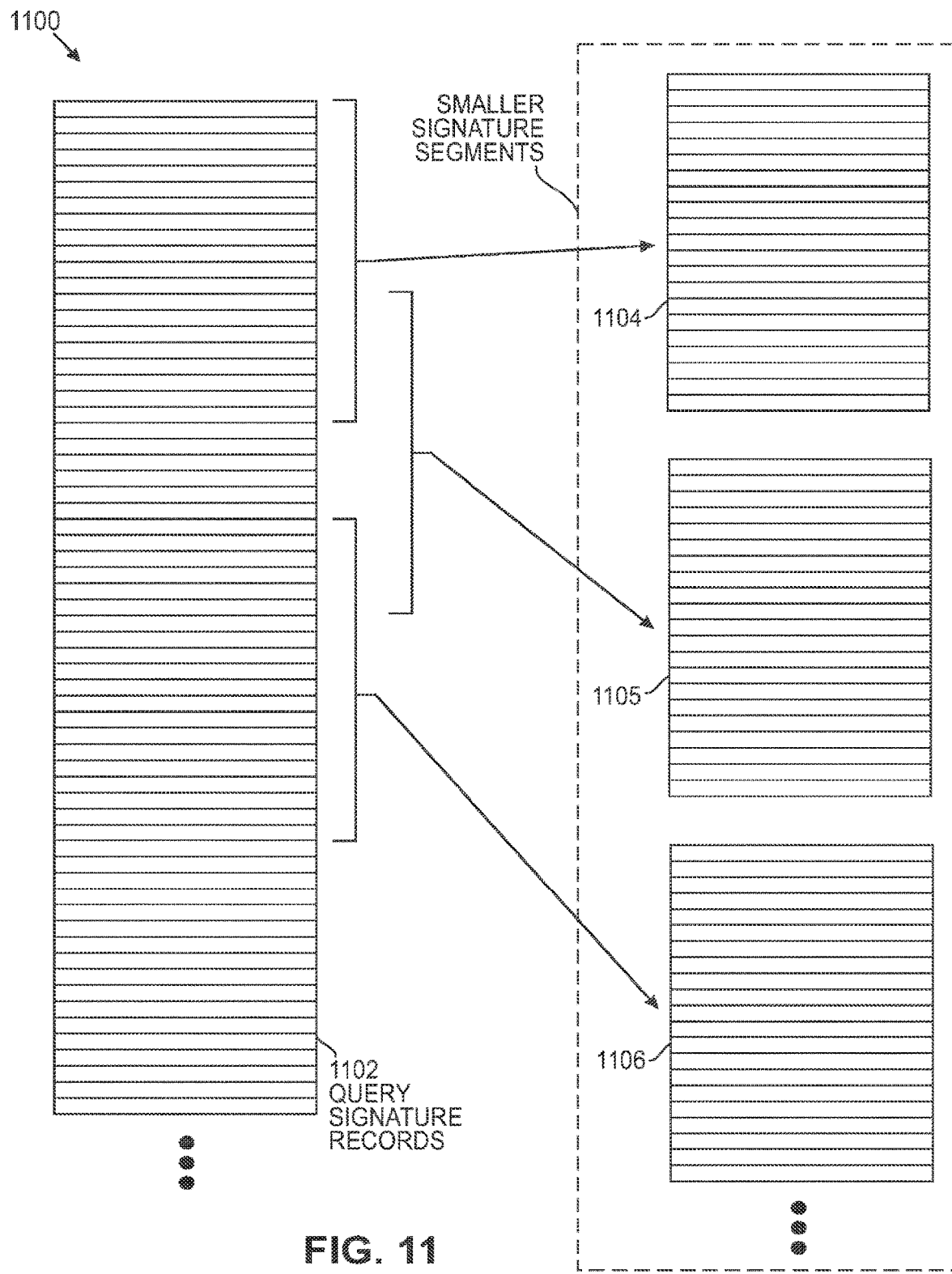
FIG. 11 illustrates a query multimedia clip partitioned into smaller segments in accordance with the present invention.

FIG. 11 illustrates a query multimedia clip partitioned into smaller segments 1100 in accordance with the present invention. The query multimedia clip 1102 may additionally be broken into smaller overlapping segments 1104-1106, and similarity search and a top matches and correlation procedure performed on the smaller segments. This partitioning allows more time granularity in the multimedia clip identification, as well as greater accuracy in identifying matching multimedia clips. In one embodiment, the entire query multimedia clip is broken into small clip segments that overlap by as much as 50% with the neighboring clip segments.

Figure 12:
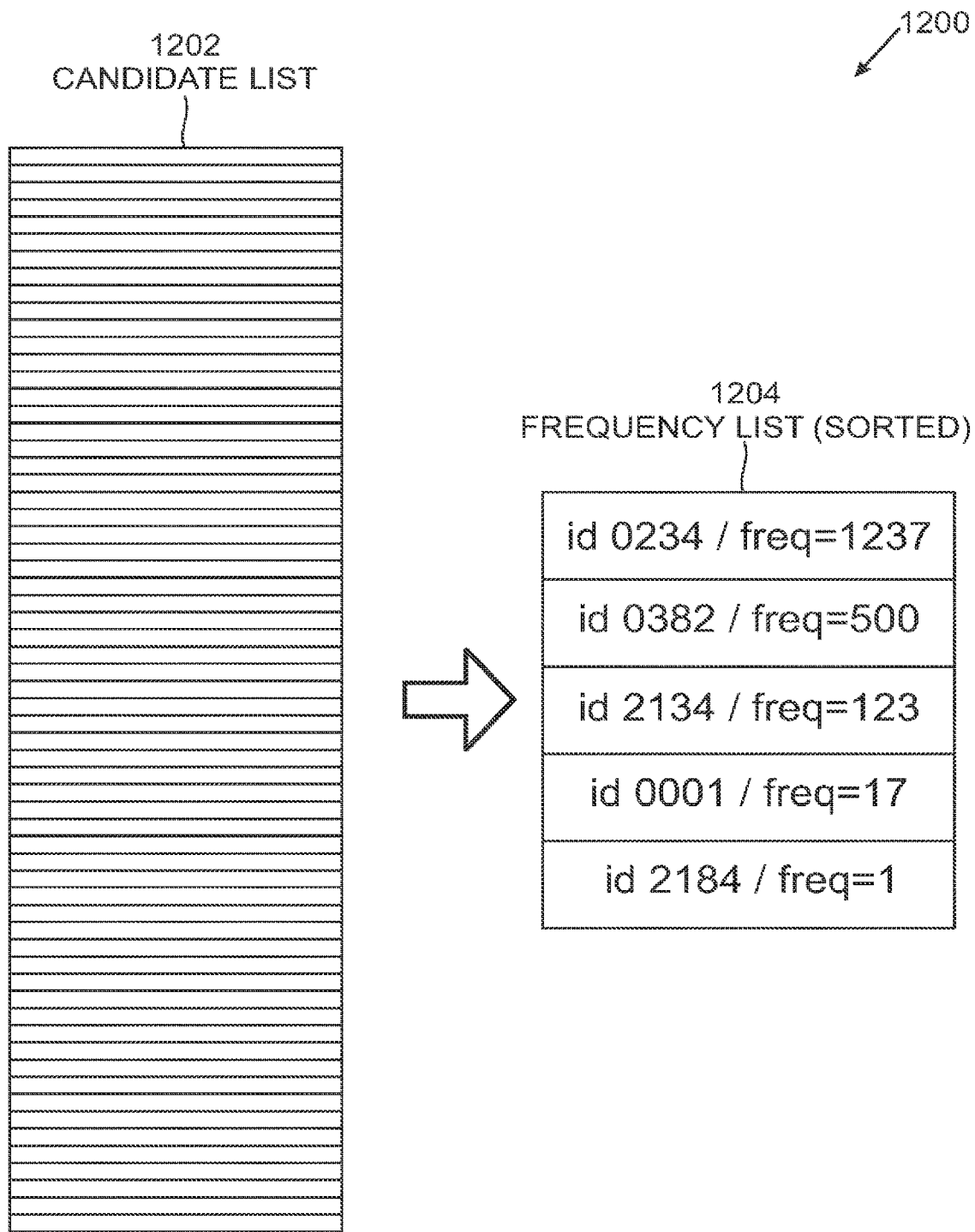
FIG. 12 illustrates an exemplary listing of top matches in accordance with the present invention.

FIG. 12 illustrates an exemplary listing of top matches 1200 in accordance with the present invention. The candidate list 1202 that corresponds to a query multimedia clip, or some small segment of it, may be processed to produce the most likely matching multimedia clips. In a first step, the number of times a database multimedia clip appears in the candidate list is counted, to generate a frequency list of multimedia clip id's and the frequency of that clip's appearance in the candidate list. In a second step, the frequency list is then sorted in descending order of frequency to generate a sorted frequency list 1204 representing the top matches.

For application scenarios that require low computational burden, for instance where a search needs to be extremely fast, or where the query clips are known to have little or no image distortion, due to the nature of the application, the correlation step can be omitted. In this case, the most frequent database multimedia clip, which would be represented by the first multimedia clip id in the sorted frequency list 1204, may be simply output as the identity of the unknown query clip. Alternatively, for other scenarios, by taking the top V most frequent multimedia clips, the first V multimedia clip id's in the sorted frequency list 1204, the candidate list has been focused in on the most likely matches. Next, signature correlation processing is used to eliminate potential false matches and ensure, with greater accuracy, that a correct matching multimedia clip has been found.

Figure 13:
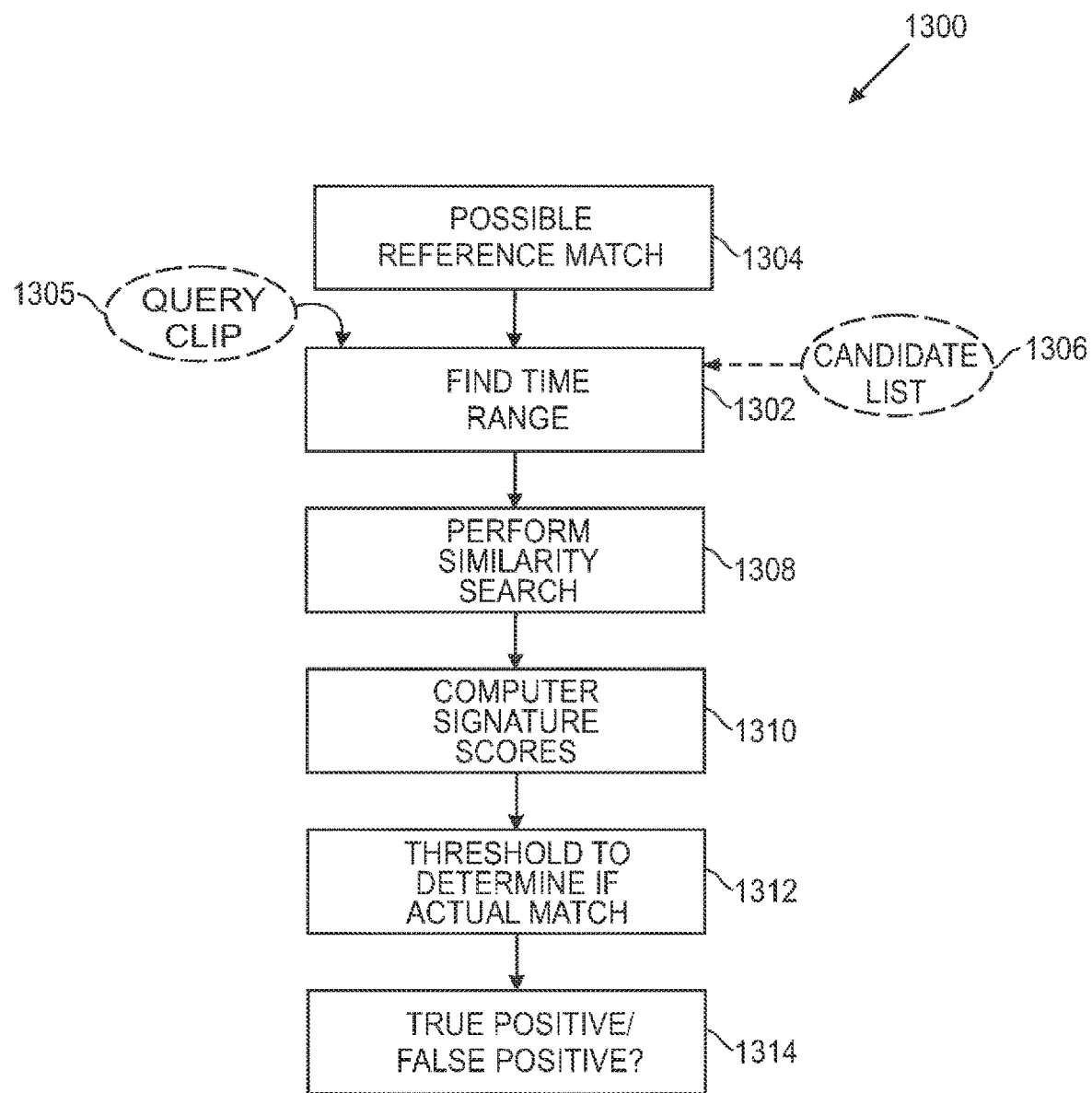
FIG. 13 illustrates a signature correlation process in accordance with the present invention.

FIG. 13 illustrates a signature correlation process 1300 in accordance with the present invention. Further information regarding a procedure for using signature correlation to eliminate false positives and get time-accurate matches may be found in U.S. Provisional Application Ser. No. 61/181, 806 filed on May 28, 2009 entitled "Multi-Media Content Identification Using Multi-Level Content Signature Correlation and Fast Similarity Search", FIGS. 1A, 2A, 2B, 2C, 3A, 3B, 4-6, pages 11-26. The signal correlation process 1300, in the context of a signature database, is described next. One of the goals of the signature correlation process 1300 is to verify that the signatures of a potentially matching reference multimedia clip 1304 do indeed correspond with the signatures of the query multimedia clip 1305.

In a first step 1302, a time range of the potentially matching reference multimedia clip is determined from the reference database. For example, if the potentially matching reference multimedia clip in the reference database is subdivided into smaller clips, then an approximate time range may be determined. Otherwise, and potentially in addition, the matching time range can be inferred from the candidate list 1306 by analyzing a correspondence in time between the database clip and the query clip, using a Hough transform.

In a second step 1308, with a matching time range and the associated database clip, corresponding signatures are accessed from the signature database using the secondary index as illustrated in FIG. 9B. Generally, the corresponding signatures are a small set of signatures. Since only the matching time range is accessed, the size of the set of signatures remains small, even as the size of the database grows, allowing the correlation step to scale with the database size. The signatures for the matching time range of the reference are now compared with the query signatures. For each query signature, a similarity search is performed, with a specified signature distance, within this small set of signatures from the reference database. This step is used to determine the bit distance from each query signature to each reference signature, and is used in the next step to determine scores.

In a third step 1310, for each query signature, a score is derived based on the distances to the closest signatures in the reference database signature subset, and the number of matches. For instance, the score assigned to a query signature may be the minimum bit distance to all the signatures in the reference signature set, with a particular maximum allowable value. The score for each query signature may be averaged for the entire set of query signatures to give an overall score for the particular reference clip match. According to the steps above, a low score implies low bit distance between the query and reference, and hence a good match.

In a fourth step 1312, the overall score is subjected to a threshold test which determines whether the database clip is considered a match 1314. This threshold must be appropriately selected, based on application requirements, to trade-off between a high match rate and a low false positive rate.

Figure 14:
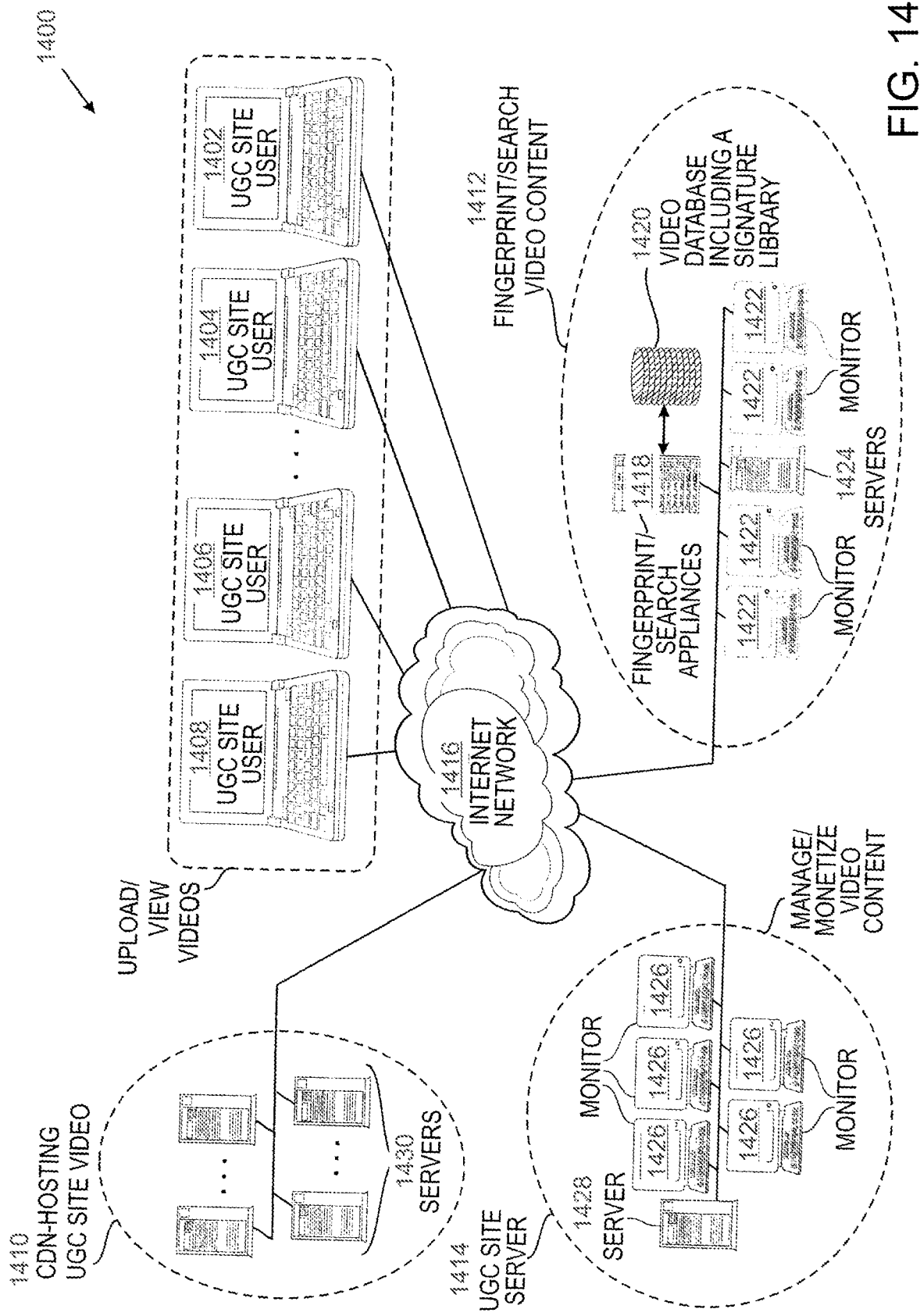
FIG. 14 illustrates an Internet networking system for content based video fingerprinting and identification in accordance with an embodiment of the present invention.

FIG. 14 illustrates a system 1400 for both video fingerprinting and identification, and video content based management in accordance with an embodiment of the present invention. As used herein, a video fingerprint is a calculated numerical value, alternatively termed a signature, which represents a prominent feature of a video frame. A collection of signatures drawn from a single video frame with multiple features generates a compact video frame representation, while a collection of signatures associated with each video frame in a video sequence with multiple frames forms the video sequence representation. The approach represented by system 1400 targets user generated content (UGC) Internet web sites. User sites 1402-1408 generate user video content which is uploaded to a UGC Internet web company where it may be stored in a server and storage subsystem 1428. Alternatively, the video content may be redirected to a third party server system providing service to the UGC Internet web company. For example, third party server system 1410 with an array of servers 1430 hosts user generated video content and provides service to the UGC Internet web company with UGC site server system 1414, with their servers and storage subsystem 1428 and monitors 1426. A video fingerprinting and video identification system 1412 utilizes a video fingerprinting and search appliance 1418, a video database 1420 containing a signature library, and servers 1424 with user terminal/monitors 1422. The Internet network 1416 allows for remote system location interconnect, and information exchange and management.

The video fingerprinting and video identification system 1412 in FIG. 14 is scalable and utilizes highly accurate video fingerprinting and identification technology that checks unknown video content against a database of previously fingerprinted video content, which is considered an accurate or "golden" database. The video fingerprinting and video identification system 1412 is different from commonly deployed systems in that it extracts features from the video itself and does not rely on a hash of a file, metadata or the audio stream that accompanies a video. The video fingerprinting and video identification system 1412 allows a UGC site server system 1414 to configure a "golden" database specific to its business requirements. A self-contained video fingerprinting and search appliance 1418 that is configured to sit on the Internet network 1416 within the video fingerprinting and video identification system 1412, compares video streams against a database of signatures in the video database 1420, that has been previously generated. The video fingerprinting and search appliance 1418 allows a UGC site server system 1414 to automatically flag multiple copies or reoccurring versions of popular uploads, automatically flag content previously identified for removal, as well as, content identified under a take-down notice, content not appropriate for a site, such as inappropriate, violent, racist, or the like content, and to correlate results from other filtering methods.

Each of the appliances and servers, 1418, 1424, 1428, and 1430 may include a processor complex having one or more processors, having internal program storage and local user controls such as a monitor, a keyboard, a mouse, a printer, and may include other input or output devices, such as an external file storage device and communication interfaces. The video fingerprinting and search appliance 1418 may store programs such as a program implementation of a content based video identification process of the present invention or have access to such programs through electronic media, such as may be downloaded over the Internet from an external server, accessed through a universal serial bus (USB) port from flash memory, accessed from disk media of various types, or the like.

The video fingerprinting and search appliance 1418 has access to the video database 1420 which may be accessed by software programs operating from the appliance 1418, for example. The video database 1420 may store the video archives, as well as all data related to inputs to and outputs from the video fingerprinting and video identification system 1412, and a plurality of video fingerprints that have been adapted for use as described herein and in accordance with the present invention. It is noted that depending on the size of an installation, the functions of the video fingerprinting and search appliance 1418 and the management of the video database 1420 may be combined in a single server running separate program threads for each function.

The video fingerprinting and video identification system 1412 may also suitably include one or more servers 1424 and user terminals or monitors 1422. Each of the user terminals or monitors 1422 and the video fingerprinting and search appliance 1418 may be connected directly to the server 1424 or indirectly connected to it over a network, such as a local cabled intranet, wireless intranet, the Internet, or the like.

The video fingerprinting and search appliance 1418 may comprise, for example, a personal computer, a laptop computer, or the like. The user terminals or monitors 1422 may comprise a personal computer equipped with programs and interfaces to support data input and output and video fingerprinting and search monitoring that may be implemented both automatically and manually. The user terminals or monitors 1422 and video fingerprinting and search appliance 1418 may also have access to the server 1424, and may be accessed from the server 1424.

One of the user terminals or monitors 1422 may support a graphical user interface utilized to setup the video fingerprinting parameters and present the search results. These terminals may further provide miscellaneous administrative functions such as user log-on rights, change of user permissions, passwords, and the like.

Figure 15:
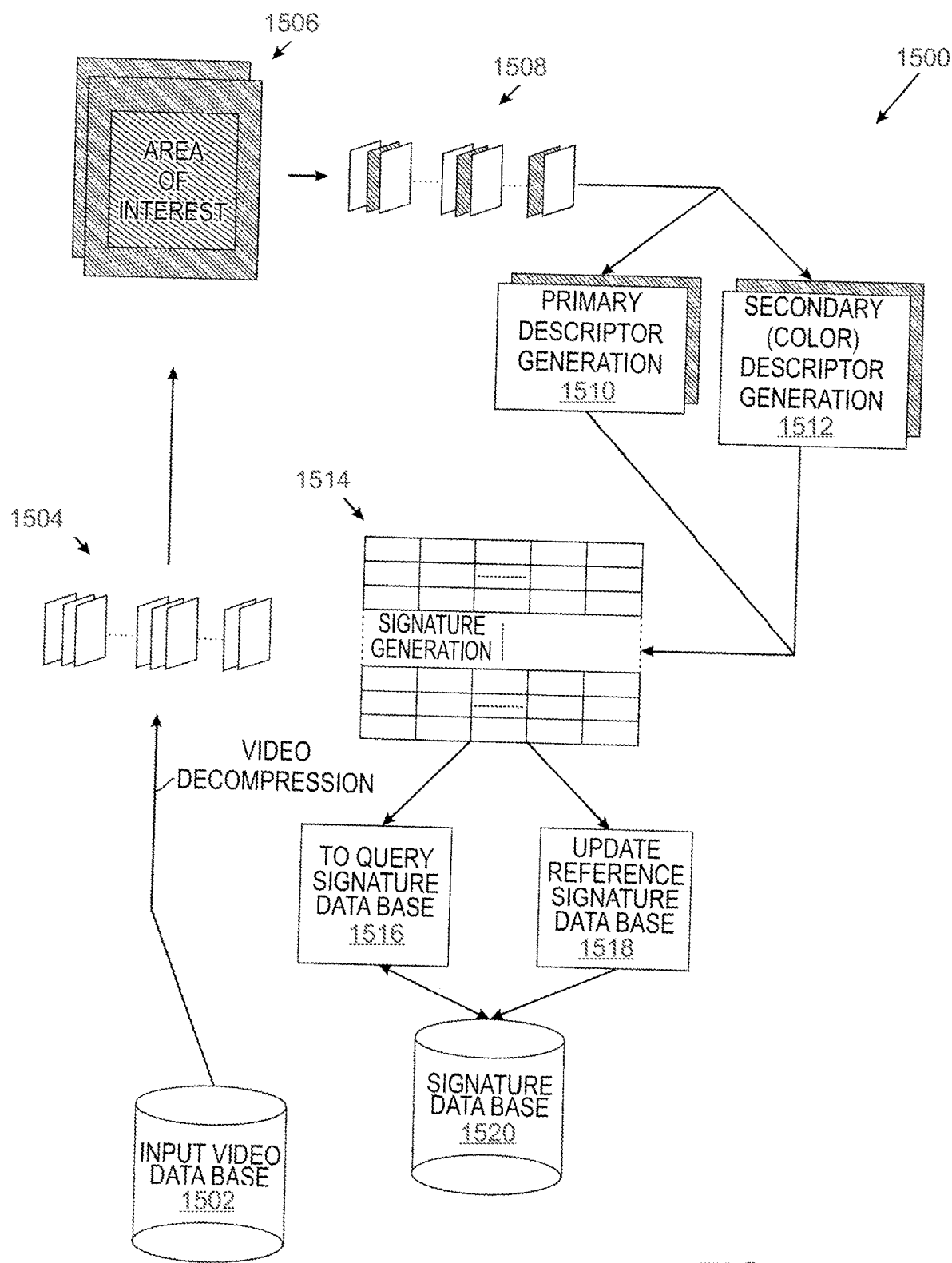
FIG. 15 illustrates a process for content based video feature extraction, signature generation, and database formation in accordance with an embodiment of the present invention.

FIG. 15 illustrates a process 1500 for content based video feature extraction, signature generation, and database formation and search in accordance with an embodiment of the present invention. For use herein, a video sequence is defined as a plurality of video frames presented sequentially in time. As shown in FIG. 15, the basic functionality of a video sequence signature database formation consists of selecting a video sequence in step 1504 from a video database in access step 1502, and processing the video sequence in a series of process steps 1506, 1508, 1510, 1512, 1514, and 1518 in connection with the flowchart 600 of FIG. 6. An analysis process step 1506 includes processing a video sequence by video frame filtering for noise reduction and desired active region determination for each video frame as described in more detail below. The active region of a video frame is determined in step 1506. We use the procedure briefly described in the following text, and described more thoroughly in U.S. application Ser. No. 12/491,896, Jun. 25, 2009, and U.S. application Ser. No. 12/612,729, Nov. 5, 2009, filed by the same authors. Active region of the video frame is determined by examining the video frame's horizontal and vertical boundaries with respect to a total normalized average brightness of the entire video frame, combined with examination of the overall activity of the frame boundaries. The active region determination is based on a three-pass process. During a first pass of the video fame active region determination process, frame boundaries are examined line by line in horizontal and vertical direction to determine preliminary inactive boundary areas. The process is based on comparison of a normalized brightness value computed for each successive line with the overall video frame normalized brightness value. The process advances through successive lines at the frame boundaries in both horizontal and vertical direction, starting from the frame outermost lines, until it reaches a line with a normalized brightness greater than a certain percentage of the overall normalized brightness computed for the entire frame. This step determines four preliminary boundaries for the frame active region. In a second pass, an activity measure is derived for each of the preliminary boundary regions, based on a gradient vector intensity computed for each pixel and a normalized sum of the gradient vector intensities computed for each region. The activity measure for each identified boundary region is compared against an activity threshold and based on this comparison it is decided whether to go into the third step of active region determination, or accept the preliminary active region boundaries determined in the first step. The third step of the active region determination is a repeat of the first step of the boundary region line brightness examination but with adjusted percentage of the normalized average brightness computed for the entire frame used as a threshold parameter for comparison. After the third step, the boundaries of the active region are determined for the frame, and the inactive frame regions are discarded. The process of active region determination is repeated for each frame of a video sequence.

In step 1508, temporal statistics are collected for each video sequence, and based on these temporal statistics, a set of video frames is selected for further spatial processing. For frame selection we use the procedure described in detail in U.S. application Ser. No. 12/141,163, Jun. 18, 2008, filed by the same author.

In step 1510 spatial video frame analysis is performed to determine a set of primary descriptors, while in step 1512 spatial video frame analysis is performed to determine a set of secondary, color layout based, descriptors as described in connection with the flowchart 600 of FIG. 6 and the flowchart 700 of FIG. 7.

A signature generation process step 1514 constructs a set of primary and color signatures as described in more detail below in connection to histogram and spatio-color signature generation flowcharts 2100 and 2200 of FIGS. 21 and 22, and the flowchart 1900 of FIG. 19.

Figure 19:
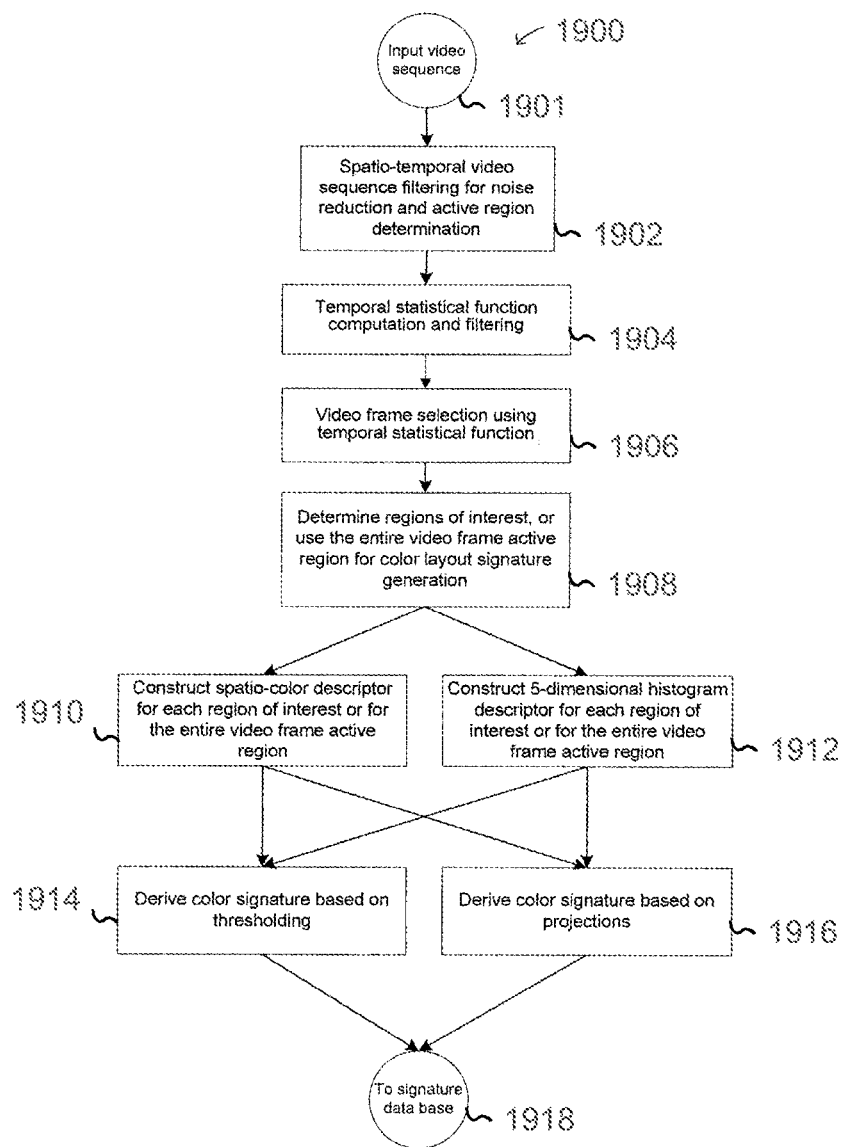
FIG. 19 illustrates a video sequence spatio-temporal processing flowchart for frame selection, active region generation, and color feature extraction as part of the process of FIG. 15 in accordance with an embodiment of the present invention.

The overall process of video frame pre-processing and active region generation 1902, frame selection 1904, 1906 and spatial video frame analysis for color descriptor and signature generation 1908, 1910, 1912, 1914, 1916, is described in flowchart 1900 of FIG. 19.

An update process step 1518 is utilized to insert a set of compact primary and secondary signatures into the signature database in access step 1520 to be used for video sequence search and identification.

As the output of the above processing, a number of results are presented including a count of similar videos found, a count of not identified videos, statistics with respect to precise timing of matching video reference frames, and a confidence factor associated with each identified video.

A similar process is followed in a video sequence search and identification process. A compressed or raw video sequence to be identified is provided, for example, from a video database in access step 1502 and processed in a series of process steps 1504, 1506, 1508, 1510, 1512, 1514, and 1516. The query process 1516 includes processing to deliver a set of videos closely matching the original compressed or raw video sequence. Spatial domain video frame processing for color feature detection is described next. Several interest regions may be identified for a frame, and a full size signature as well as a short, hash signature is generated for each interest region. Each signature is based on the pixel intensity data within the corresponding interest region in the frame. We describe two complementary signatures that are based on the pixel color data. This color data is represented in terms of the red, green, and blue (RGB) video components, or luminance Y, and chrominance Cb, Cr (YCbCr), or equivalently luminance Y, and chrominance U, V (YUV) components. A signature can be generated for a given interest region, or for the entire frame.

Figure 16:
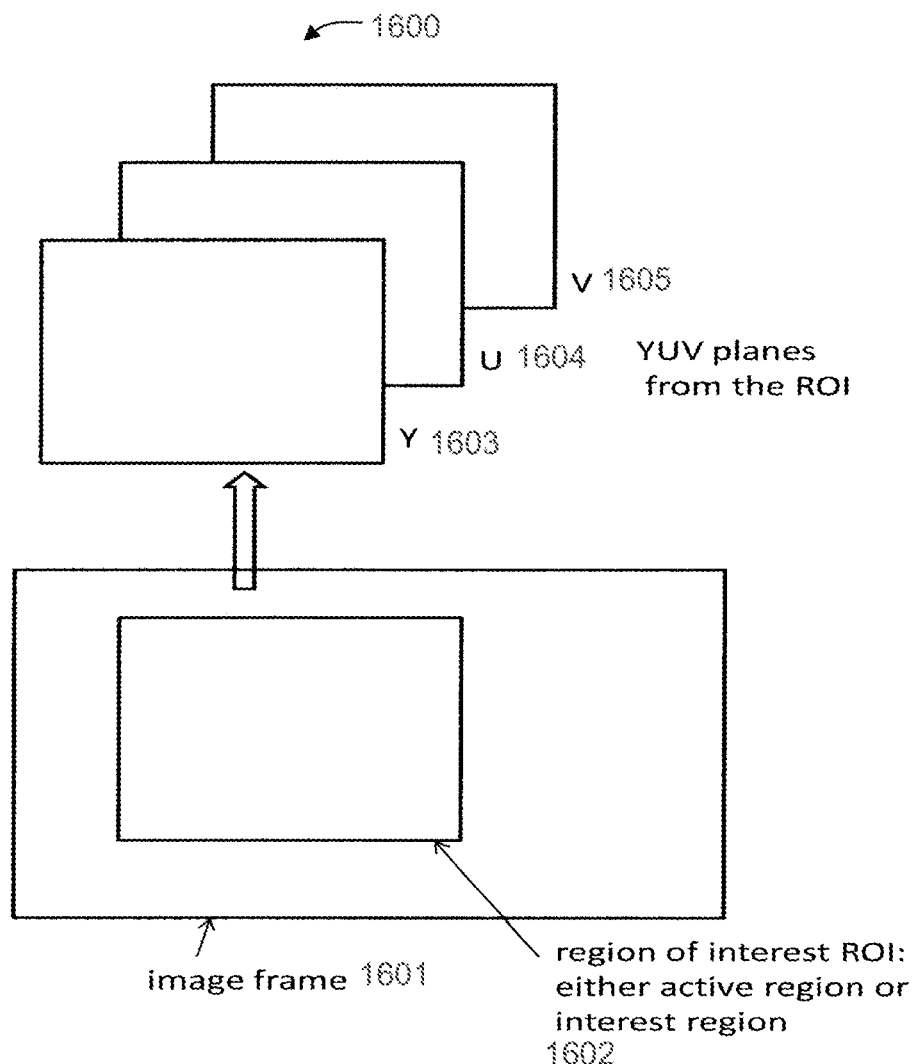
FIG. 16 illustrates Y, U and V color planes for a given region of interest of pixels in a video frame.

When generating a signature for the entire video frame, active region of the video frame must be determined. From this point on, the procedure is identical regardless of whether we are considering the active region of a video frame 1601, or an interest region of arbitrary size. Either of these regions is called region-of-interest (ROI) 1602, as shown in FIG. 16.

Two different methods of producing a color signature from the color video frame data are described. We assume that the color representation of a video frame, with Y 1603, U 1604, and V 1604 components, is available. If an RGB or other color representations is used as an input, the pixel data is first converted to YUV component representation using a transform matrix. Color data can also be represented natively in the YUV with several formats. One format is YUV444, where the Y, U and V planes all have identical sizes. Another format is YUV422, where the Y component is at full resolution and the U and V components are at half the resolution horizontally. Yet another format is YUV420, where the Y component is at full resolution and the U and V components are at half the resolution horizontally and half the resolution vertically. If the YUV data is represented with down-sampled chrominance components, such as YUV420 or YUV422, then they can be appropriately re-sampled to result in three identical size Y, U and V color planes, ie. YUV444. The input Y 1603, U 1604 and V 1605 color planes are shown in FIG. 16.

The description of the color descriptor/signature generation is presented by way of an example. However, the method is general with respect to the initial box size, block re-sampling grid size, and the number of dimensions drawn for the descriptor/signature generation.

Spatio-Color Signature

Figure 18:
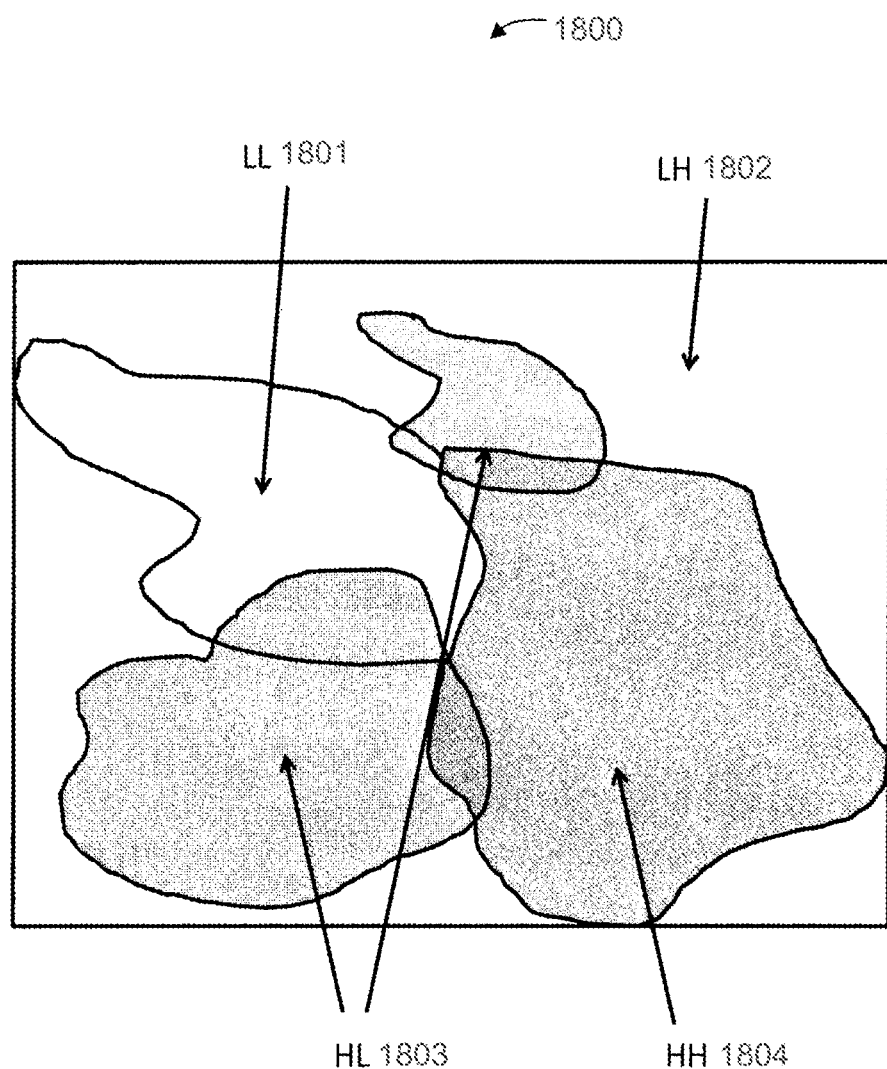
FIG. 18 illustrates partitioning of the region of interest of pixels into multiple color groups, computed according to the color values of pixels.

We now describe in detail the generation of the spatio-color descriptor and signature. Considering all image pixels within the region of interest, we compute the median pixel value 701 of the U plane (MU), and the median pixel value of the V plane (MV). The median value can be an integer value or a non-integer, fractional value. Based on these median values, we define four groups of pixels as illustrated in FIG. 18. Group LL 501 with U pixels<=MU+TU and V pixels<=MV+TV, group LH 502 with U pixels<=MU+TU and V pixels>=MV−TV, group HL 503 with U pixels>=MU−TU and V pixels MV+TV, and group HH 504 with U pixels>=MU−TU and V pixels>=MV−TV. The TU and TV are threshold parameters representing distances from the median value.

Figure 17:
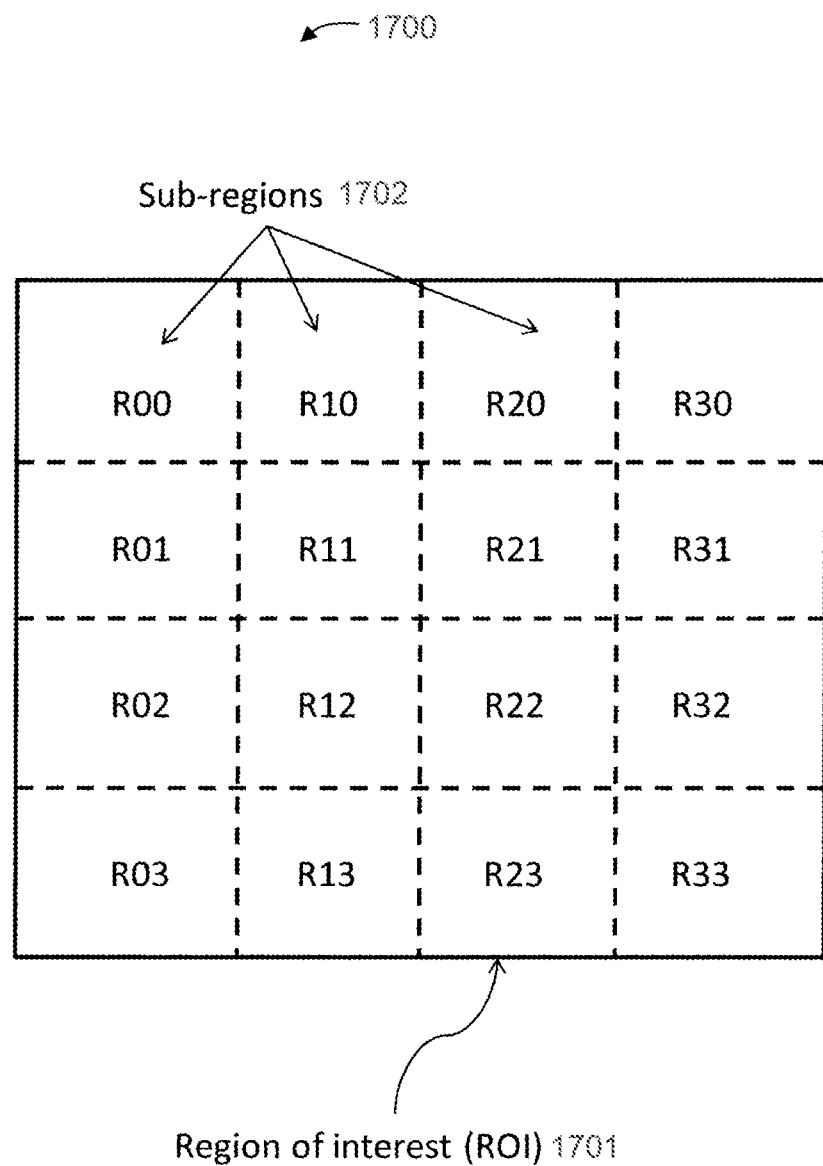
FIG. 17 illustrates partitioning of the region of interest of pixels into sub-regions used for further analysis.

A pixel could belong to more than one color group. One example is the case when a pixel falls within the distance threshold TU or TV of the respective median values. The ROI 401 can be divided into 16 equal sub-regions 1702, with 4 divisions in the horizontal direction and 4 divisions in the vertical direction, as illustrated in FIG. 17. The sub-regions in FIG. 17 are labeled R00, R01, R02, R03, R10, R11, ..., R33, where the first number indicates horizontal division and the second number indicates the vertical division.

Four color groups and 16 sub-regions form 64 counting bins. These 64 counting bins define a 64-dimensional descriptor, where each counting bin corresponds to a descriptor dimension. At the start of the procedure outlined in the flowchart 2000 of FIG. 20, these bins are set to zero 2002. At the end of the procedure 2008 the same bins contain values that correspond to the 64-dimensional descriptor. We iterate over all pixels in the region of interest 1701, selecting a first pixel 2003, and then repeating procedure 2004, 2005 and 2006 for each next pixel. When all pixels in the region of interest 401 are exhausted as indicated in 2007, a 64-dimensional descriptor is constructed in step 2008.

Each pixel in the region of interest 1701 belongs to exactly one of the 16 sub-regions, and contributes to the 4 bins that correspond to the 4 color groups for a sub-region. Each pixel can contribute to any or all of the 4 color bins in a sub-region.

Figure 24:
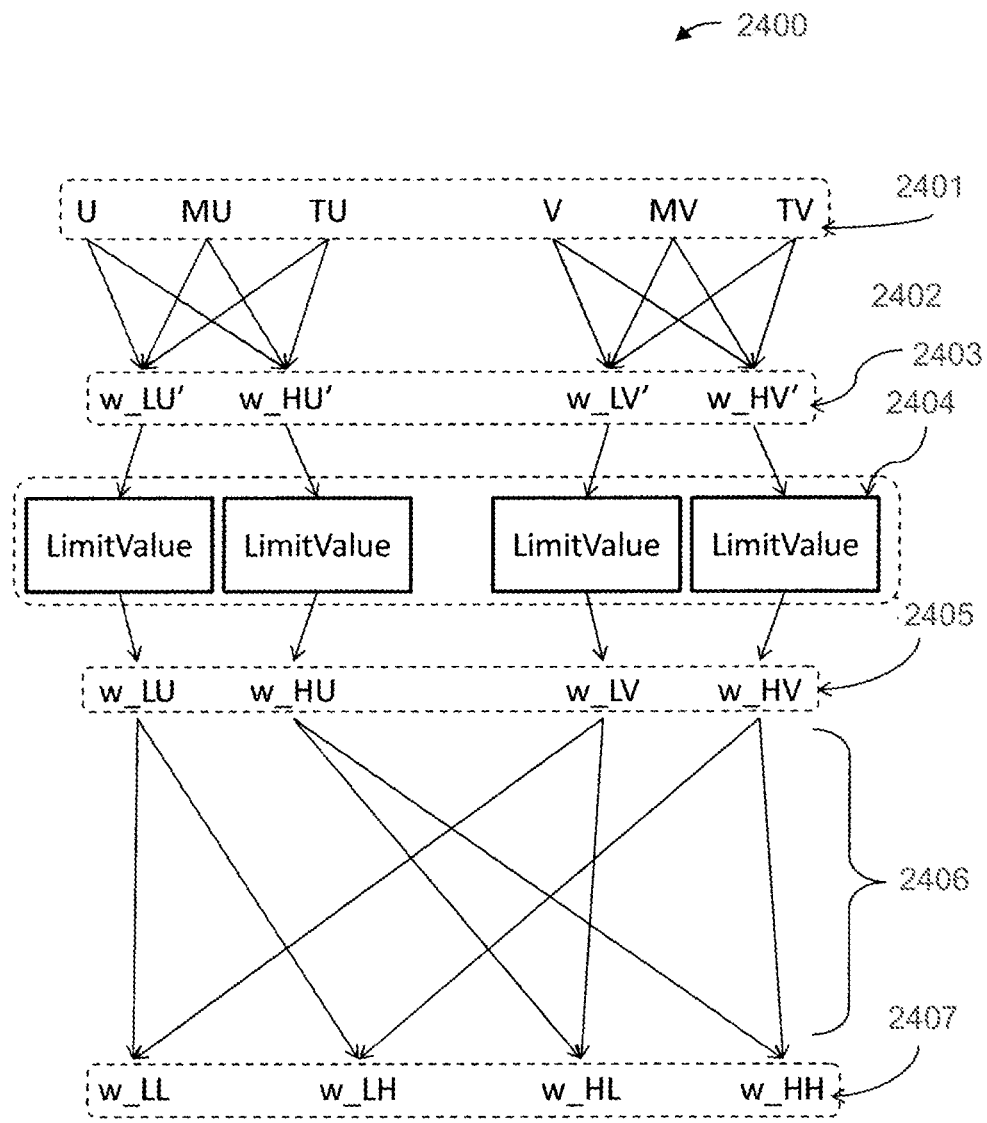
FIG. 24 illustrates computation of the color weights in accordance with an embodiment of the present invention.

Given a pixel with color components YUV, we compute a weighting factor 2005, that depends on the color value, for each color bin: w_LL, w_LH, w_HL, and w_HH. The procedure of computing the color weights is shown in FIG. 24. The inputs 2401 are the pixel U and V values, the computed median values MU and MV from 2001, and the preset threshold values TU and TV. From the inputs, we compute the following partial weighting factors 2404 using the following formulas:

$$w\_LU = \text{LimitValue}((MU+TU-U)/TU)$$

$$w\_HU = \text{LimitValue}((U-MU+TU)/TU)$$

$$w\_LV = \text{LimitValue}((MV+TV-V)/TV)$$

$$w\_HV = \text{LimitValue}((V-MV+TV)/TV).$$

The function "LimitValue" 2403 limits the values 2402 to a maximum of 1 and a minimum of 0, and is defined as follows:

$$\text{LimitValue}(x) = \begin{cases} 0, & \text{if } x<0; \\ 1, & \text{if } x>1; \\ x, & \text{otherwise} \end{cases}.$$

These partial weighting factors 2404 are used to compute the weighting factors 2405 for each of the color groups as follows:

$$w\_LL = w\_LU * w\_LV$$

$$w\_LH = w\_LU * w\_HV$$

$$w\_HL = w\_HU * w\_LV$$

$$w\_HH = w\_HU * w\_HV.$$

Figure 25:
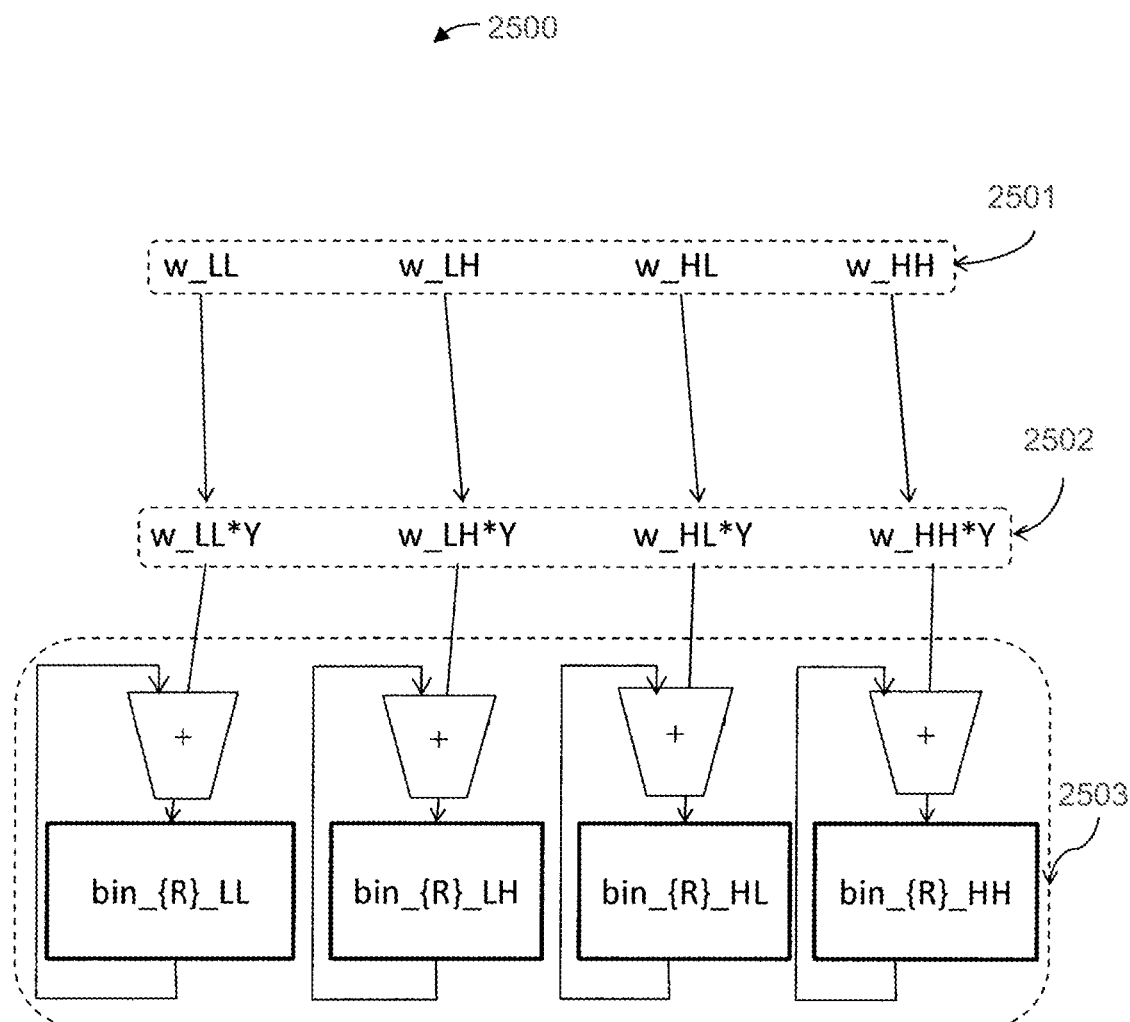
FIG. 25 illustrates incrementing color/sub-region bins in accordance with an embodiment of the present invention.

Next, the appropriate bins are incremented in step 2006. This process is illustrated in more detail in FIG. 25. Given the weights 2405 and 2501, the contribution that a pixel makes to the color bin bin_{R}_LL 2503 for the sub-region {R} to which it belong is w_LL*Y 2502. Similarly, w_LH*Y is added to bin_{R}_LH, w_HL*Y to bin_{R}_HL, and w_HH*Y to bin_{R}_HH. After processing all pixels, the resulting sums in the 64 bins are used as the 64 descriptor values.

Figure 20:
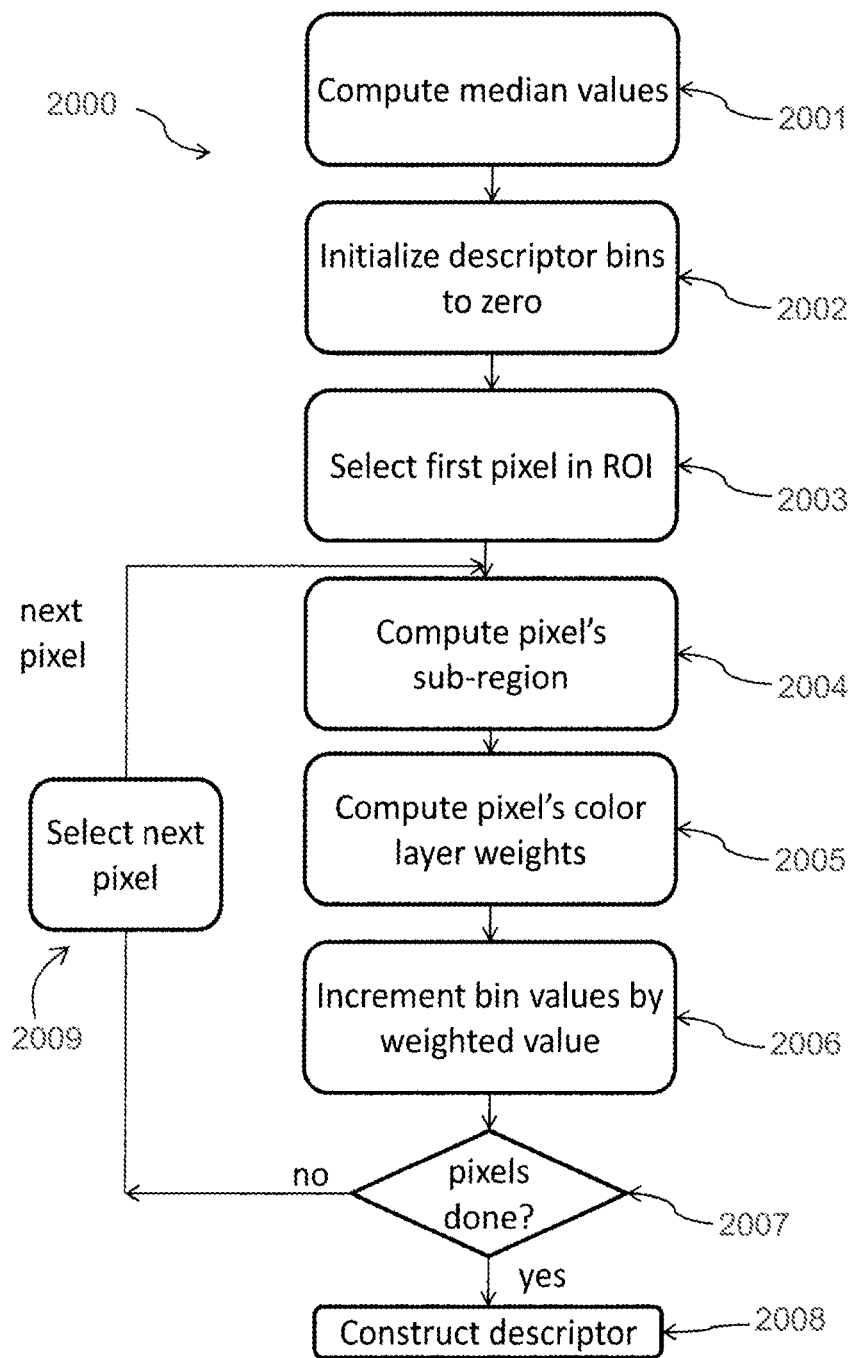
FIG. 20 illustrates spatio-color descriptor generation flowchart in accordance with an embodiment of the present invention.

The procedure for generating a spatio-color descriptor, illustrated by flowchart 2000 in FIG. 20, can be summarized as:
 1. Compute median values 2001 MU and MV for the ROI
 2. Initialize these 64 (16 sub-regions×4 colors) bins to 0 (702): bin_R00_LL, bin_R00_LH, bin_R00_HL, bin_R00_HH, bin_R01_LL, bin_R01_LH, bin_R01_HL, bin_R01_HH, ..., bin_R33_HE 3. For each pixel p 707 (of value Y,U,V) in ROI (starting from the first pixel 2003),
   a. Compute the sub-region 2004 to which pixel p belongs=>sub-region R
   b. Compute color group weights 2005 based on U, V, MU, MV, TU, TV=>w_LL, w_LH, w_HL, w_HH
   c. Add to the following bins 2006:
      i. bin_{R}_LL+=w_LL*Y
      ii. bin_{R}_LH+=w_LH*Y
      iii. bin_{R}_HL+=w_HL*Y
      iv. bin_{R}_HH+=w_HH*Y
4. Construct descriptor 2008 from these bins: (D0, . . . , D63)=(bin_R00_LL, bin_R33_HH)

Starting from the 64-dimensional descriptor, produced according to the flowchart 2000 above, a signature can be generated in one of two methods. The first method is illustrated by flowchart 2100 in FIG. 21. To generate a full size signature, all descriptor dimensions are used in step 2101. Here, each of the descriptor's 64 dimension values is processed in succession, starting from the first descriptor dimension value 2102, continuing to the next descriptor dimension value 2106, until finished 2107. For each descriptor value, one or more threshold values are generated 2103. For instance, for a 1 bit per dimension signature (producing a complete 64-bit signature), a single threshold value could be based on the average 64-dimensional descriptor value (Davg). For a 2-bit-per-dimension signature (producing a 128-bit signature), we require 3 threshold values. As an example, these values could be: Davg/2, Davg, 3*Davg/2. In general, for an M-bit/dimension signature, we require $2^M-1$ threshold values, that are monotonically increasing. Alternatively, instead of thresholding each descriptor dimension value with Davg, we can threshold it with an arbitrary value that changes for each descriptor value. This arbitrary value may be based on observation regarding the relative average strengths of the various color groups. For instance, all descriptor dimensions of a particular color group may be given the same threshold value that is different from the threshold value for the descriptor corresponding to another color group.

Each descriptor value is compared against each of the threshold values, in order, to find the threshold bin 2104. If the value is greater than that $i^{th}$ threshold and less then $(i+1)^{th}$ threshold, then this value maps to threshold bin i. The allowable threshold bin values are 0, . . . , T−1. The "$T^{th}$" threshold can be considered to be infinity. The threshold bin index is converted to an M-bit binary representation and appended to the signature 2105. This procedure is followed for each descriptor value to produce an (N×M)-bit signature, for an N-dimensional descriptor. The value of N is 64 in our example so far.

The second method for generating signatures uses random projections. We describe a general procedure for an N-dimensional descriptor and a K-bit signature derived from this descriptor, as illustrated by flowchart 900 in FIG. 9. The first step is to compute a descriptor 901, either using the procedure already outlined for the spatio-color signature, or in the following section for the color histogram signature. We pre-compute a set of K N-dimensional random descriptors 902. Each of the K×N random descriptor values is initialized to a random number between 0 and 1, for instance using a pseudo-random generator representing a uniform distribution. This set of random descriptors need only be generated once, and in fact, should be re-used for consistent signatures. The random descriptors are numbered from 0 to K−1. The input descriptor is multiplied with each of the K random descriptors, to give a corresponding set of the K resulting scalar values 903. The multiplication is an inner product of the input descriptor and random descriptor, each considered to be N-dimensional vectors. That is, we compute the sum of the element-by-element product over all N dimensions.

Next, we compute the median of the K scalar dot product values and set it as our threshold 904. Using this threshold, we compare each of the K scalar dot product value 905, producing a 0 if less than or equal to the threshold, and producing a 1 otherwise, to form a K-bit signature. The comparison with the $i^{th}$ scalar dot product value, produced by the $i^{th}$ random descriptor, generates the $i^{th}$ bit of the signature. This procedure can be used to generate a 64-bit signature from a 64-dimensional descriptor.

Figure 21:
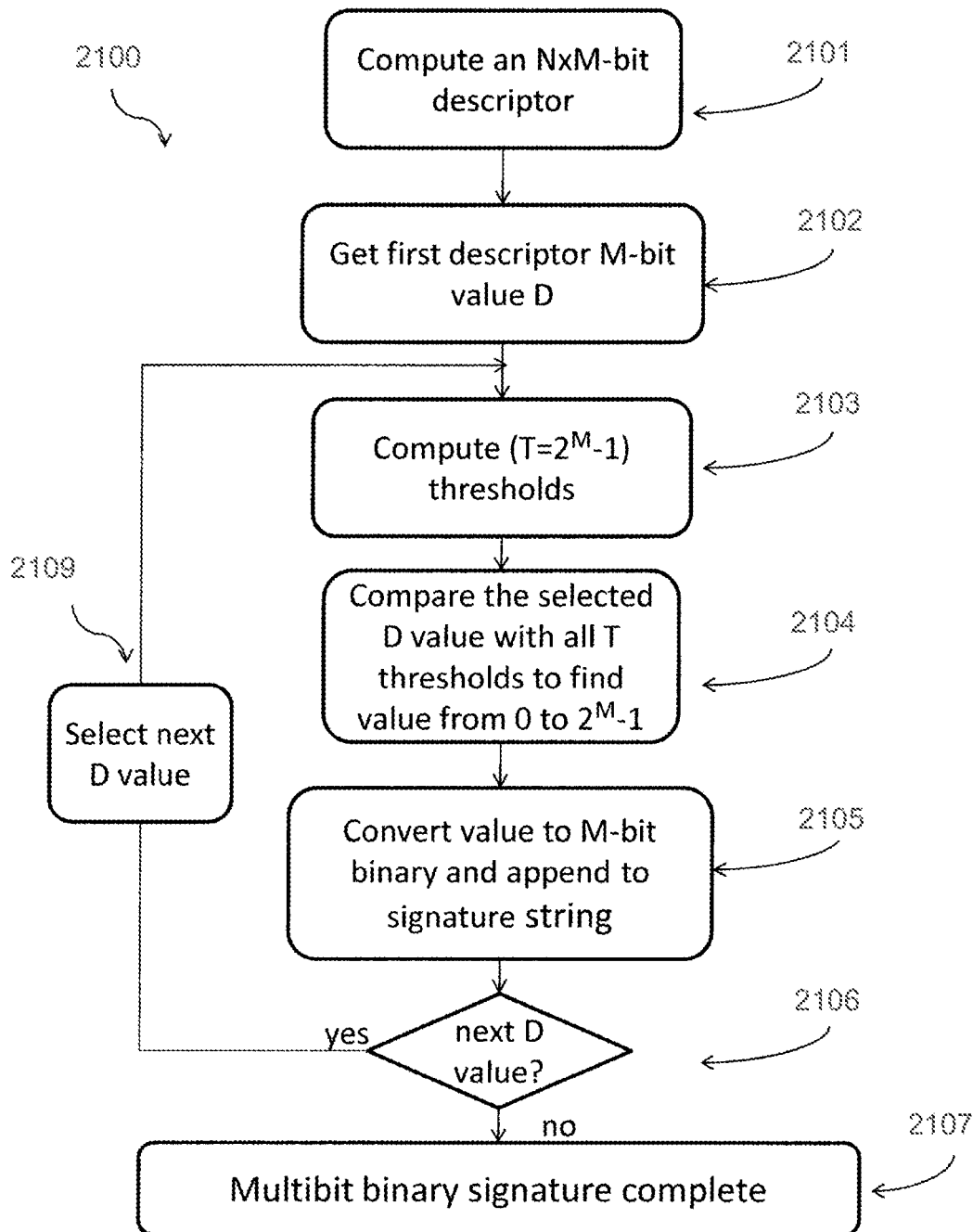
FIG. 21 illustrates signature formation process based on spatio-color descriptor thresholding in accordance with an embodiment of the present invention.
Figure 22:
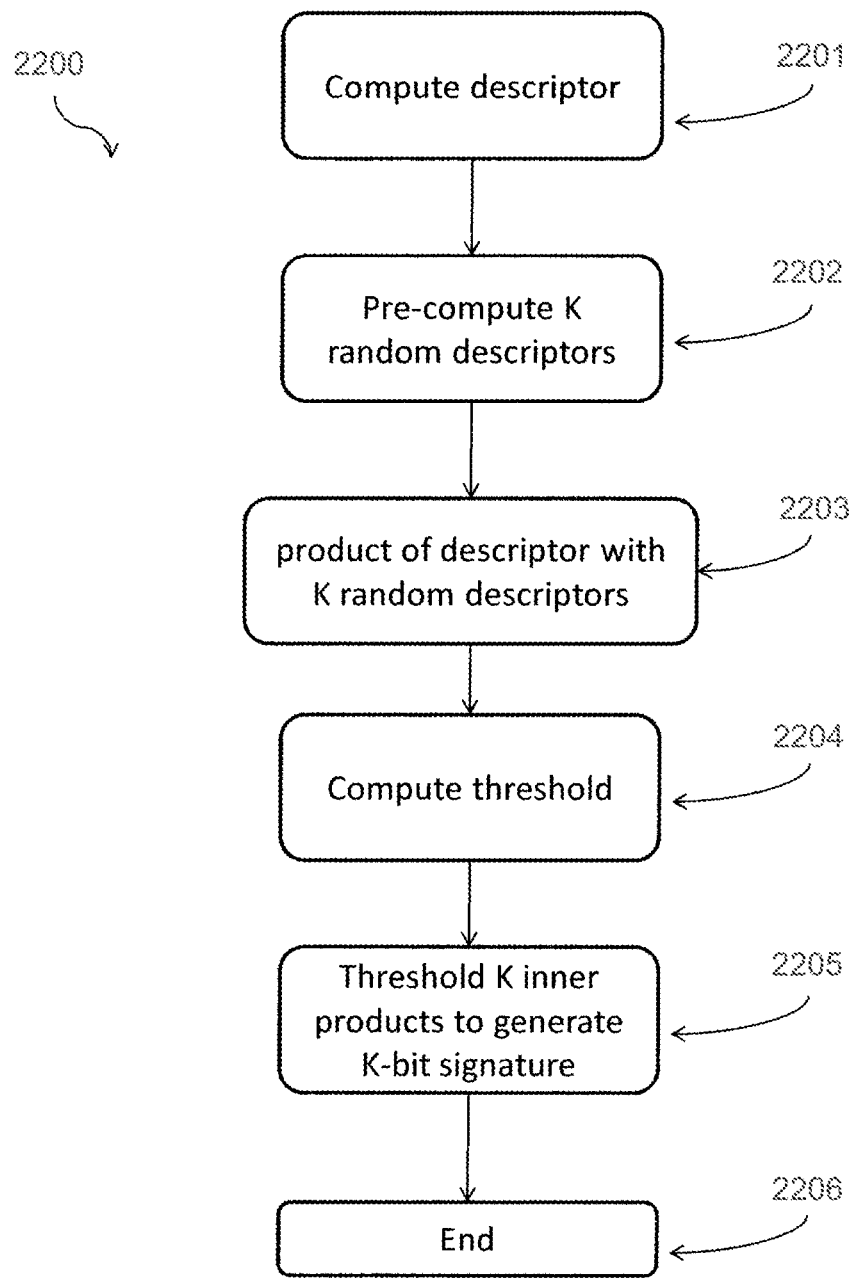
FIG. 22 illustrates signature formation process based on spatio-color descriptor projections onto random vectors in accordance with an embodiment of the present invention.

A shorter signature can be generated by either the first method (thresholding), described in FIG. 21, or the second method (random projections) described in FIG. 22. In the first method, we start by combining the descriptor values and appropriately thresholding the sum, using the procedure detailed in FIG. 21. The main difference between the procedure for the shorter signature and primary signature is this step of combining (adding) descriptor values to create another shorter descriptor 801. Two examples of combining descriptor values are now described. First, all the descriptor values corresponding to each color group are added to give 4 descriptor values: D0', D1', D2', D3':

$$D0'=D0+D4+ \ldots +D60$$

$$D1'=D1+D5+ \ldots +D61$$

$$D2'=D2+D6+ \ldots +D62$$

$$D3'=D3+D7+ \ldots +D63$$

This corresponds to the combined descriptor D'. Second, in an alternative method, all the descriptor values corresponding to each sub-region are added to give 16 descriptor values: D0", D1", D15":

$$D0" = D0 + D16 + D32 + D48$$

$$D1" = D1 + D17 + D33 + D49$$

$$\ldots$$

$$D15" = D15 + D31 + D47 + D63$$

This corresponds to the combined descriptor D". The two alternative method of combining descriptors constitutes the first step of the signature generation procedure 801. The remainder of the procedure follows as before, repeated here for convenience. For each descriptor value, one or more threshold values are generated 2103. For instance, for a 1-bit-per-dimension signature, a single threshold value could be based on the average descriptor value (Davg). For a 2-bit-per-dimension signature, we require 3 threshold values. As an example, these values could be: Davg/2, Davg, 3*Davg/2. In general, for an M-bit-per-dimension signature, we require $2^M-1$ threshold values, that are monotonically increasing. Alternatively, instead of thresholding each descriptor value with Davg, we can threshold it with an arbitrary value that changes for each descriptor value. This arbitrary value may be based on observation regarding the relative average strengths of the various color groups. For instance, all descriptor dimensions of a particular color group may be given the same threshold value that is different from the threshold value for the descriptor dimensions corresponding to another color group.

Each descriptor value is compared against each of the threshold values 2104, in order, to find the threshold bin. If the value is greater than that $i^{th}$ threshold and less then $(i+1)^{th}$ threshold, then this value maps to threshold bin i. The allowable threshold bin values are 0, . . . , T−1. The "$T^{th}$" threshold can be considered to be infinity. The threshold bin index is converted to an M-bit binary representation and appended to the signature 2105. This procedure is followed for each descriptor value to produce an (N×M)-bit signature, for an N-dimensional descriptor. In the example of the two shorter signatures, we would have a 4M-bit and a 16M-bit signature.

The second method for generating shorter signatures uses random projections. We had earlier described the general procedure for an input N-dimensional descriptor and an output K-bit signature, illustrated in FIG. 22. We simply adjust the number of output signature size K to the desired number of bits, and follow the earlier procedure.

5-Dimensional (x-y-Y-U-V) Histogram Signature

Figure 23:
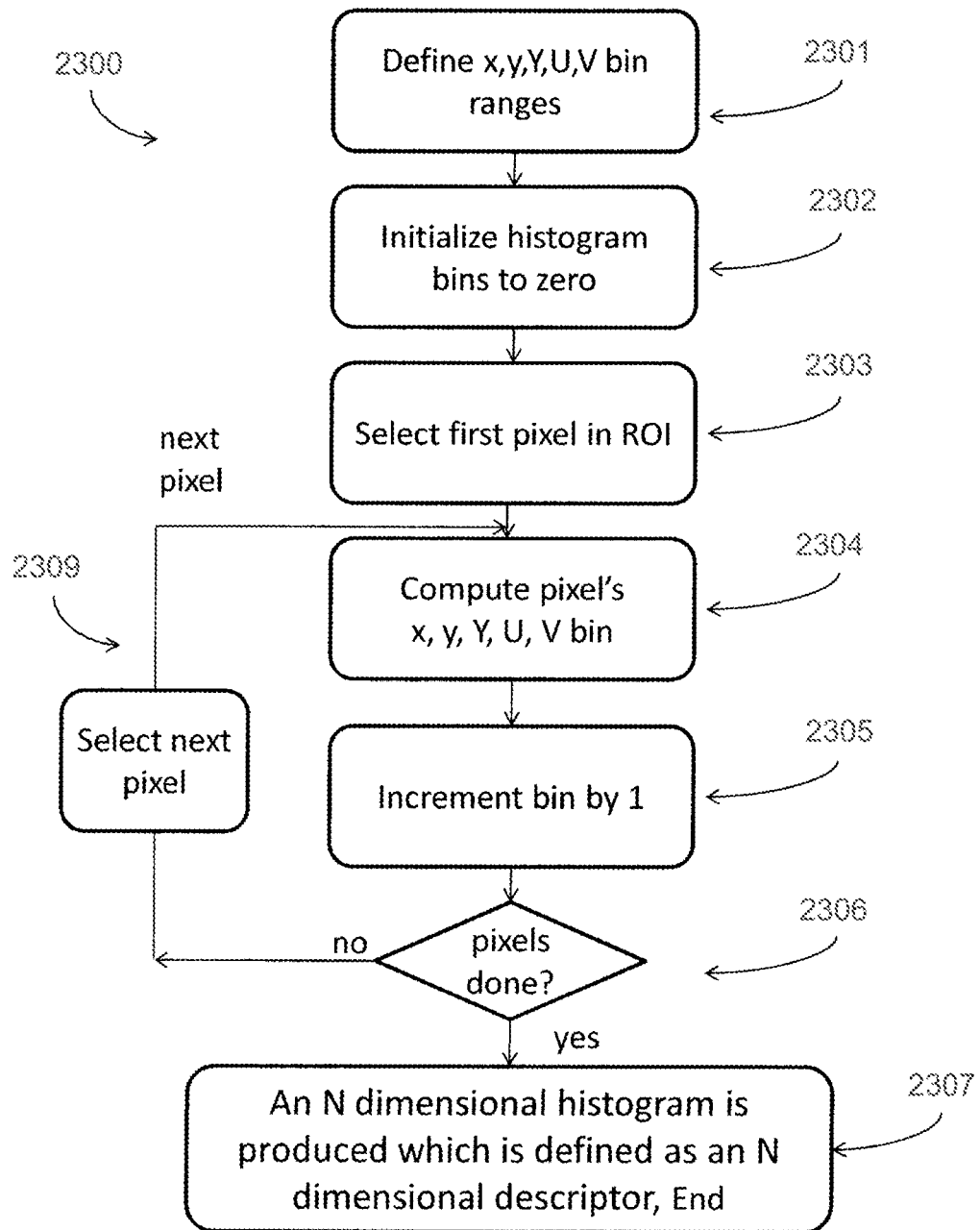
FIG. 23 illustrates color-histogram descriptor generation flowchart in accordance with an embodiment of the present invention.

An alternative color signature generation uses a 5-dimensional histogram of spatial and color information of pixels in the region of interest. The 5 dimensions correspond to the pixel spatial location x and y, and the pixel color values Y, U and V. The flowchart 2300 for signature generation is illustrated in FIG. 23. We start by defining the bin ranges for each of these dimensions 2301. The spatial x and y values are defined relative to the corner of the ROI, with the width and height of the ROI given as well. We divide x and y into 2 bins each, with width/2 and height/2, respectively, as the dividing lines. For the Y (luminance) values, we use 4 bins, evenly dividing between 0 to 255, or 16 to 239, or any other reasonable range. For the U and V chrominance values, we use 2 bins each, evenly dividing the range 0 to 255, or any other reasonable range. This gives a total of 2×2×4×2×2=64 bins in this 5-d histogram. Other values for the number of bins in each dimensions and the total number of histogram bins can also be used. All bins of the histogram are initialized to zero 2302. For each pixel in the region of interest, starting from the first pixel 2303 until pixels are done 2306, the pixel value (x,y,Y,U,V) in conjunction with the bin ranges above are used to compute a bin index, in this case, between 0 and 63 2304. This bin is incremented by 1 (2305). After all the pixels in the region of interest are processed 2307, an N-dimensional histogram is produced, which we consider to be our N-dimensional descriptor. In our case, the value of N is 64.

In order to generate a primary signature, we can follow either of the two procedures already outlined before. We can use the thresholding method 2100, detailed in FIG. 21, to generate an M×N-bit signature. Alternatively, we can use the random projections method 2200, detailed in FIG. 22, to generate a K-bit signature. To generate a shorter signature, we can use either of the methods discussed earlier. We can first combine descriptor values 2101, to give an N-dimensional descriptor, and generate an M×N bit signature according to the method 2100 in FIG. 21. Note that this is equivalent to choosing different numbers of bin and bin ranges. Alternatively, we can choose a small value for K, and use the random projections method 2200 according to FIG. 22, to generate a K-dimension signature.

The color signatures described above can be used as stand-alone primary signatures, with the corresponding shorter signature as the hash traversal signature used to speed up the initial stage of the video data base search. In addition, the color signatures can be used in a complementary manner to existing primary signatures with two major benefits.

First, the color signature can be used in a secondary correlation process used on signature matches that have been identified in a large signature data base. If the query color signatures correlate well to the reference color signatures, then the score of the primary signature match would be boosted. Conversely, if the query color signatures do not correlate with the reference color signatures, the score of the primary signature match would be decreased. By increasing or decreasing the overall query signature matching score, a more precise decision can be made in identifying the matching video. For instance, for an otherwise marginal signature match, the color signature would either accept or reject the match. But a color signature might not affect a particularly weak or strong match.

Second, using short size color signatures an existing hash traversal signature, used to speed up the initial stage of the video data base search, can be enhanced. This enhanced hash traversal signature can lead to increased speed of the search and improved accuracy of video identification in a large video signature data base environment.

Those of skill in the art will appreciate that based on the present disclosure additional alternative systems and methods for scalable, accurate and distortion robust media fingerprinting and identification of digital video sequences may be determined in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention as defined in the appended claims. For example, in another embodiment, an alternate method of feature detection other than the two-pass scale space approach, is used. A feature detection method that provides the center location and spatial extent of the feature, which may be described as a "scale space" method, is feasible. In yet another embodiment, an alternate method for generating a descriptor is used other than the "global descriptor" method presently described. The "phase descriptor" method is one such alternative, and it is described in U.S. application Ser. No. 12/612,729 filed Nov. 5, 2009 entitled "Digital Video Content Fingerprinting Based on Scale Invariant Interest Region Detection with an Array of Anisotropic Filters", FIGS. 9, 10, and 11 and pages 26-28, 38, and 39. Other approaches that generate a compact N dimension vector for a rectangular area of pixels are applicable.

We claim:

1. A method comprising:
   determining, for respective sub-regions of a set of sub-regions that each include pixels of a frame of a query video, using a computing system, respective pixel color data corresponding to pixels included within the respective sub-regions;
   comparing, using the computing system, the respective pixel color data for the respective sub-regions with at least one median color value;
   determining, for the respective sub-regions, using the computing system, respective descriptor values based on the comparing;
   generating, using the computing system, fingerprint data for the frame of the query video based on the respective descriptor values for the respective sub-regions; and identifying, using the computing system, a reference video corresponding to the query video using the fingerprint data and reference fingerprint data of a reference database, wherein the reference fingerprint data corresponds to a plurality of reference videos and is derived using pixel color data for the plurality of reference videos.

2. The method of claim 1, wherein the respective pixel color data for the respective sub-regions is represented in multiple components, and wherein the at least one median color value comprises median color values for at least two of the components.

3. The method of claim 2, wherein the multiple components comprise red, green, and blue components.

4. The method of claim 2, wherein the multiple components comprise a luminance component and a chrominance component.

5. The method of claim 2, wherein determining the respective descriptor values for the respective sub-regions comprises determining multiple descriptor values for each of the respective sub-regions.

6. The method of claim 2, wherein generating the fingerprint data based on the respective descriptor values comprises generating a signature using the respective descriptor values and one or more threshold values.

7. The method of claim 6, wherein the signature is an N-dimensional signature, wherein N is a multiple of the number of sub-regions within the set of sub-regions.

8. The method of claim 1, wherein the computing system comprises a user device.

9. A non-transitory computer-readable medium having stored therein instructions that are executable to cause a computing system to perform functions comprising:
   determining, for respective sub-regions of a set of sub-regions that each include pixels of a frame of a query video, respective pixel color data corresponding to pixels included within the respective sub-regions;
   comparing the respective pixel color data for the respective sub-regions with at least one median color value;
   determining, for the respective sub-regions, respective descriptor values based on the comparing;
   generating fingerprint data for the frame of the query video based on the respective descriptor values for the respective sub-regions; and
   identifying a reference video corresponding to the query video using the fingerprint data and reference fingerprint data of a reference database, wherein the reference fingerprint data corresponds to a plurality of reference videos and is derived using pixel color data for the plurality of reference videos.

10. The non-transitory computer-readable medium of claim 9, wherein the respective pixel color data for the respective sub-regions is represented in multiple components, and wherein the at least one median color value comprises median color values for at least two of the components.

11. The non-transitory computer-readable medium of claim 10, wherein the multiple components comprise red, green, and blue components.

12. The non-transitory computer-readable medium of claim 10, wherein the multiple components comprise a luminance component and a chrominance component.

13. The non-transitory computer-readable medium of claim 10, wherein determining the respective descriptor values for the respective sub-regions comprises determining multiple descriptor values for each of the respective sub-regions.

14. The non-transitory computer-readable medium of claim 10, wherein generating the fingerprint data based on the respective descriptor values comprises generating a signature using the respective descriptor values and one or more threshold values.

15. A computing system comprising:
   a processing unit; and
   a computer-readable medium having stored therein instructions that are executable to cause the computing system to perform functions comprising:
      determining, for respective sub-regions of a set of sub-regions that each include pixels of a frame of a query video, respective pixel color data corresponding to pixels included within the respective sub-regions,
      comparing the respective pixel color data for the respective sub-regions with at least one median color value,
      determining, for the respective sub-regions, respective descriptor values based on the comparing,
      generating fingerprint data for the frame of the query video based on the respective descriptor values for the respective sub-regions, and
      identifying a reference video corresponding to the query video using the fingerprint data and reference fingerprint data of a reference database, wherein the reference fingerprint data corresponds to a plurality of reference videos and is derived using pixel color data for the plurality of reference videos.

16. The computing system of claim 15, wherein the respective pixel color data for the respective sub-regions is represented in multiple components, and wherein the at least one median color value comprises median color values for at least two of the components.

17. The computing system of claim 16, wherein the multiple components comprise red, green, and blue components.

18. The computing system of claim 16, wherein the multiple components comprise a luminance component and a chrominance component.

19. The computing system of claim 16, wherein determining the respective descriptor values for the respective sub-regions comprises determining multiple descriptor values for each of the respective sub-regions.

20. The computing system of claim 16, wherein generating the fingerprint data based on the respective descriptor values comprises generating a signature using the respective descriptor values and one or more threshold values.

* * * * *